US011705755B2

(12) United States Patent
Ding et al.

(10) Patent No.: US 11,705,755 B2
(45) Date of Patent: Jul. 18, 2023

(54) POWER SYSTEM RESTORATION INCORPORATING DIVERSE DISTRIBUTED ENERGY RESOURCES

(71) Applicant: Alliance for Sustainable Energy, LLC, Golden, CO (US)

(72) Inventors: Fei Ding, Littleton, CO (US); Weijia Liu, Littleton, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 305 days.

(21) Appl. No.: 17/188,704

(22) Filed: Mar. 1, 2021

(65) Prior Publication Data

US 2021/0273483 A1    Sep. 2, 2021

Related U.S. Application Data

(60) Provisional application No. 62/983,242, filed on Feb. 28, 2020.

(51) Int. Cl.
*H02J 13/00* (2006.01)
*H02J 9/06* (2006.01)
(Continued)

(52) U.S. Cl.
CPC ........ *H02J 13/00004* (2020.01); *H02J 3/003* (2020.01); *H02J 3/004* (2020.01);
(Continued)

(58) Field of Classification Search
CPC ...... H02J 13/00004; H02J 3/003; H02J 3/004; H02J 3/381; H02J 9/061; H02J 9/068;
(Continued)

(56) References Cited

U.S. PATENT DOCUMENTS

2006/0206240 A1* 9/2006 Tsui ................. H02J 3/008
700/291
2008/0039980 A1* 2/2008 Pollack ................. B60L 53/68
700/295
(Continued)

OTHER PUBLICATIONS

Gan et al., "Convex relaxations and linear approximation for optimal power flow in multiphase radial networks," 2014 Power Systems Computation Conference, Wroclaw, Poland, Aug. 2014, pp. 1-9.
(Continued)

*Primary Examiner* — Ziaul Karim
(74) *Attorney, Agent, or Firm* — Robert G. Pittelkow

(57) ABSTRACT

An example system includes an aggregator configured to receive a service collaboration request and iteratively determine, based on minimum and maximum power values for DERs under its management, an optimized operation schedule. The aggregator may also be configured to iteratively determine, based on the optimized operation schedule, an estimated flexibility range for devices under its management and output an indication thereof. The system may also include a power management unit (PMU) configured to iteratively receive the indication and determine, based on a network model that includes the estimated flexibility range, a reconfiguration plan and an overall optimized operation schedule for the network. The PMU may also be configured to iteratively cause reconfiguration of the network based on the plan. The PMU and aggregator may also be configured to iteratively, at a fast timescale, cause energy resources under their management to modify operation based on the overall optimized operation schedule.

7 Claims, 12 Drawing Sheets

(51) Int. Cl.
  *H02J 3/00* (2006.01)
  *H02J 3/38* (2006.01)
(52) U.S. Cl.
  CPC .............. *H02J 3/381* (2013.01); *H02J 9/061* (2013.01); *H02J 9/068* (2020.01); *H02J 2203/10* (2020.01); *H02J 2300/24* (2020.01); *H02J 2310/58* (2020.01)
(58) Field of Classification Search
  CPC .............. H02J 2203/10; H02J 2300/24; H02J 2310/58; H02J 2203/20; H02J 3/0073; H02J 3/466; H02J 3/48; H02J 3/50; Y02B 70/30; Y02B 90/20; Y02E 10/56; Y02E 40/70; Y02E 60/00; Y04S 10/50; Y04S 10/52; Y04S 20/12; Y04S 20/248; Y04S 40/20
  See application file for complete search history.

(56) References Cited

U.S. PATENT DOCUMENTS

| | | | |
|---|---|---|---|
| 2010/0179704 A1* | 7/2010 | Ozog | ........................ H02J 7/35 703/2 |
| 2011/0196546 A1* | 8/2011 | Muller | .................... H02J 3/466 700/295 |
| 2011/0231028 A1* | 9/2011 | Ozog | ...................... H02J 3/008 700/291 |
| 2015/0002186 A1* | 1/2015 | Taft | ..................... H04L 43/0811 324/764.01 |
| 2017/0214244 A1* | 7/2017 | Dall'Anese | ............. H02J 3/381 |

OTHER PUBLICATIONS

Liu et al., "Dynamic Distribution System Restoration Strategy for Resilience Enhancement", Presented at the 2020 IEEE Conference onInnovative Smart Grid Technologies (IEEE ISGT) Washington, D.C., Feb. 17-20, 2020, NREL/CP-5D00-74735, pp. 1-8.

Liu, "Hierarchical Distribution System Adaptive Restoration with Diverse Distributed Energy Resources", IEEE Transactions on Sustainable Energy, Apr. 2021, vol. 12, No. 2, pp. 1-13.

Peng et al., "Feeder reconfiguration in distribution networks based on convex relaxation of OPF," IEEE Transactions on Power Systems, Jul. 2015, vol. 30, No. 4, pp. 1793-1804.

International Search Report and Written Opinion for International (PCT) Application No. PCT/US2021/020286, dated Jul. 9, 2021, pp. 1-9.

\* cited by examiner

POWER SYSTEM RESTORATION INCORPORATING DIVERSE DISTRIBUTED ENERGY RESOURCES

CROSS-REFERENCE TO RELATED APPLICATIONS

This application claims the benefit of U.S. Provisional Application No. 62/983,242, titled "GRID EDGE FLEXIBILITY QUANTIFICATION AND OPTIMIZATION" and filed Feb. 28, 2020, the entire content of which is incorporated herein by reference.

GOVERNMENT LICENSE RIGHTS

This invention was made with government support under Contract No. DE-AC36-08G028308 awarded by the Department of Energy. The government has certain rights in the invention.

BACKGROUND

As renewable energy becomes more important in today's society, power grids may have to manage increasingly distributed energy sources, including renewable energy sources. For instance, even modest housing may have photovoltaic (PV) systems and/or wind turbines installed to reduce dependence on the grid and/or to offset energy costs. In addition, availability and utilization of grid-friendlier devices, such as controllable loads and/or energy storage systems also continue to increase. As prevalence of these distributed energy resources increases, grid managers, such as those who manage power distribution networks, will be faced with power failures and outages on more complex power networks.

SUMMARY

In one example, a system includes an aggregation unit comprising at least one processor, the aggregation unit being configured to receive a service collaboration request indicating a problem in a power distribution network and, responsive to receiving the service collaboration request, determine, based on respective minimum and maximum real and reactive power values for one or more devices in the power distribution network under management by the aggregation unit, an optimized operation schedule covering a model predictive control (MPC) horizon duration for the one or more DERs. The aggregation unit may be further configured to determine, based on the optimized operation schedule, an estimated flexibility range for DERs under management by the aggregation unit and output an indication of the estimated flexibility range. The system may further include a power management unit comprising at least one processor, the power management unit being configured to receive the indication of the estimated flexibility range and determine, based on a linearized restoration model of the three-phase unbalanced power distribution network that includes the indication of the estimated flexibility range, an optimized power distribution network reconfiguration plan and an overall optimized operation schedule covering the MPC horizon duration for both energy resources under management by the power management unit and the one or more DERs. The power management unit may be further configured to cause, based on the optimized power distribution network reconfiguration plan, a reconfiguration of the power distribution network and output an indication of the overall optimized operation schedule. The power management unit may be further configured to cause one or more of the energy resources under management by the power management unit to modify operation based on the overall optimized operation schedule. The aggregation unit may be further configured to receive the indication of the overall optimized operation schedule, determine, based on the indication of the overall optimized operation schedule, setpoints for the one or more DERs, and cause at least one of the one or more DERs to modify operation based on the setpoints.

In another example, an aggregation unit includes at least one processor configured to receive a service collaboration request indicating a problem in a power distribution network and, responsive to receiving the service collaboration request, determine, based on respective minimum and maximum real and reactive power values for one or more DERs in the power distribution network under management of the aggregation unit, an optimized operation schedule covering a model predictive control (MPC) horizon duration for the one or more DERS. The at least one processor may be further configured to determine, based on the optimized operation schedule, an estimated flexibility range for devices under management by the aggregation unit and output, for use by a management device in the power distribution network, an indication of the estimated flexibility range. The at least one processor may be further configured to receive an indication of an overall optimized operation schedule covering the MPC horizon duration, determine, based on the indication of the overall optimized operation schedule, setpoints for the one or more DERs, and cause at least one of the one or more DERs to modify operation based on the setpoints.

In another example, a power management unit includes at least one processor configured to receive an indication of an estimated flexibility range of one or more devices in a power distribution network that are under management by an aggregation unit and determine, based on a linearized restoration model of the power distribution network that includes the indication of the estimated flexibility range, an optimized power distribution network reconfiguration plan and an overall optimized operation schedule covering the MPC horizon duration for both energy resources under management by the power management unit and one or more distributed energy resources (DERs) under management by the aggregation unit. The at least one processor may be further configured to cause, based on the optimized power distribution network reconfiguration plan, a reconfiguration of the power distribution network and output, for use by the aggregation unit, an indication of the overall optimized operation schedule. The at least one processor may be further configured to cause one or more of the energy resources under management by the power management unit to modify operation based on the overall optimized operation schedule.

The details of one or more examples are set forth in the accompanying drawings and the description below. Other features, objects, and advantages will be apparent from the description and drawings, and from the claims.

DETAILED DESCRIPTION

Figure 1:
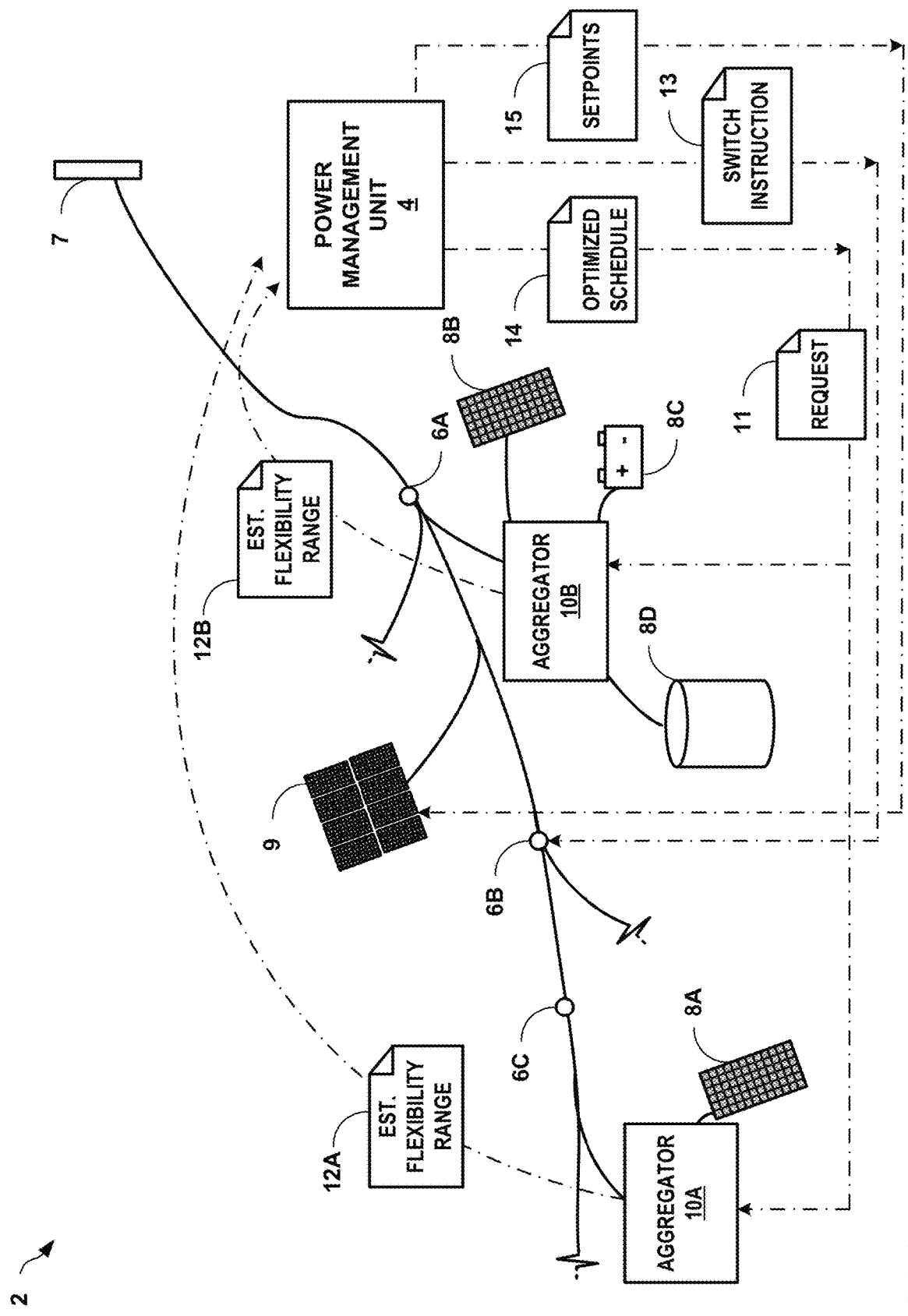
FIG. 1 is a conceptual diagram illustrating an example power distribution system configured to perform power system restoration incorporating diverse distributed energy resources, in accordance with one or more aspects of the present disclosure.

The present disclosure provides systems, devices, and methods for power system restoration incorporating grid edge flexibility. As further described herein, the power generation capability of utility-scale distributed energy resources (DERs) and the flexibility of dispersed DERs, including behind-the-meter DERs, are coordinated through a hierarchical structure to recover distribution system power supplies after outages. As one example, a power management unit (PMU), such as that operated by a distribution system operator (DSO), may determine that an outage has occurred and request flexibility information from aggregators in the distribution system. The aggregators may optimize performance of DERs under their control and generate an estimate of DER flexibility. The PMU may receive estimates of DER flexibility and use model predictive control (MPC) in a restoration planning stage to dynamically adjust system restoration strategies and the reference of DERs based on up-to-date forecast data. With consideration of the three-phase unbalanced distribution power flow, the PMU may ensure radiality of islands via various methods, such as mathematical programming or a computationally efficient heuristic algorithm. The PMU may also send operating setpoints that represent the optimal MPC solution. The aggregators may perform real-time balancing using dispatch models that mitigate unexpected errors and fluctuations. In other words, DSOs and aggregators/end-users will be coordinating during the outage period to fully use edge DER capabilities for service restoration.

The supply and delivery of reliable electric power is the most critical target of the entire power industry. Although numerous efforts have been made to improve power system reliability and resilience, power failures and outages remain inevitable because of various factors including the fragility of infrastructure and the increasing threats of extreme weather and malicious attacks. Power system restoration strategies aim to minimize the negative impacts of such service interruptions on electricity customers.

Related-art system restoration studies in the literature have emphasized the recovery of transmission systems, such as the black-start process, generator cranking, energizing the backbone transmission network, and island sectionalization. Service restoration in distribution systems was generally limited to network reconfiguration. With the ever-increasing integration of distributed energy resources (DERs), modern distribution systems may have enough generation capacity to perform proactive restoration actions after outages, but there still exist several key obstacles that limit the contributions of DERs in distribution system restoration.

By solidifying the role of smaller-scale DERs, including behind-the-meter resources, and providing efficient communication and coordination of utility operators, aggregators, and end-use customers, the techniques of the present disclosure allow utility operators to leverage and rely on smaller-scale DERs to assist in distribution system restoration. In this way, utility operators no longer have to rely only on the dispatch of utility-scale DERs (e.g., distributed generators and energy storage systems (ESSs)) with large capacities. The techniques of the present disclosure also address real-time balancing and uncertainty regarding generation capability of such DERs as well as consumption patterns of consumers by creating a novel, collaborative framework that integrates restoration planning and real-time balancing and resource dispatch.

FIG. 1 is a conceptual diagram illustrating an example power distribution system (e.g., system 2) configured to perform power system restoration incorporating grid edge flexibility, in accordance with one or more aspects of the present disclosure. In the example of FIG. 1, system 2 includes power management unit 4 and aggregators 10A and 10B (collectively "aggregators 10"). System 2 also includes system configuration devices 6A, 6B, and 6C (collectively "system configuration devices 6"), connection point 7, aggregator-managed DERs 8A-8D (collectively "aggregator-managed DERs 8"), and PMU-managed DER 9. System 2 may include additional components that are not shown. As shown in the example of FIG. 1, system configuration devices 6, connection point 7, aggregator-managed DERs 8, PMU-managed DER 9, and aggregators 10 (and possibly other components) are all connected via a network of power lines and, with those power lines, may represent a typical system for distributing power to customers.

System 2, as shown in the example of FIG. 1, represents a simplified power distribution system. In other examples, the power system may include any number of system configuration devices, PMU-managed DERs, aggregators, and/or aggregator-managed DERs. Thus, while shown in the example of FIG. 1 as having three system configuration devices, four aggregator-managed DERs, one PMU-managed DER, and two aggregators, power distribution systems may, in other examples, have more or fewer of these items. Additionally, system 2 represents only one example of a system configured to perform the techniques described herein, and various other systems, having additional components, fewer components, and/or other components may be used in accordance with the techniques of the present disclosure.

Power management unit 4, as shown in the example of FIG. 1, is a system or device configured to manage system 2. Power management unit 4 may be a computing device, such as a server computer, a desktop computer, or any other device capable of implementing some or all of the techniques described herein. In some examples, power management unit 4 may represent a cloud computing environment. That is, while shown as a single box in the example of FIG. 1, power management unit 4 may, in some examples, be a group of distributed computing resources that communicate with one another to perform at least some of the techniques described herein. In some examples, power management unit 4 may be the same as or be physically collocated with connection point 7. In other words, in some examples, connection point 7 may be integrated with power management unit 4 or otherwise configured to perform the operations of power management unit 4 as described herein. In some examples, such as the example shown in FIG. 1, connection point 7 and power management unit 4 may be separate from one another.

In the example of FIG. 1, system configuration devices 6 are devices operable to reconfigure power distribution system 2 to manage power flow, address outages or faults, or for other reasons. For example, system configuration devices 6 may include switches (also known as switch gear) that can connect or disconnect portions of power distribution system 2 to one another. In some examples, system configuration devices 6 may be directly operable by power management unit 4. In some examples, system configuration devices 6 may be operable by other devices, may be physically operable by individuals, and/or may operate on their own. Additional examples of system configuration devices 6 include circuit breakers, reclosers, relays, and others.

Connection point 7, in the example of FIG. 1, is the point at which system 2 is connected to a power transmission system. That is, connection point 7 is a power substation. In some examples, connection point 7 may represent a connection between system 2 and a larger power distribution network. In other words, in some examples the techniques disclosed herein may be used in a subset of an entire power distribution network and in some examples, they may be used in the entire power distribution network. As discussed above, connection point 7 may, in some examples, be collocated with and/or integrated with power management unit 4.

In the example of FIG. 1, aggregator-managed DERs 8 are system-connected devices having controllable power output and/or consumption. Specifically, aggregator-managed DERs 8A and 8B are PV systems that utilize sunlight to generate power. Aggregator-managed DER 8C is a battery energy storage system (BESS). Aggregator-managed DER 8D is a water heater. Additional examples of aggregator-managed DERs may include wind turbines, generators (e.g., diesel generators), heating, ventilation, and/or air conditioning (HVAC) systems, electric vehicles/electric vehicle chargers, washing machines, smart plug-connected loads, refrigeration devices, or any other electrical devices whose generation and/or consumption of energy may be controlled. In the example of FIG. 1, the generation and/or consumption of energy by aggregator-managed DERs 8 is managed by aggregators 10 as further described below.

PMU-managed DER 9, in the example of FIG. 1, is a large-scale PV system. In general, PMU-managed DERs may be any system-connected device or system having controllable power output and/or consumption. Additional examples of PMU-managed DERs may include wind farms, generators (e.g., natural gas, coal, etc.), energy storage systems, and other energy resources owned or operated by utilities. In various examples, the consumption or generation of energy by PMU-managed DERs may be directly or indirectly managed by power management unit 4.

In the example of FIG. 1, aggregators 10 are systems or devices configured to manage aggregations of energy consumption and/or generation devices. Specifically, aggregator 10A manages aggregator-managed DER 8A and aggregator 10B manages aggregator-managed DERs 8B, 8C, and 8D. While not shown in the example of FIG. 1, the devices managed by aggregators 10 may include uncontrollable devices, including uncontrollable loads like lighting and miscellaneous electrical loads. Examples of aggregators 10 may include home energy management systems (HEMSs) that typically manage devices in a residential home, building energy management systems that typically manage devices in a commercial or industrial building, microgrid controllers that manage devices on a campus, such as a military base, a school, a business park, or other location, and control units of third-party distribution system aggregators that manage devices of multiple end users.

While shown in the example of FIG. 1 as connecting aggregator-managed DERs 8 to system 2, aggregators 10 may, in some examples, be separate from the power distribution system. That is, in some examples aggregator-managed DERs 8 may be connected to system 2 on their own. In such examples, aggregators 10 may be communicatively coupled with aggregator-managed DERs 8 and/or other devices in the power distribution system in order to perform at least some of the techniques described herein.

Some aggregator-managed DERs may be directly connected to the power distribution system and thus their operation may be more apparent to system operators. For instance, when a distribution system aggregator is managing DERs of multiple individuals, some such DERs may be directly connected to the power distribution network. Other aggregator-managed DERs may not be directly connected, and may instead be "behind the meter", rendering them less apparent to system operators. For instance, when a HEMS is managing DERs of a single residential customer, a rooftop PV system, a water heater, an HVAC, and a BESS may be behind the meter and thus their specific operation may not be apparent to system operators.

In accordance with the techniques of the present disclosure, an aggregation unit may include one or more processors. The processors may be configured to receive a service collaboration request indicating a problem in a power distribution network. In the example of FIG. 1, for instance, one or more processors (not shown) of aggregators 10 may receive request 11 output by power management unit 4. Such requests may be received when power management unit 4 determines that an outage has occurred in system 2 or that some other problem with system 2 may benefit from assistance of aggregators 10. In some examples, the request may only indicate that collaboration from the aggregators is requested. That is, the request may be rather rudimentary. In some examples, the request may provide additional or other information for use by the aggregators.

Responsive to receiving the service collaboration request, the processors of the aggregation unit may determine, based on respective minimum and maximum real and reactive power values for one or more DERs in the power distribution network under management by the aggregation unit, an optimized operation schedule covering a model predictive control (MPC) horizon duration for the one or more DERs. For instance, aggregator 10A may utilize minimum and maximum real and reactive power values for aggregator-managed DER 8A to determine an optimized operation schedule as described in detail below. The optimized operation schedule may represent a minimization of power consumption by devices under the management of aggregator 10A while still meeting the goals (e.g., comfort, safety, minimum or maximum power needs, etc.) of aggregator 10A.

Similarly, aggregator 10B may utilize the minimum and maximum real and reactive power values for aggregator-managed DERs 8B, 8C, and 8D to determine its own optimized operation schedule. As one example, if aggregator-managed DER 8D (a water heater) can defer activation for a while—such as because residents aren't using hot water or because it recently reheated its water—then aggregator 10B's optimized operation schedule may include aggregator-managed DER 8D not using any energy during the MPC horizon duration.

The processors of the aggregation unit may determine, based on the optimized operation schedule, an estimated flexibility range for devices under management by the aggregation unit. For example, aggregator 10a may predict the minimum amount and maximum amount of energy that would be consumed or produced by aggregator-managed DER 8A and other managed devices (not shown) if its determined optimized operation schedule were followed. Aggregator 10a may also predict the minimum and maximum amount of power that would be consumed or produced by such devices if the optimized operation schedule were followed. In some examples, determining the estimated flexibility range may be adding up the minimum and maximum energy consumption and power consumption of each device under management by an aggregator at each point in time in the MPC horizon duration. The estimated flexibility ranges thus represent how much devices under the aggregator's management can assist in addressing a problem within the power distribution network. In the example of FIG. 1, for instance, aggregator 10B may add up the predicted minimum energy usage of each of aggregator-managed DERs 8B, 8C, and 8D at each timeframe in the MPC horizon duration to determine an aggregate predicted minimum energy usage. Aggregator 10B may do the same for maximum energy usage, minimum power usage, and maximum power usage.

The processors of the aggregation unit may output an indication of the estimated flexibility range. For example, aggregators 10A and 10B may output estimated flexibility ranges 12A and 12B, respectively. Estimated flexibility ranges may be communicated using one or more wired or wireless networks (not shown). In some examples, aggregators 10 may additionally output an indication of their optimized operation schedule.

In accordance with the techniques described herein, a power management unit may include one or more processors. The processors of the power management unit may be configured to receive the indication of the estimated flexibility range. For instance, one or more processors (not shown) of power management unit 4 may receive estimated flexibility ranges 12A and 12B.

The processors of the power management unit may be configured to determine, based on a linearized restoration model of the three-phase unbalanced power distribution network that includes the indication of the estimated flexibility range, an optimized power distribution network reconfiguration plan and an overall optimized operation schedule covering the MPC horizon duration for both energy resources under management by the power management unit and the one or more DERs. In the example of FIG. 1, for instance, power management unit 4 may incorporate estimated flexibility ranges 12A and 12B into a model of system 2 and use the model to determine how best to reconfigure system 2 and an optimized operation schedule for operation of system 2. Further details regarding the model are provided below.

The processors of the power management may be further configured to cause, based on the optimized power distribution network reconfiguration plan, a reconfiguration of the power distribution network. For instance, in the example of FIG. 1, power management unit 4 may output switch instruction 13 to cause system configuration device 6B (e.g., a switch) to open, thus reconfiguring system 2. Reconfiguration may be used to ensure proper system architecture for addressing issues in the power distribution network.

The processors of the power management unit may also output an indication of the overall optimized operation schedule. For instance, power management unit 4 may output optimized schedule 14 for use by aggregators 10.

The processors of the aggregation unit may be further configured to receive the indication of the overall optimized operation schedule and determine, based on the indication of the overall optimized operation schedule, setpoints for the one or more DERs. For instance, aggregators 10 may each receive optimized schedule 14 and determine setpoints for their respective ones of aggregator-managed DERs 8. Aggregators 10 may determine setpoints based on various criteria, including interests of the aggregator (e.g., comfort) and limitations of the DERs under management (e.g., maximum power) as further described herein.

The processors of the aggregation unit may cause the one or more DERs to modify operation based on the setpoints. For example, aggregator 10A may cause aggregator-managed DER 8A to modify operation and aggregator 10B may cause one or more of aggregator-managed DERs 8B, 8C, and 8D to modify operation.

The processors of the power management unit may cause one or more of the energy resources under management by the power management unit to modify operation based on the overall optimized operation schedule. For example, power management unit 4 may generate setpoints for PMU-managed DER 9 and output an indication as setpoints 15. This may cause PMU-managed DER 9 to modify operation.

As further described herein, components of system 2 (e.g., power management unit 4, aggregators 10) may be configured to perform the techniques described herein in an iterative fashion that allows system 2 to ensure maximum coordination in real-time operation while coping with the computational complexity of model predictive control. In particular, once aggregators 10 receive the service collaboration request, aggregators 10 may determine their optimized operation schedule, determine their estimated flexibility ranges, and output 12A and 12B iteratively at a first frequency that represents an MPC interval. Correspondingly, power management unit 4 may determine the optimized power distribution network reconfiguration plan and overall optimized operation schedule, cause the reconfiguration of the power network, and output the overall optimized operation schedule at the MPC interval frequency. The MPC interval may be 5 minutes, 15 minutes, 30 minutes, or other appropriate duration. At this frequency, the power management unit and aggregation units may be sufficiently capable of performing the modeling necessary to adequately predict how the power distribution system will operate. In this way, the power management unit and aggregation units may regularly re-determine the predicted optimum solutions for collaboratively addressing any issues within the power distribution network.

However, no prediction will be perfect in reality, and network variables may fluctuate from minute to minute or more. Thus, the power management unit may cause the PMU-managed DERs to modify operation iteratively at a second, higher frequency that represents a real-time interval. Similarly, the aggregation units may determine setpoints for their aggregator-managed DERs and cause their aggregator-managed DERs to modify operation iteratively at the real-time interval frequency. The real-time interval may be 10 seconds, 30 seconds, 1 minute, 2 minutes, or other appropriate duration. By modifying operation of network DERs on a faster timescale, the techniques provided herein allow for efficient use of computing resources while also allowing system operators to leverage diverse DERs in the network to address outages and other disturbances.

The following mathematical development and additional details and description are discussed with reference to a home energy management system (HEMS), which may be one example of an aggregation unit as described herein. It should be understood that other aggregation units, such as building energy management systems that control the energy schedules for commercial/industrial buildings, third-party aggregators that aggregate the demand response of retail customers, and microgrid controllers that manage different distributed energy resources inside a campus may also be used in accordance with the techniques described herein. The following nomenclature is used below to describe the additional details and description of the disclosed techniques.

Acronyms/Initialisms

DER Distributed energy resource
DSO Distribution system operator
ESS Energy storage system
HEMS Home energy management system
MPC Model predictive control
PV Photovoltaic Sets and Indexes
$\Omega_{A_h}/a$ Set/index of DER at household h
$\Omega_{B_h}/b$ Set/index of comfort parameters at household h
$\omega_{CG}/n$ Set/index of conventional generators
$\Omega_H/h$ Set/index of households
$\Omega_L/nm$ Set/index of distribution lines
$\Omega_N/n$ Set/index of distribution system buses
$\Omega_{RG}/n$ Set/index of renewable generators
$\Psi_n/\phi$ Set/index of phases at bus n
$\tau, \omega$ Indexes of MPC and real-time intervals Parameters
$c_{h,\tau}^b, c_{h,\omega}^b$ External influencing factor for household comfort parameter
$e_{h,\tau}$ Household cumulative energy consumption
$n_t$ Number of real-time intervals in one MPC time interval
$P_{n,\omega}^{act}$ Real-time renewable generation capability
$P_{n,\omega}^{G,reg}$ Real-time regulation capacity
$r_{nm}^{\phi\phi}, x_{nm}^{\phi\phi}$ Resistance and reactance of distribution line
$T_{st}, T_{en}$ Start and end time of the MPC horizon
$\beta_h^b$ Weighting coefficient of comfort preference
$\beta_h^P, \beta_h^e$ Penalty coefficients of real-time household power and energy violations
$\delta_h^a$ DER conversion efficiency factor
$\delta_h^C, \delta_h^D$ ESS charging and discharging efficiencies
$\gamma_n^C$ Renewable curtailment penalty
$\gamma_n^{ES}$ ESS dispatch penalty
$\gamma_n^G$ DER generating cost
$\gamma_n^S$ Penalty of load shedding
$\gamma_h^V$ Penalty of household flexibility violation
$\gamma_h^W$ Penalty of household desired power deviation
$\eta$ Acceptable real-time power deviation
$\omega_h^{a,on}, \omega_h^{a,off}$ Minimum on and off time of household appliances
$\Delta T, \Delta t$ Length of MPC and real-time intervals Variables
$c_{h,\omega}^P, c_{h,\omega}^e$ Real-time penalty for HEMS power schedule and energy schedule violation
$p_{h,\tau}^a, p_{h,\omega}^a$ Active power load of household DER
$P_{h,\tau}, Q_{h,\tau}$ Household loads optimized by DSO
$P_{n,\omega}^{curt}$ Real-time renewable generation curtailment
$P_{n,\omega}^{ES,C}, P_{n,\omega}^{ES,D}$ ESS charging and discharging power
$P_{n,\tau}^{D,\phi}, P_{n,\omega}^{D,\phi}$ Nodal active load consumption
$P_{n,\tau}^{D,fix,\phi}, P_{n,\omega}^{D,fix,\phi}$ Active power of the uncontrollable load
$P_{n,\tau}^G, P_{n,\omega}^G$ Active power generation of utility-scale DERs
$P_{n,\tau}^{S,\phi}$ Active load shedding
$P_{h,\tau}^V$ Violation of household's flexibility range
$P_{h,\omega}^W$ Deviation of household's preferred schedule
$P_{nm,\tau}^\phi, Q_{nm,\tau}^\phi$ Active and reactive line power flows
$q_{h,\tau}^a, q_{h,\omega}^a$ Reactive power load of household DER
$Q_{n,\tau}^{D,\phi}, Q_{n,\omega}^{D,\phi}$ Nodal reactive load consumption
$Q_{n,\tau}^{D,fix,\phi}, Q_{n,\omega}^{D,fix,\phi}$ Reactive power of the uncontrollable load
$Q_{n,\tau}^G, Q_{n,\omega}^G$ Reactive power output of utility-scale DERs
$Q_{n,\tau}^{S,\phi}, Q_{n,\omega}^{S,\phi}$ Reactive load shedding
$s_{h,\tau}^b, s_{h,\omega}^b$ Generalized comfort indicator of household DER
$\rho_{n,\omega}^{ES}$ ESS energy storage level
$u_{h,\omega}^a$ Binary control signal of household DER
$V_{n,\tau}^\phi$ Squared nodal voltage magnitude Superscripts
min/max Minimum or maximum limit of a quantity
pre The preferred value of a quantity The details provided below can be summarized as: (A) The framework to coordinate DSOs and individual customers (i.e., aggregators) is introduced based on a hierarchical structure. Post-event service restoration planning and real-time dispatch are integrated into the framework to fully use DER capabilities in uncertainty management. (B) Adaptive restoration planning models are provided for DSOs and individual customers to integrate the operations of switches, the scheduling of utility-scale DERs, and the flexible responses of behind-the-meter DERs based on MPC techniques. A linearized three-phase unbalanced distribution power flow is provided and, in some examples, a mathematical programming approach is used to solve the distribution system reconfiguration problem. In some examples, a heuristic reconfiguration algorithm is employed to solve the distribution system reconfiguration to improve computational efficiency. And (C) With respect to the MPC-based restoration planning solutions, real-time dispatch models are provided to address potential forecast errors in an MPC time interval and maintain real-time power balance. The DER switching frequency is also considered in the real-time dispatch to account for the practical operating protocols of certain aggregator DERs, such as behind-the-meter DERs.

As an overview, the main goal of distribution system restoration is to maintain power supply to critical customers and minimize service interruptions. To achieve this, the DSOs are supposed to reconnect the outage area through switch operations and use available resources to restore power supply. In the past, DSOs have had access only to switchgear and utility-owned DERs, whereas DERs are managed and controlled by aggregators that control various smaller-scale DERs or, in some examples, individual customers that control behind-the-meter DERs.

To utilize the flexibility of aggregator DERs for better service restoration performance, the techniques of the present disclosure include a collaboration framework to coordinate DSO's restoration decisions with the behaviors of aggregator DERs. The uncertainty and intermittency of DERs also pose great challenges to the security and reliability of power supply during service restoration. In accordance with the techniques described here, however, MPC-based restoration planning and real-time dispatch are integrated to respectively handle long-term forecast errors (e.g., hours ahead) and short-term fluctuations (e.g., minute or second level). The uncertainties of DERs may also significantly influence the sustainability and reliability of load supply. To achieve more sustainability, a combination of diverse power sources including renewables, energy storage, and diesel generators is recommended.

Note that no specific assumptions were made on the composition of resources in developing the restoration framework and the optimization models disclosed herein. The techniques of the present disclosure can be applied to universal distribution system restoration cases.

Many DERs in power distribution networks are not owned by a DSO. For example, behind-the-meter DERs are mainly owned by private customers. Therefore, a DSO cannot expect the behind-the-meter DERs to cooperate without appropriate collaboration schemes and mutual agreement. The techniques disclosed herein were developed based upon the following assumptions to enable the collaboration between DSO and the behind-the-meter DERs during the distribution system restoration stage: (1) The behind-the-meter DERs of residential customers are the focus of this portion of the disclosure. However, the techniques of the present disclosure may be applied to DERs of commercial and industrial customers and other distribution network aggregators. (2) Each residential house is equipped with a home energy management system (HEMS) or an equivalent grid-edge controller with similar functionality that controls the behind-the-meter DERs. If a house does not have any behind-the-meter DERs, there is no need to introduce a HEMS, and the corresponding house will be treated as an uncontrollable load. (3) The distribution system has a hierarchical control framework where behind-the-meter DERs are controlled by HEMSs, and multiple HEMSs are coordinated by the system-level controller (i.e., DSO). It should be noted, however, that the techniques described herein may be trivially modified to work with additional levels of hierarchical control in the distribution system. (4) The collaboration between the DSO and HEMSs is achieved through demand response programs. The DSO provides demand response program options that incent the enrollment of residential customers. These programs will specify the responsibility of the customer (e.g., how fast should the customer responds to a request). In return, the customer may get credits or other monetary rewards for subscribing to a program. It should be noted, however, that collaboration between the DSO and aggregators may be incentivized/achieved in various other ways. (5) The demand response programs are typically long-term programs with fixed-term payments. Hence, any rewards are not addressed in the disclosed techniques because they are constant parameters. On the other hand, if a customer fails to provide a requested service as described in the subscribed program, financial penalties specified in the program may apply. These penalties are performance-based and are included in the disclosed techniques. Based on these assumptions, the residential customers will benefit from the collaboration programs by cutting their energy bills and the DSO will enhance the restoration performance by scheduling the flexibility of behind-the-meter DERs.

Figure 2:
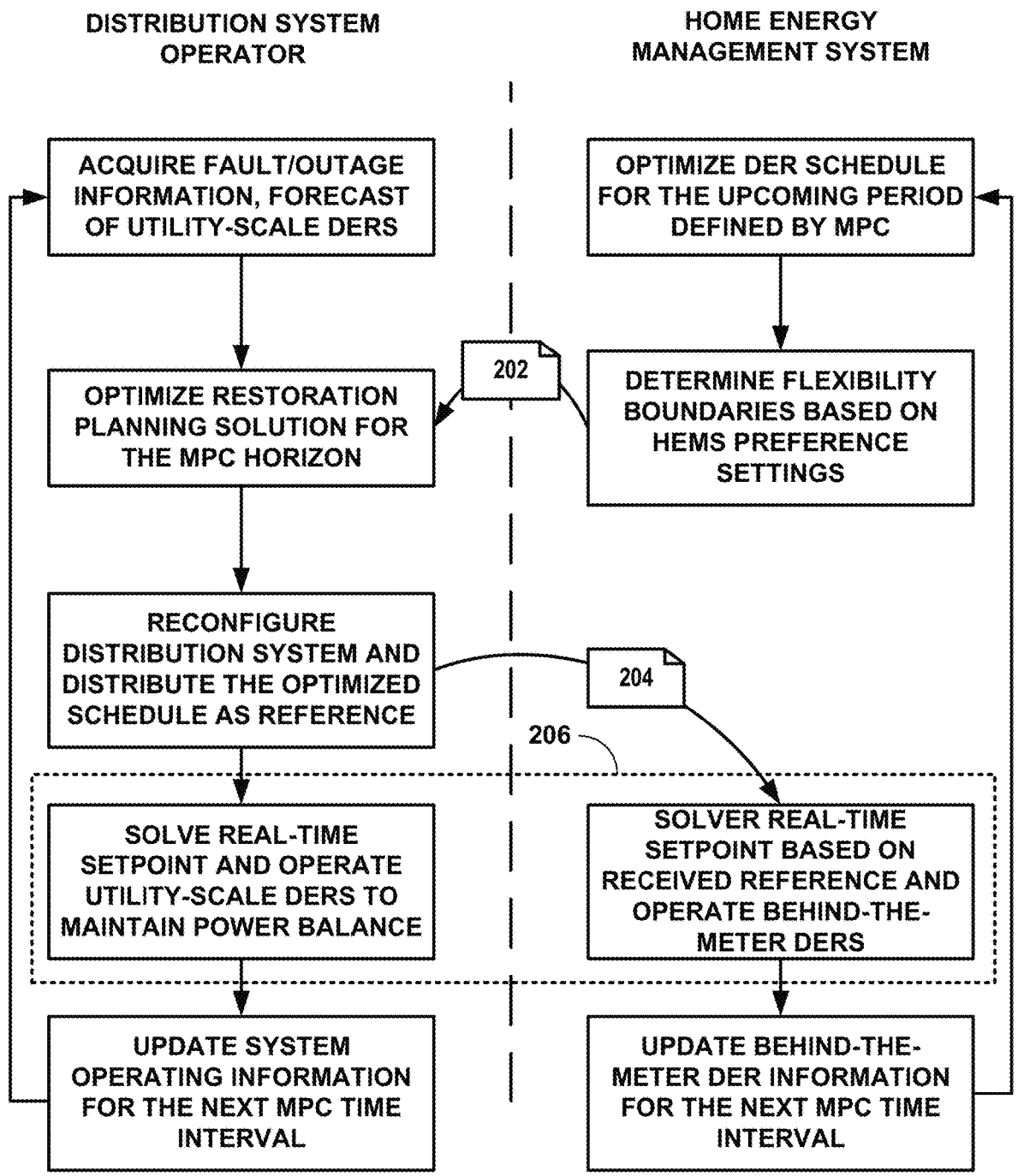
FIG. 2 is a flow diagram illustrating an example collaboration framework for power system restoration incorporating diverse distributed energy resources, in accordance with one or more aspects of the present disclosure.

FIG. 2 is a flow diagram illustrating an example collaboration framework for power system restoration incorporating diverse distributed energy resources, in accordance with one or more aspects of the present disclosure. Specifically, FIG. 2 illustrates one example of the coordination between the DSO and a HEMS during the restoration stage. The same procedures may apply to all HEMSs subscribing to the DSO's programs. The communication involved in the techniques provided herein may be achieved using existing communication protocols such as DNP3 and ModBus, or other suitable communication means.

As shown in the example of FIG. 2, the DSO manages the system reconfiguration and utility DER operation, and the HEMS schedules the behind-the-meter DERs. The flexibility of behind-the-meter DERs is first modeled by the HEMS and then shared, via transmission 202, with the DSO for restoration strategy optimization. To properly monitor the uncertainty factors during the restoration process, the techniques described herein consider the integration and collaboration of adaptive restoration planning and real-time operation, the latter of which is represented by dotted box 206.

The restoration planning emphasizes reconfiguring the distribution system and scheduling its resources—i.e., DERs—to maintain a reliable power supply for a prolonged period. A rolling horizon MPC technique is used to perform a rolling optimization that enables the DSO to adjust its planning solution with respect to the most accurate forecast available.

Figure 3:
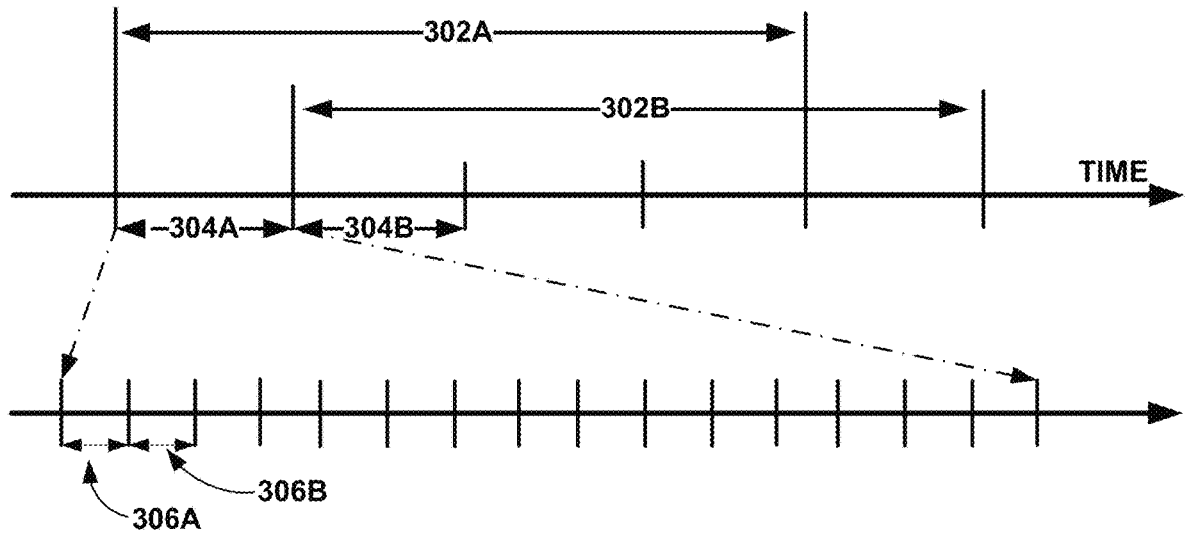
FIG. 3 is a conceptual diagram illustrating example timing and sequential control actions for power restoration incorporating diverse distributed energy resources, in accordance with one or more aspects of the present disclosure.

FIG. 3 is a conceptual diagram illustrating example timing and sequential control actions for power restoration incorporating diverse distributed energy resources, in accordance with one or more aspects of the present disclosure. In the example of FIG. 3, durations 302A and 302B (collectively "durations 302") each represent a prediction horizon used in optimization. Only two of durations 302 are shown in the example of FIG. 3, but durations 302 may include additional durations as needed. Each of durations 302 may also be referred to herein as an MPC horizon. Each MPC horizon is subdivided into a number of control horizons, denoted by durations 304A and 304B (collectively "durations 304"). Again, only two of durations 304 are shown in the example of FIG. 3, but durations 304 may include additional durations. Durations 304 may also be referred to herein as MPC intervals. When solving an optimization model on an MPC horizon, the solutions at all MPC intervals are derived, but only the control action at the first MPC interval is executed. In the distribution system restoration problem, the MPC interval may correspond to a typical control horizon of utility control systems (e.g., 15 minutes or 1 hour). The MPC horizon is influenced by the capability to forecast renewable DER generation. To ensure high forecast accuracy, it is suggested to use a short-term forecast that lasts for a few hours.

As indicated by dotted box 206 of FIG. 2, the MPC-based planning solution acts as a reference for both the DSO and the HEMS during real-time operation. Meanwhile, the DER forecast within one MPC interval could also fluctuate and threaten the security of the restored network. Therefore, each MPC interval is further divided into several real-time intervals, denoted as durations 306A and 306B (collectively "durations 306") as shown in FIG. 3. Again, only two of durations 306 are shown in the example of FIG. 3, but durations 306 may include additional durations. Real-time dispatch will be conducted at each real-time interval to maintain power balance and guarantee the feasibility of the restoration techniques described herein. Note that throughout the real-time operation stage (dotted box 206 of FIG. 1), communication between the HEMS and DSO is optional because the HEMS follows only the received reference based on the MPC-based planning model, which can no longer be modified in real-time. Generally, a HEMS should respect the following two principles when scheduling the consumption plans of various behind-the-meter DERs: (1) accommodate the comfort preferences of individual customers; and (2) protect the customers' private/confidential information from being revealed.

For purposes of exposition, is assumed that each customer might have an uncontrollable load (e.g., lighting load), rooftop photovoltaic (PV) panel, ESS, heat pump, and electric water heater. Different models have been developed to capture the unique characteristics of these DERs. Although the DER models are critical for HEMS optimization, a detailed DER modeling technique is not the focus of this disclosure. Therefore, a generalized model is used instead to concisely summarize existing DER models discussed in the literature. The generalized model will be employed to schedule the behind-the-meter DERs to meet the customers' comfort settings.

For a given HEMS, h, its behind-the-meter DER scheduling model can be described as:

$$\text{Min} \sum_{\tau=T_{st}}^{T_{en}} \left( \sum_{a \in \Omega_{A_h}} p_{h,\tau}^a + \sum_{b \in \Omega_{B_h}} \beta_h^b \| s_{h,\tau}^b - s_h^{b,pre} \|_2^2 \right) \quad (1)$$

$$\text{s.t. } p_{h,\tau}^{a,min} \le p_{h,\tau}^a \le p_{h,\tau}^{a,max} \quad (2)$$

$$q_{h,\tau}^{a,min} \le q_{h,\tau}^a \le q_{h,\tau}^{a,max} \quad (3)$$

$$s_{h,\tau}^{b,min} \le s_{h,\tau}^b \le s_{h,\tau}^{b,max} \quad (4)$$

$$s_{h,\tau}^b = s_{h,\tau-1}^b + \sum_{a \to b} \delta_h^a p_{h,\tau}^a \Delta T + c_{h,\tau}^b \Delta T \quad (5)$$

In this model, the objective function (1) minimizes the total energy consumption (the first term) and the deviation from preferred comfort settings (the second term) over the MPC planning horizon from $T_{st}$ to $T_{en}$. A weighting coefficient $\beta_h^b$ is introduced to distinguish the priority of comfort parameters based on the preferences of the corresponding customer. A positive (or negative) $p_{h,\tau}^a$ is defined herein to indicate that the DER is consuming (or generating) power.

Constraints (2)-(5) are generalized constraints for behind-the-meter DERs. The active power and reactive power of DERs are constrained by (2) and (3), respectively. The customer's comfort parameters are constrained by (4). Equation (5) captures the influences of DER behaviors on their corresponding comfort indicator. In (5), $\delta_h^a$ denotes the efficiency of DER on the comfort of the customer. If a certain comfort parameter is influenced by several DERs, the contributions of DERs will be aggregated as shown in (5), where a→b indicates that the consumption of DER a will influence the comfort parameter b. In addition, $c_{h,\tau}^b$ is introduced to aggregate the influences on the comfort parameter other than DERs.

The DER schedule optimized by model (1)-(5) is denoted as $\{p_{h,\tau}^{a*}\}$. When interacting with the DSO, each HEMS can reveal its preferred power consumption schedule $\{p_{h,\tau}^*\}$, where $p_{h,\tau}^*$ is defined as $$p_{h,\tau}^* := \Sigma_{a \in \Omega_{A_h}} p_{h,\tau}^{a*},$$

to protect the confidential information of its behind-the-meter DERs from the DSO and other HEMSs. In this way, the DSO and other HEMSs do not have access to the DER information such as capacity, key parameters, and consumption pattern. Note that $p_{h,\tau}^a$ and $q_{h,\tau}^a$ are continuous variables in constraints (2) and (3), which is derived from the simplified duty-cycle-based DER models. In practice, behind-the-meter DERs could have discrete consumption characteristics associated with the on/off status. This issue will be handled in the real-time dispatch model.

The preferred DER schedules can be obtained by solving model (1)-(5). Moreover, the preferred DER schedules may be modified to increase/decrease their consumption at selected time intervals to accommodate system restoration needs while still respecting the comfort constraint (4). The feasible DER scheduling range is denoted as the DER flexibility. An intuitive approach commonly used to estimate DER flexibility is to calculate the maximum and minimum DER consumption schedules based on constraints (2)-(5). The DER flexibility obtained by this intuitive approach cannot accurately reflect the time correlations of DER schedules. Therefore, the techniques of the present disclosure estimate the DER flexibility by using an energy-based method to account for the time correlation illustrated in constraint (5).

For a given HEMS, h, its maximum and minimum energy consumption from $T_{st}$ to $\tau$ ($\forall \tau \in [T_{st}, T_{en}]$), denoted as $e_{h,\tau}^{max}$ and $e_{h,\tau}^{min}$, can be obtained by solving (6) and (7), respectively:

$$\text{Max } e_{h,\tau}^{max} = \sum_{T=T_{st}}^{\tau} \sum_{a \in \Omega_{A_h}} p_{h,\tau}^a \mid \text{s.t. (2)-(5)} \quad (6)$$

$$\text{Min } e_{h,\tau}^{min} = \sum_{T=T_{st}}^{\tau} \sum_{a \in \Omega_{A_h}} p_{h,\tau}^a \mid \text{s.t. (2)-(5)} \quad (7)$$

Based on the obtained $e_{h,\tau}^{max}$ and $e_{h,\tau}^{min}$ the flexibility range of HEMS h throughout the MPC horizon $[T_{st}, T_{en}]$ can be described by the following constraint:

$$e_{h,\tau}^{min} \le \sum_{T=T_{st}}^{\tau}\sum_{a\in\Omega_{A_h}} p_{h,\tau}^a \le e_{h,\tau}^{max} \quad (8)$$

Note that the DER capacity limit (2) is still valid to guarantee the feasibility of the developed DER flexibility range. To accommodate the customers' privacy protection requirement, the original constraint (2) will be reformulated as:

$$p_{h,\tau}^{min} \le \sum_{a\in\Omega_{A_h}} p_{h,\tau}^a \le p_{h,\tau}^{max} \quad (9)$$

where $e_{h,\tau}^{max}$ and $e_{h,\tau}^{min}$ will be calculated by adding the limits of individual DERs (i.e., $e_{h,\tau}^{a,max}$ and $e_{h,\tau}^{a,max}$).

The feasibility of this energy-based method is proved below.

Theorem: The feasible region based on the intuitive approach is a proper subset of the feasible region based on the energy-based method described below.

Proof: Denote the feasible regions based on the intuitive approach and the proposed energy-based method as $\mathcal{H}^I$ and $\mathcal{H}^{II}$, respectively. If $\mathcal{H}^I$ is a proper subset of $\mathcal{H}^{II}$, i.e., $\mathcal{H}^I \subseteq \mathcal{H}^{II}$, $\mathcal{H}^I$ must be a subset of $\mathcal{H}^{II}$ and does not equal $\mathcal{H}^{II}$. For any feasible solution $p_{h,\tau}^a \in \mathcal{H}^I$, constraint (2) is accommodated VT. Thus, the following constraint holds:

$$\sum_{t=T_{st}}^{\tau}\sum_{a\in\Omega_{A_h}} p_{h,t}^{a,min} \le \sum_{t=T_{st}}^{\tau}\sum_{a\in\Omega_{A_h}} p_{h,\tau}^a \le \sum_{t=T_{st}}^{\tau}\sum_{a\in\Omega_{A_h}} p_{h,t}^{a,max} \quad (P1)$$

Note that (P1) is equivalent to (8). Hence, $p_{h,\tau}^a$ satisfies both (2) and (8). Therefore, $p_{h,\tau}^a \in \mathcal{H}^{II}$. Thus, $\mathcal{H}^I \subseteq \mathcal{H}^{II}$ is proved.

On the contrary, select two adjacent time slots $T_1$, $\tau_2$ and let $\tau_2 = \tau_1+1$. Construct a solution $p_{h,\tau}^a$ based on the following (P2)-(P4). Apparently, $\exists \Delta x > 0$ that guarantees $p_{h,\tau}^a$ accommodates (8) as well. Therefore, $p_{h,\tau}^a$ is feasible according to the proposed energy-based method, i.e., $p_{h,\tau}^a \in \mathcal{H}^{II}$.

$$p_{h,\tau}^a = p_{h,\tau}^{a,min}, \forall \tau, \tau \ne \tau_1, \tau \ne \tau_2 \quad (P2)$$

$$p_{h,\tau_1}^a = p_{h,\tau_1}^{a,min} + \Delta x \quad (P3)$$

$$p_{h,\tau_2}^a = p_{h,\tau_2}^{a,min} - 0.5\Delta x \quad (P4)$$

However, $P_{i,d,\tau}^{D(II)}$ is not a feasible solution according to the intuitive approach because constraint (2) is violated at time $\pi_2$, i.e., $p_{h,\tau}^a \notin \mathcal{H}^I$. As a result, $\mathcal{H}^I$ does not equal $\mathcal{H}^{II}$ and $\mathcal{H}^I \subseteq \mathcal{H}^{II}$ is proved.

In summary, each HEMS will use $\{e_{h,\tau}^{min}, e_{h,\tau}^{max}, p_{h,\tau}^{min}, p_{h,\tau}^{max}\}$ to represent its flexibility. Combined with the preferred schedule $\{p_{h,\tau}^*\}$, the confidential information of the customers-such as parameters of behind-the-meter DERs and comfort preferences-will not be exposed to the DSO or other HEMSs.

After an outage, distribution system restoration may be achieved through reconfiguring the system into several islands. In general, the distribution system reconfiguration problem considers only balanced systems and may be solved using mathematical programming methods and integer variables. In the techniques of the present disclosure, where MPC is employed and the three-phase unbalanced system is considered, the computational performance of conventional approaches may be insufficient. Therefore, in some examples, the three-phase distribution system restoration model may be linearized using the method developed in L. Gan and S. H. Low, "Convex relaxations and linear approximation for optimal power flow in multiphase radial networks," published in Power Systems Computation Conference, Wroclaw, Poland, August 2014 (hereinafter "Gan et al."), the relevant portions of which are incorporated herein by reference for such purposes. In such examples, the distribution system reconfiguration solution may be solved through a heuristic process which will be described below. The three-phase linearized system restoration model is described as:

$$\text{Min} \sum_{t=T_{st}}^{T_{en}} \sum_{n\in\Omega_N} \left[\gamma_n^G P_{n,\tau}^G + \gamma_n^S \sum_{\phi\in\Psi_n} \left(P_{n,\tau}^{S,\phi} + Q_{n,\tau}^{S,\phi}\right)\right] + \\ \sum_{t=T_{st}}^{T_{en}} \sum_{h\in\Omega_H} \left(\gamma_h^V P_{h,\tau}^V + \gamma_h^W P_{h,\tau}^W\right) \quad (10)$$

$$\text{s.t. } P_{n,\tau}^{G,min} \le P_{n,\tau}^G \le P_{n,\tau}^{G,max} \quad (11)$$

$$Q_{n,\tau}^{G,min} \le Q_{n,\tau}^G \le Q_{n,\tau}^{G,max} \quad (12)$$

$$P_{n,\tau}^G = \sum_{\phi\in\Psi_n} P_{n,\tau}^{G,\phi}, Q_{n,\tau}^G = \sum_{\phi\in\Psi_n} Q_{n,\tau}^{G,\phi} \quad (13)$$

$$P_{n,\tau}^{G,\phi} - P_{n,\tau}^{D,\phi} + P_{n,\tau}^{S,\phi} = \sum_{nm\in\Omega_L} \left(P_{nm,\tau}^\phi - P_{mn,\tau}^\phi\right) \quad (14)$$

$$Q_{n,\tau}^{G,\phi} - Q_{n,\tau}^{D,\phi} + Q_{n,\tau}^{S,\phi} = \Sigma_{nm\in\Omega_L}\left(Q_{nm,\tau}^\phi - Q_{mn,\tau}^\phi\right) \quad (15)$$

$$P_{n,\tau}^{D,\phi} = P_{n,\tau}^{D,fix,\phi} + \Sigma_{h\to\langle n,\phi\rangle} P_{h,\tau} \quad (16)$$

$$Q_{n,\tau}^{D,\phi} = Q_{n,\tau}^{D,fix,\phi} + \Sigma_{h\to\langle n,\phi\rangle} Q_{h,\tau} \quad (17)$$

$$0 \leq P_{n,\tau}^{S,\phi} \leq P_{n,\tau}^{D,\phi}, 0 \leq Q_{n,\tau}^{S,\phi} \leq Q_{n,\tau}^{D,\phi} \quad (18)$$

$$V_{n,\tau}^{\phi} - V_{m,\tau}^{\phi} = 2\left(r_{nm}^{\phi\phi} P_{nm,\tau}^{\phi} + x_{nm}^{\phi\phi} Q_{nm,\tau}^{\phi}\right) - \quad (19)$$
$$2\vartheta_1\left(r_{nm}^{\phi\phi'} P_{nm,\tau}^{\phi'} + r_{nm}^{\phi\phi''} P_{nm,\tau}^{\phi''} + x_{nm}^{\phi\phi'} Q_{nm,\tau}^{\phi'} + x_{nm}^{\phi\phi''} Q_{nm,\tau}^{\phi''}\right) -$$
$$2\vartheta_2\left(x_{nm}^{\phi\phi'} P_{nm,\tau}^{\phi'} - x_{nm}^{\phi\phi''} P_{nm,\tau}^{\phi''} - r_{nm}^{\phi\phi'} Q_{nm,\tau}^{\phi'} + r_{nm}^{\phi\phi''} Q_{nm,\tau}^{\phi''}\right)$$

$$V_n^{\phi,min} \leq V_{n,\tau}^{\phi} \leq V_n^{\phi,max} \quad (20)$$

$$P_{h,\tau}^W \geq P_{h,\tau} - p_{h,\tau}^* \quad (21)$$

$$P_{h,\tau}^W \geq p_{h,\tau}^* - P_{h,\tau} \quad (22)$$

$$p_{h,\tau}^{min} \leq P_{h,\tau} \leq p_{h,\tau}^{max} \quad (23)$$

$$e_{h,\tau}^{min} - P_{h,\tau}^V \leq \sum_{T=T_{st}}^{\tau} P_{h,T} \leq e_{h,\tau}^{max} + P_{h,\tau}^V \quad (24)$$

$$P_{h,\tau}^V \geq 0 \quad (25)$$

The objective function (10) minimizes the weighted sum of the generation cost, the load-shedding penalty, the HEMS desired schedule deviation penalty, and the HEMS flexibility range violation penalty. In (10), $\gamma_n^G$ indicates the DER generation cost and $\gamma_n^S$ denotes load shedding penalty. To reduce renewable energy curtailment during restoration, negative generation cost $\gamma_n^G$ may be assigned to renewable DERs and positive $\gamma_n^G$ may be assigned to conventional generators such as diesel generators. Besides, load restoration is typically the most important target during distribution system restoration, thus $\gamma_n^S \gg |\gamma_n^G|$. In this way, renewable energy will be prioritized for restoring load supply. If renewable energy generation is insufficient, conventional generators will be implemented to reduce load curtailment. $\gamma_n^V$ and $\gamma_n^W$ denote the penalty coefficients for HEMS comfort deviations and are decided by the DSO-HEMS collaboration program described above.

The utility-scale DER generation outputs are constrained in (11) and (12). Equation (13) calculates the power output of a utility-scale DER by totaling its generation at all phases. The three-phase nodal injection equations are represented by (14) and (15), where the power losses are ignored for simplicity. The nodal power loads are calculated by (16) and (17), where $h \to (n, \phi)$ indicates that household $h$ is connected to phase $\phi$ at bus $n$. Constraint (18) ensures that load shedding cannot exceed the total demand. The three-phase voltage drop is calculated by a linearized equation (19) based on Gan et al. In (19), $\phi'$ and $\phi''$ denote the phase that leads and lags $\phi$ by $2\pi/3$, respectively. Moreover, $\varepsilon_1$ and $\vartheta_2$ denote $\cos(2\pi/3)$ and $\sin(2\pi/3)$, respectively. The voltage magnitude is constrained by (20).

Constraints (21)-(25) are introduced to model the flexibility of behind-the-meter DERs. The optimized HEMS schedule may deviate from its preferred schedule and the deviation $P_{h,\tau}^W$ is calculated by (21) and (22). Note that $P_{h,\tau}^W$ is non-negative, which is guaranteed by (21) and (22). Constraint (23) ensures that the power schedule falls within the capacity limit of the HEMS concerned. The flexibility of behind-the-meter DERs is constrained by (24). If the cumulative energy consumption from $T_{st}$ to $\tau$ is not within $[e_{h,\tau}^{min}, e_{h,\tau}^{max}]$, the comfort preference cannot be satisfied, and a positive $P_{h,\tau}^V$ will be obtained by (24) to penalize the DSO. Note that $P_{h,\tau}^V$ is also non-negative, which is enforced by (25).

In summary, the distribution system restoration model (10)-(25) is a linear programming model that employs the flexibility of DERs to satisfy uncontrollable load supply throughout the MPC horizon from $T_{st}$ to $T_{en}$. Note that the DSR model optimizes the schedules of both utility-scale DERs and individual HEMS. Ideally, each utility-scale DER and HEMS will follow its optimal power schedule, respectively denoted as $P_{n,\tau r}^{G*}$ and $P_{h,\tau}^*$, in the real-time dispatch. However, because of inevitable forecast errors introduced by the intermittency of renewable energy sources and arbitrary demand behaviors, the optimal MPC solution may be invalid in real-time operation, and thus extra measures may be necessary to maintain reliable power supply after an outage.

The three-phase distribution system power flow model does not consider topological changes through switch operations. Typically, mathematical programming approaches will be employed to reconfigure distribution systems with the help of binary variables denoting the status of switches. For instance, in the present example, a mathematical programming approach may involve the introduction of binary decision-making variables as follows:

$\kappa_n$ Binary variable of bus restoration status
$\xi_{em}$ Binary variable of line restoration status
$S_{nm}^{\phi,max}$ Capacity of distribution line
M A sufficiently large positive scalar Accordingly, the nodal power balance (11)-(12) and voltage constraint (20), above, would be modified as follows:

$$\kappa_n P_{n,\tau}^{G,min} \leq P_{n,\tau}^G \leq \kappa_n P_{n,\tau}^{G,max} \quad (11^*)$$

$$\kappa_n Q_{n,\tau}^{G,min} \leq Q_{n,\tau}^G \leq \kappa_n Q_{n,\tau}^{G,max} \quad (12^*)$$

$$\kappa_n V_n^{\phi,min} \leq V_{n,\tau}^{\phi} \leq \kappa_n V_n^{\phi,max} \quad (20^*)$$

Additional constraints would need to be added to constrain the line flow, as well:

$$(P_{nm,\tau}^{\phi})^2 + (Q_{nm,r}^{\phi})^2 \leq \xi_{nm}(S_{nm}^{\phi,max})^2$$

$$\kappa_n M \geq \Sigma_{\forall nm \in \Omega_L} \xi_{nm}, \forall n \in \Omega_N$$

$\kappa_n \in \{0,1\}, \forall n \in \Omega_N$ $\xi_{nm} \in \{0,1\}, \forall nm \in \Omega_L$ Note that $\kappa_n$ and $\xi_{nm}$ are not time-variant according to the above constraints, which indicates that the restoration islands remain unchanged throughout the considered horizon. This is because a stable topology is needed to ensure a reliable and sustainable power supply, which is desirable after a power outage.

In the mathematical programming approach, topology constraints should be enforced to guarantee the restored distribution systems are operating in radial fashion.

$\xi_{nm}^F$ Lines that have suffered from faults/failures
$\mu_{nm}^+, \mu_{nm}^-$ Direction of virtual flow in distribution lines
$\lambda_n$ Binary variable indicating virtual flow injection
$\mu_{n,\tau}^{VS}, p_{n,\tau}^{VD}$ Virtual power generation and consumption
$p_{nm,\tau}^V$ Virtual power flow A new set of radiality constraints is developed by modifying the traditional spanning-tree constraints to ensure the radiality of a reconfigured distribution system with a variable number of islands. The traditional spanning-tree constraints can be described as:

$$\mu_{nm}^+ + \mu_{nm}^- = \gamma_{nm}, \forall nm \in \Omega_L \quad \text{(MP0)}$$

$$\mu_{nm}^+ \geq 0, \mu_{nm}^- \geq 0, \forall nm \in \Omega_L \quad \text{(MP1)}$$

$$\Sigma_{m \in \Omega_N} \mu_{nm}^+ =, \forall n \in \Omega_{CG} \cup \Omega_{RG} \quad \text{(MP2)}$$

$$\Sigma_{m \in \Omega_N} \mu_{nm}^+ = 1, \forall n \in \Omega_N \setminus \{\Omega_{CG} \cup \Omega_{RG}\} \quad \text{(MP3)}$$

Equation (MP0) constrains that virtual flow cannot flow through opened distribution lines. The virtual flow directions are non-negative as shown in (MP1). Constraint (MP2) enforces that the source buses have no virtual flow injection. For other buses, virtual flow is injected from a unique feeder as constrained in (MP3).

However, the spanning tree constraints (MP0)-(MP3) have the following limitations: (1) all the buses in the distribution system should be restored, which does not always work when power generation capacity is not sufficient to supply all the loads; and (2) each divided island has a unique source bus, i.e., the number of restoration islands equals the number of source buses.

For the first limitation, unrestored load buses should be enabled when optimizing the DSR. If a bus is not restored, no virtual flow will be injected into that bus as shown in (MP4):

$$\Sigma_{m \in \Omega_N} \mu_{nm}^+ = \kappa_n, \forall n \in \Omega_N \setminus \{\Omega_{CG} \cup \Omega_{RG}\} \quad \text{(MP4)}$$

Moreover, the number of islands should be a variable to overcome the second limitation. Referring to graph theory, if a distribution system should be divided into $N^I$ radial subnetworks, the following relationship between the number of connected buses and the number of restored lines can be established:

$$\Sigma_{n \in \Omega_N} \kappa_n - \Sigma\Sigma_{nm \in \Omega_L} \xi_{nm} = N^I \quad \text{(MP5)}$$

As for a distribution system with $N^S$ source buses at time t, the number of formulated islands should not exceed the number of source buses as shown in (MP6).

$$1 \leq N^I \leq N^S \quad \text{(MP6)}$$

Typically, substations and buses with large controllable generation assets are regarded as the source buses to provide power supply and maintain stability. Nowadays, inverter-based DERs may also have the grid-forming capability with appropriate control strategies. Therefore, the buses of substations and all utility-managed DERs are assumed to be candidate source buses. If a DER does not have the grid-forming capability, it will be excluded from $\Omega_{CG} \cup \Omega_{RG}$. Aggregator-managed DERs are not included because their capacities are generally limited.

To accommodate the possibility of integrating multiple source buses into one island, an ancillary binary variable $\lambda_n$ is introduced to modify the original spanning tree constraints:

$$\Sigma_{m \in \Omega_N} \mu_{nm}^+ = \lambda_n, \forall n \in \Omega_{CG} \cup \Omega_{RG} \quad \text{(MP7)}$$

$$\Sigma_{n \in \Omega_N} \lambda_N = N^S - N_I, \forall n \in \Omega_{CG} \cup \Omega_{RG} \quad \text{(MP8)}$$

$$\lambda_n \in \{0,1\}, \forall n \in \Omega_{CG} \cup \Omega_{RG} \quad \text{(MP9)}$$

Compared to (MP2), virtual flow injection is enabled at source buses with (MP7). If $N^I$ islands are formulated, the number of source buses with virtual flow injection is calculated by (MP8). Combining (MP7)-(MP9), the modified spanning tree constraints allow a variable number of islands, and each island may contain multiple source buses. Note that the virtual flow directions in the modified (MP7)-(MP9) no longer indicate the directions of actual power flows in the distribution system.

An additional constraint is introduced to accommodate possible failures in distribution lines. Constraint (MP10) enforces that distribution lines that are suffering from faults will not be restored.

$$\xi_{nm} \leq 1 - \xi_{nm}^F, \forall nm \in \Omega_L \quad \text{(MP10)}$$

However, the modified spanning tree constraints alone do not guarantee the radiality at all islands, especially with multiple DERs acting as source buses. In the present disclosure, virtual flow balance is introduced to guarantee the connectivity within each divided island as described below:

$$p_{n,\tau}^{VS} - p_{n,\tau}^{VD} = \sum_{nm \in \Omega_L} \left( p_{nm,\tau}^V - p_{mn,\tau}^V \right) \quad \text{(MP 11)}$$

$$0 \leq p_{n,\tau}^{VS} \leq (1-\lambda_n)M \quad \text{(MP12)}$$

$$p_{n,\tau}^{VD} \geq \kappa_n \quad \text{(MP13)}$$

$$0 \leq p_{nm,\tau}^V \leq \xi_{nm}M \quad \text{(MP14)}$$

Equation (MP11) denotes the nodal virtual power injection balance. Constraint (MP12) guarantees that only the source buses with no virtual flow injections can supply virtual power. Constraint (MP13) ensures that all restored buses have a virtual power load. Constraint (MP14) enforces that virtual power can only flow in restored lines. The big-M method is also employed in (MP12) and (MP14), where M equals the total number of buses in the system.

With the complementary constraints (MP11)-(MP14), the connectivity and radiality of every island can be ensured. In summary, the modified radiality constraints contain (MP0)-(MP1) and (MP4)-(MP14).

Compared with existing radiality constraints, the provided constraints can accommodate a variable number of radial islands to account for system conditions and DER capabilities while introducing a minimum number of binary variables. The required binary variables based on these constraints are $\kappa_n$ ($\forall n \in \Omega_N$), $\xi_{nm}$ ($\forall nm \in \Omega_L$), and $\lambda_n$ ($\nabla \forall n \in \Omega_{CG} \in \Omega_{RG}$). Hence, the number of required binary variables of the mathematical programming method is $|N|+$

|L|+|S|, where |N|, |L|, and |S| denote the number of buses, number of lines, and the number of sources buses, respectively.

The introduction of binary variables can significantly increase the computational burden, however. In accordance with the provided techniques (i.e., FIG. 2), where the restoration planning model will be solved repeatedly (iteratively) using the MPC technique, the computational efficiency plays an important role in guaranteeing the feasibility of the proposed strategy. Therefore, the techniques described herein utilize a fast heuristic algorithm provided in Q. Peng, Y. Tang, and S. H. Low, "Feeder reconfiguration in distribution networks based on convex relaxation of OPF," published in IEEE Trans. Power Syst., vol. 30, no. 4, pp. 1793-1804, July 2015 (hereinafter "Peng et al."), the relevant portions of which are incorporated herein by reference for such purposes. This fast heuristic algorithm is employed and integrated into the adaptive restoration planning model to efficiently obtain switch configurations.

Figure 4:
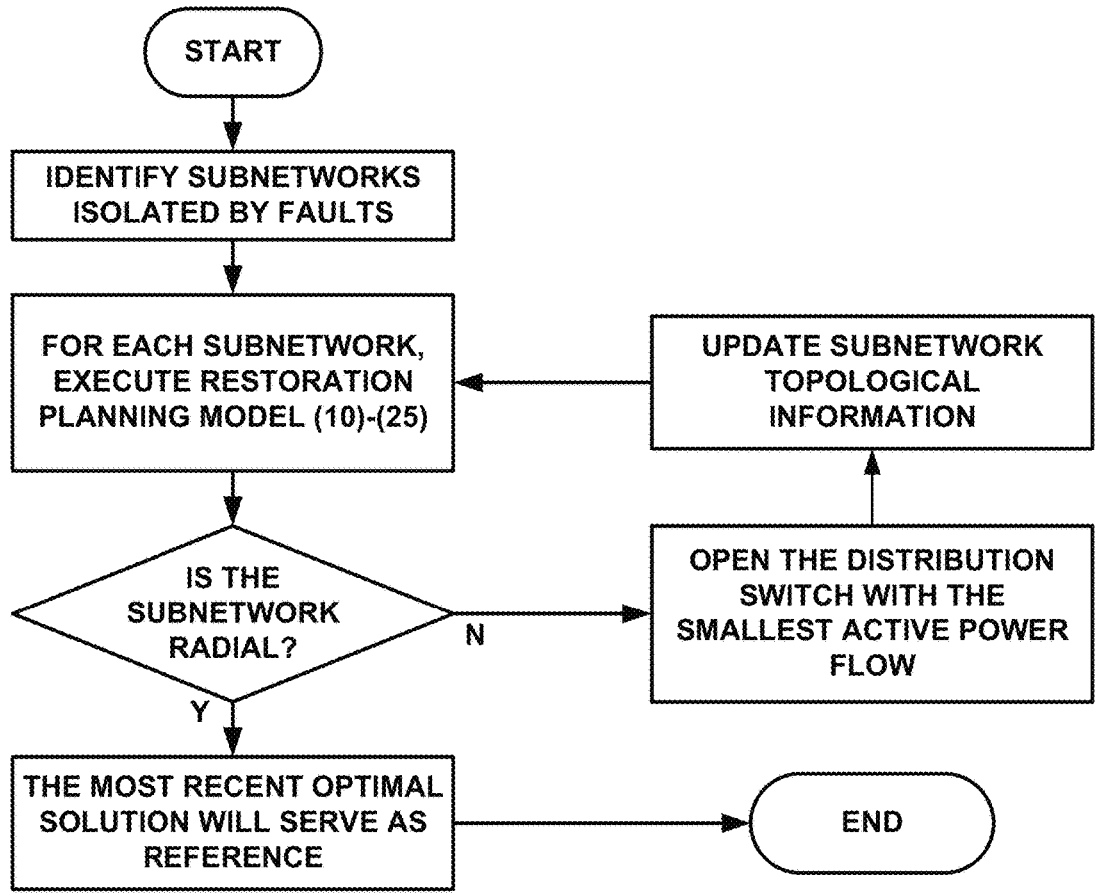
FIG. 4 is a flow diagram illustrating example operations for network reconfiguration during power system restoration incorporating diverse distributed energy resources, in accordance with one or more aspects of the present disclosure.

FIG. 4 is a flow diagram illustrating example operations for network reconfiguration during power system restoration incorporating diverse distributed energy resources, in accordance with one or more aspects of the present disclosure. In addition to reducing computational burden, the employed heuristic algorithm can effectively handle extreme outage scenarios such as ill-conditioned network and loss of parts of the network as the restoration planning model (10)-(25) will be executed at each isolated subnetwork. A detailed description of the fast heuristic algorithm can be found in Peng et al. and will not be further discussed here.

As shown in the example of FIG. 3, each MPC interval (i.e., each of durations 304) is further divided into $n_t$ real-time intervals (i.e., durations 306) to handle the forecast error and expected fluctuations within a single MPC interval. The optimized MPC schedules—i.e. $p_{n,\tau}^{G*}$ and $P_{h,\tau}^*$—will be employed as reference points for DSOs and HEMS in real-time operation, respectively. Thus, as shown in FIG. 2, the DSO will provide the optimized schedule, via transmission 204, to participating HEMSs.

In real-time, the DERs will be solely controlled by their corresponding HEMS for privacy protection. Because $P_{h,\tau}^*$ is the power consumption reference of an entire household, each HEMS must control the schedules of its behind-the-meter DERs to match the total consumption reference in real-time. If the HEMS fails to match the received reference schedule, it might be penalized according to the program to which it subscribed for putting extra burden on the DSO to maintain real-time power balance.

As discussed previously, the rewards of participating demand response programs are fixed payments and do not affect optimization models. In terms of penalties, the following two are introduced as part of the techniques described herein: (i) If the difference between $P_{h,\tau}^*$ and the total HEMS consumption, $\Sigma a \in \Omega_{A_h} p_{h,\tau}^a$, at any real-time interval $\omega$, is larger than an acceptable threshold, $\eta$, the HEMS is subject to penalty. (ii) The HEMS will be penalized for the deviation of total real-time energy consumption and reference energy consumption during the MPC interval $\Delta T$—i.e., the HEMS will pay for the difference between $P_{h,\tau}^* \Delta T$ and $\Sigma \omega \Sigma a \in \Omega_{A_h} p_h^a, {_\omega}\Delta t$.

Based on these two penalties, the real-time control model of DERs can be described as:

$$\beta_h^P c_{h,\omega}^P + \beta_h^e c_{h,\omega}^e + \sum_{b \in \Omega_{B_h}} \beta_h^b \|s_{h,\omega}^b - s_{h,\omega}^{b,pre}\|_2^2 \quad (26)$$

$$\text{s.t. } u_{h,\omega}^a p_{h,\omega}^{a,min} \le p_{h,\omega}^a \le u_{h,\omega}^a p_{h,\omega}^{a,max} \quad (27)$$

$$u_{h,\omega}^a q_{h,\omega}^{a,min} \le q_{h,\omega}^a \le u_{h,\omega}^a q_{h,\omega}^{a,max} \quad (28)$$

$$s_{h,\omega}^{b,min} \le s_{h,\omega}^b \le s_{h,\omega}^{b,max} \quad (29)$$

$$s_{h,\omega}^b = s_{h,\omega-1}^b + \sum_{a \to b} \delta_h^a p_{h,\omega}^a \Delta t + c_{h,\omega}^b \Delta t \quad (30)$$

$$c_{h,\omega}^P \ge \sum_{a \in \Omega_{A_h}} p_{h,\omega}^a - (1+\eta) P_{h,\tau}^*, \text{ if } P_{h,\tau}^* \ge 0 \quad (31)$$

$$c_{h,\omega}^P \ge (1-\eta) P_{h,\tau}^* - \sum_{a \in \Omega_{A_h}} p_{h,\omega}^a, \text{ if } P_{h,\tau}^* \ge 0 \quad (32)$$

$$c_{h,\omega}^P \ge \sum_{a \in \Omega_{A_h}} p_{h,\omega}^a - (1-\eta) P_{h,\tau}^*, \text{ if } P_{h,\tau}^* < 0 \quad (33)$$

$$c_{h,\omega}^P \ge (1+\eta) P_{h,\tau}^* - \sum_{a \in \Omega_{A_h}} p_{h,\omega}^a, \text{ if } P_{h,\tau}^* < 0 \quad (34)$$

$$c_{h,\omega}^e \ge (n_t - \omega + 1)^{-1} \sum_{\tau=1}^{\omega} \left( \sum_{a \in \Omega_{A_h}} p_{h,\sigma}^a - P_{h,\tau}^* \right) \quad (35)$$

$$c_{h,\omega}^e \ge (n_t - \omega + 1)^{-1} \sum_{\tau=1}^{\omega} \left( P_{h,\tau}^* - \sum_{a \in \Omega_{A_h}} p_{h,\sigma}^a \right) \quad (36)$$

$$\sum_{\tau=\omega-1-\omega_h^{a,off}}^{\omega-1} \left(1 - u_{h,\sigma}^a\right) \ge \omega_h^{a,off} \left(u_{h,\omega}^a - u_{h,\omega-1}^a\right) \quad (37)$$

$$\sum_{\tau=\omega-1-\omega_h^{a,on}}^{\omega-1} u_{h,\sigma}^a \ge \omega_h^{a,on} \left(u_{h,\omega-1}^a - u_{h,\omega}^a\right) \quad (38)$$

$$u_{h,\omega}^a \in \{0,1\} \quad (39)$$

The objective function (26) minimizes the weighted sum of two real-time penalties and the deviation from preferred comfort settings. In (26), $\beta_h^P$, $\beta_h^e$, and $\beta_h^b$ are the weighting factors for the deviation of power, deviation of consumed/generated energy for the corresponding period, and the deviation of preferred comfort settings, respectively. $\beta_h^P$ and $\beta_h^e$ are decided by the DSO-HEMS collaboration program and indicate the actual financial penalties for the HEMS if it fails to meet the received setpoints. $\beta_h^b$ indicates the preferences of the HEMS and may vary from one HEMS to another. If a customer prioritizes the economic profit (or comfort), $\beta_h^b$ will be assigned a small (or large) value, e.g., $\beta_h^b \to 0$ ($\beta_h^b \to \infty$).

Constraints (27)-(30) are slightly different from (2)-(5) due to the introduction of the Boolean DER control signal, $u_{h,\omega}^a$. The difference between the real-time power schedule and the reference power is calculated by (31)-(34). Note that either (31)-(32) or (33)-(34) will be implemented depending on the value of P. Because $P_t$ is optimized by the DSO and is known to the HEMS when solving the real-time control model, constraints (31)-(34) are still linear constraints. However, the total energy consumption deviation cannot be obtained before solving all $n_t$ time intervals. Hence, constraints (35)-(36) are employed to estimate the cost of the energy mismatch. In (35)-(36), the coefficient $(n_t-\omega+1)^{-1}$ is introduced to assign different weights based on the current real-time interval. At the beginning of the MPC interval, $(n_t-\omega+1)^{-1}$ is small, indicating that the energy mismatch for the first $\omega$ real-time intervals can be easily compensated in the remaining real-time intervals. On the other hand, $(n_t-\omega+1)^{-1}$ is increasing when approaching the end of the MPC interval, meaning that mitigating the same amount of energy mismatch will require more effort because of the limited remaining time. Hence, constraints (35)-(36) can guarantee a flexible control schedule for DERs at the beginning real-time intervals and ensure a minimal energy consumption deviation for the entire MPC interval.

The Boolean control signal, $u_{h,\omega}^a$, is constrained by (37)-(39). In practice, customers may not prefer to frequently alter the on/off status of DERs. To capture this characteristic, it can be assumed that each household appliance has a minimum on/off time and the control signal $u_{h,\omega}^a$ can follow the similar principles used to constrain the on/off of thermal power plants in unit commitment models. In this way, the appliances will not be turned on (or off) before the minimum off- (or on-) time is met. When solving the real-time model at time $\omega$, the only variable in constraints (37) and (38) is $u_{h,\omega}^a$. Previous DER control signals, such as $u_{h,\omega-1}^a$, are known parameters. Compared with the simplified duty cycle model mentioned above, which assumes that DER consumption can be continuously controlled, more realistic DER controls can be obtained by solving the proposed real-time control model with $u_{h,\omega}^a$ and (37)-(39).

The optimal solution of the real-time model (26)-(39), denoted as $p_{h,\omega}^{a\oplus}$, is the final DER setpoint that will be implemented. At real-time interval $\omega$, the difference between $P_{h,\omega}^*$, and the total HEMS power consumption $p_{h,\omega}^\oplus$, which is defined as $$p_{h,\omega}^\oplus := \Sigma_{a \in \Omega_{A_h}} p_{h,\omega}^{a,\oplus},$$

will be managed by the DSO. It is assumed that the DSO can acquire $p_{h,\omega}^\oplus$ from real-time measurements and communication systems as discussed above, and it will not be further elaborated on herein, for brevity.

During real-time operation, the DSO must deal with volatile renewable energy generation, forecast error of uncontrollable demand, and the real-time deviations of HEMS to maintain power balance. It is assumed that the following resources may be available to the DSO in real-time operation: (i) Each conventional DER has a limited regulation capacity that can provide fast ramping up/down in real-time. (ii) Each renewable DER has a small ESS to level off its variable generation output. The small ESS does not participate in the MPC-based DSR model described above.

The DSO may use these resources to mitigate power unbalance in real-time operation. The real-time distribution system dispatch model is described as follows:

$$\text{Min} \sum\nolimits_{h \in \Omega_N} \left( \gamma_n^S P_{n,\omega}^S + \gamma_n^C P_{n,\omega}^{curt} + \gamma_n^{ES} \left\| \rho_{n,\omega}^{ES} - \rho_{n,\omega}^{ES,pre} \right\|_2^2 \right) \quad (40)$$

$$\text{s.t.} \quad P_{n,\tau}^{G*} - P_{n,\tau}^{G,reg} \le P_{n,\omega}^G \le P_{n,\tau}^{G*} + P_{n,\tau}^{G,reg}, \, \forall n \in \Omega_{CG} \quad (41)$$

$$P_{n,\omega}^G = P_{n,\omega}^{G,act} + P_{n,\omega}^{ES,D} - P_{n,\omega}^{ES,C} - P_{n,\omega}^{curt}, \, \forall n \in \Omega_{RG} \quad (42)$$

$$\rho_{n,\omega}^{ES} = \rho_{n,\omega-1}^{ES} + \left( \delta_n^C P_{n,\omega}^{ES,C} - \delta_n^D P_{n,\omega}^{ES,D} \right) \Delta t, \, \forall n \in \Omega_{RG} \quad (43)$$

$$\rho_{n,\omega}^{ES,min} \le \rho_{n,\omega}^{ES} \le \rho_{n,\omega}^{ES,max}, \, \forall n \in \Omega_{RG} \quad (44)$$

$$0 \le P_{n,\omega}^{ES,C} \le P_{n,\omega}^{ES,C,max}, 0 \le P_{n,\omega}^{ES,D} \le P_n^{ES,D,max}, \, \forall n \in \Omega_{RG} \quad (45)$$

$$P_{n,\omega}^{D,\phi} = P_{n,\omega}^{D,fix,\phi} + \sum\nolimits_{h \to \langle n,\phi \rangle} p_{h,\omega}^\oplus \quad (46)$$

$$Q_{n,\omega}^{D,\phi} = Q_{n,\omega}^{D,fix,\phi} + \sum\nolimits_{h \to \langle n,\phi \rangle} q_{h,\omega}^\oplus \quad (47)$$

$$0 \le P_{n,\omega}^{S,\phi} \le P_{n,\omega}^{D,\phi}, 0 \le Q_{n,\omega}^{S,\phi} \le Q_{n,\omega}^{D,\phi} \quad (48)$$

and constraints (12)-(15), (19), and (20)

The objective function (40) minimizes the weighted real-time load-shedding penalty, renewable energy curtailment, and the usage of small ESS that are associated with distributed renewable generators. The generation output of a conventional distributed generator is constrained by (41), indicating that the real-time generation cannot deviate from its reference, $P_{n,\omega}^{G*}$ larger than its regulation capacity, $P_{n,\omega}^{G,reg}$. The generation of a distributed renewable generator is constrained by (42). The real-time dispatch of the ESS is constrained by (43)-(44). The ESS charging and discharging power are constrained by (45). Note that $\rho_{n,\omega-1}^{ES}$ is a known parameter when solving the real-time model at time $\omega$. Constraints (46)-(48) are similar to (16)-(18); however, the HEMS real-time consumption—i.e., $p_{h,\omega}^{\oplus}$ and $q_{h,\omega}^{\oplus}$ are no longer variables in (46)-(48). The distribution system operational constraints (12)-(15), (19), and (20) should also be integrated into the real-time dispatch model. Note that (11) has already been replaced by (41) and (42) in the real-time model.

The MPC-based restoration planning models and real-time dispatch models used by the techniques described herein were developed above. Considering the temporal correlation illustrated in the example of FIG. 3, an example algorithm is designed to integrate restoration planning and real-time control. The detailed operations are listed in Algorithm 1.

Algorithm 1
- 0: The algorithm is initialized if the DSO detects an outage. Service collaboration requests will be sent to HEMSs that subscribed to the restoration program.
- 1: The DSO and HEMSs will each initialize the MPC interval $\tau \leftarrow 1$
- 2: Each HEMS solves its optimization model (1)-(5) over the MPC time horizon $[T_{st}+\tau-1, T_{en}+\tau-1]$, estimates the DER flexibility range based on (6)-(9), and shares the DER flexibility data and its preferred energy schedule with the DSO.
- 3: DSO optimizes distribution system restoration planning model (10)-(25) over the MPC time horizon $[T_{st}+\tau-1, T_{en}+\tau-1]$ based on fault data, DER generation forecasts, and DER flexibility data shared by HEMSs. The reconfiguration algorithm described in FIG. 4 will be implemented to ensure radiality.
- 4: DSO sends the optimal solution of MPC interval T to utility-owned DERs and HEMSs as the operating setpoints.
- 5: Initialize real-time interval $\omega \leftarrow 1$ for the current MPC interval $\tau$
- 6: Each HEMS optimizes its real-time dispatch at real-time interval $\omega$ based on model (26)-(39) and received setpoints for MPC interval $\tau$.
- 7: DSO monitors system status at real-time interval $\omega$ and deploys necessary control measures based on the model developed in Section IV.B.
- 8: If $\omega < n_t$, the DSO and HEMSs will each return to Operation 6 with $\omega \leftarrow \omega+1$.
  Otherwise, the DSO and HEMSs will each return to Operation 2 with $\tau \leftarrow \tau+1$ As shown in the example of Algorithm 1, operations 1-4 will generate the MPC-based distribution system restoration planning solution and operations 5-7 are employed to finalize the real-time dispatch for both behind-the-meter and utility-scale DERs.

In terms of computational burden, operations 2 and 6 can be performed in parallel because the HEMS models are decoupled. Thus, the computational time for MPC-based restoration planning is the longest HEMS optimization time in operation 2 plus the total time spent in operation 3 for reconfiguration. Similarly, the computational time for the real-time operation is the longest HEMS optimization time in operation 6 plus the time spent in operation 7. Note that operation 7 does not necessarily need the inputs from operation 6. In other words, operations 6 and 7 can be executed in parallel as well. However, it was still assumed that operation 7 will not start before operation 6 calculation is finished when evaluating the computational performance of Algorithm 1.

In Algorithm 1, the distribution system reconfiguration is implemented in operation 3, meaning that line switching operations only occur at the MPC time scale. For example, if a line outage or repair occurs during the restoration process, the network information will be updated at the next MPC interval for topology reconfiguration. This coincides with existing utility practice where frequent line switching is prohibited. Therefore, this disclosure does not consider reconfiguration in the real-time operation stage, although it is readily feasible to integrate the reconfiguration algorithm depicted in FIG. 4 into the real-time operations.

Figure 5:
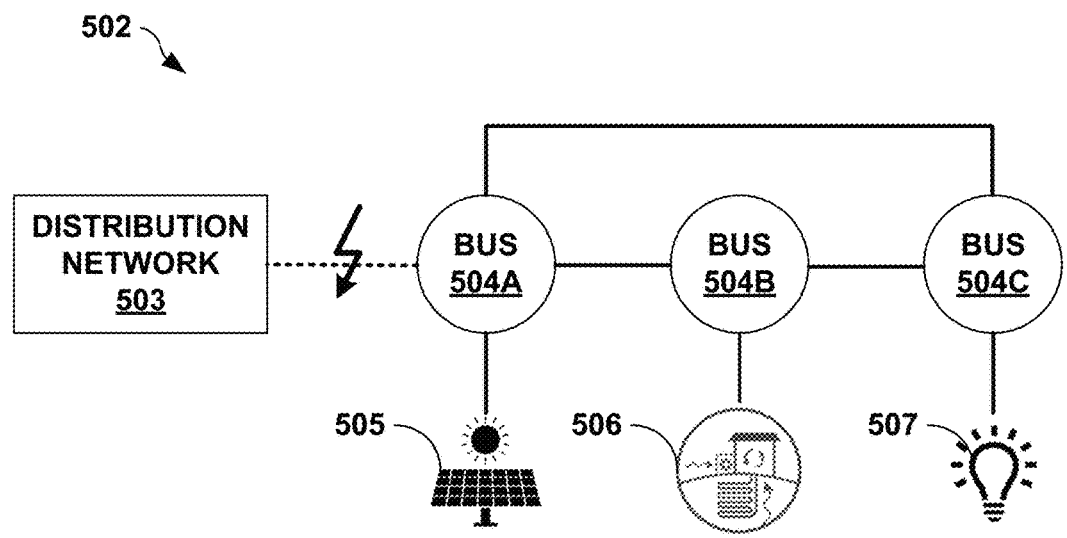
FIG. 5 is a conceptual diagram illustrating an example simplified power network that may employ power system restoration incorporating diverse distributed energy resources, in accordance with one or more aspects of the present disclosure.

FIG. 5 is a conceptual diagram illustrating an example simplified power network (network 502) that may employ power system restoration incorporating diverse distributed energy resources, in accordance with one or more aspects of the present disclosure. A simple demonstration is given below within the context of FIG. 2 to explain the interaction between the various aspects of the techniques described herein. As shown in FIG. 2, network 502 includes distribution network 503 (e.g., the rest of the distribution network) and buses 504A, 504B, and 504C (collectively "buses 504"). Assume that the didactical system with buses 504 is isolated from distribution network 503, as shown in FIG. 5. The isolated system has utility-scale PV installation 505 (connected to bus 504A), HEMS 506 (connected to bus 504B), and uncontrollable load 507 (connected to bus 504C). In this example, uncontrollable load 507 has a fixed 10 kW consumption. The isolated system also contains a loop.

For simplicity, in this didactical example, assume the MPC interval is 1-hour, and the MPC horizon is 2 hours, i.e., two MPC intervals ($\tau_1$ and $\tau_2$) are considered. Each MPC interval is divided into two 30-min real-time intervals ($\omega_1$ and $\omega_2$). The operation of the techniques described herein for power system restoration incorporating diverse distributed energy resources can be described as follows:

- HEMS 506 optimizes its energy consumption as described in Algorithm 1, operation 2. Assume this HEMS respectively needs at least 0 kWh and 2 kWh by the end of $\tau_1$ and $\tau_2$ to maintain its comfort (i.e., $e_1^{min}=0$ kWh and $e_2^{min}=2$ kWh). It is also assumed that the other DER flexibility range constraints such as maximum energy consumption will not bound so they are ignored in this example.
- The DSO (not shown) solves the restoration planning model for the isolated system. One switch, e.g., a switch between buses 504A and 504C, will be opened to maintain radiality according to Algorithm 1, operation 3. Assume the PV generation at $T_1$ and the forecast for $T_2$ are respectively 12 kWh and 11 kWh. The optimal solution is to assign the 2 kWh HEMS demand to the $T_1$ where PV generation is abundant.
- Upon receiving the setpoint for the first MPC interval, HEMS 506 will employ the real-time dispatch model to control its DERs (Algorithm 1, operation 6). Assume the HEMS has one heat pump (not shown) with a rating capacity of 4 kW and the heat pump will be turned on at $\omega_1$. To minimize the energy consumption deviation (i.e., the second penalty in Section IV.A), the heat pump will be turned off at $\omega_2$, thus the total consumption for the first MPC interval remains 2 kWh. In terms of load power deviation, HEMS 506 prefers to discharge (charge) its ESS, if extant, at $\omega_1$ ($\omega_2$). If the rating power of the ESS is 1 kW for both charging and discharging, the HEMS real-time consumptions are 3 kW and 1 kW at $\omega_1$ and $\omega_2$, respectively.
- Since uncontrollable load 507 has a fixed demand of 10 kW, the total real-time loads of the isolated system are 13 kW and 11 kW at $\omega_1$ and $\omega_2$, respectively. The PV generation may fluctuate in real-time, e.g., 12.5 kW at $\omega_1$ and 11.5 kW at $\omega_2$. To maintain real-time balance, utility-scale PV installation 505 needs to deploy its ancillary ESS as described previously (Algorithm 1, operation 7). If the rating power of the ESS is also 1 kW, the real-time balancing model will request the ESS to discharge (charge) 0.5 kW at $\omega_1$ ($\omega_2$). Load shedding or PV curtailment may take place if the ESS cannot fully compensate for the real-time fluctuations.

When $\tau_1$ has passed, the entire procedure will repeat (Algorithm 1, operation 8) to solve for $\tau_2$.

The techniques described herein were tested on a modified IEEE 123-bus test feeder and a real-world unbalanced utility system with 3994 buses. The results of such testing are provided below.

Figure 6:
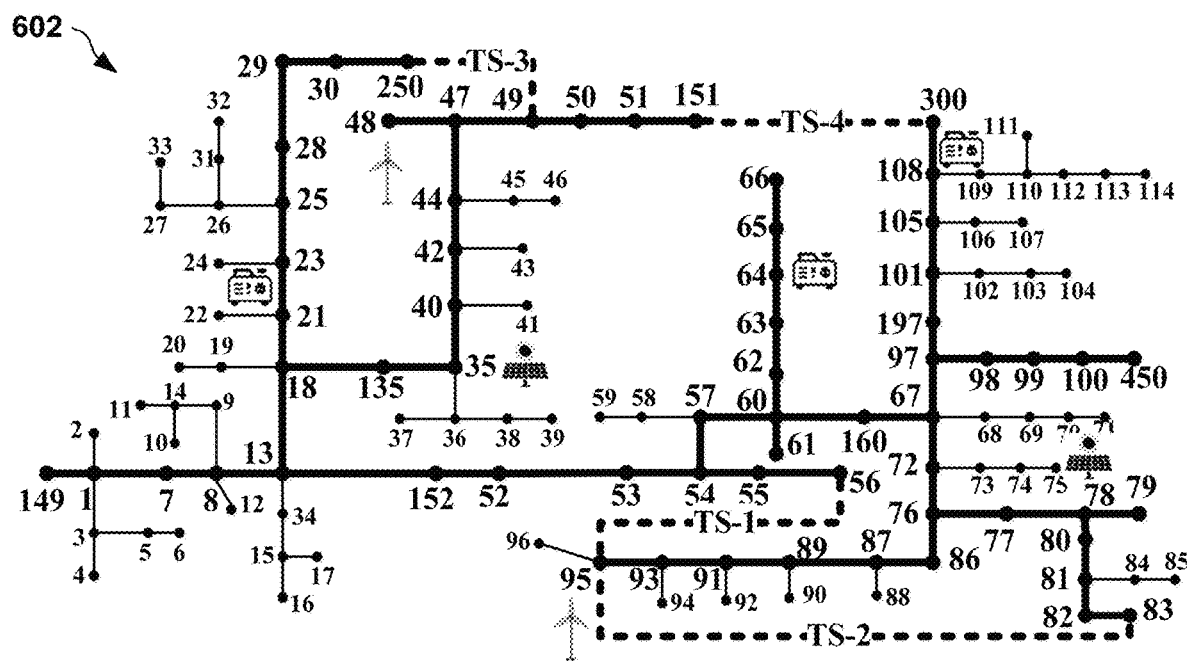
FIG. 6 is a graphical diagram illustrating a modified IEEE 123-bus test feeder that was employed for testing power system restoration incorporating diverse distributed energy resources, in accordance with one or more aspects of the present disclosure.

FIG. 6 is a graphical diagram illustrating a modified IEEE 123-bus test feeder (system 602) that was employed for testing power system restoration incorporating diverse distributed energy resources, in accordance with one or more aspects of the present disclosure. As shown in the example of FIG. 6, system 602 has 123 buses and 126 lines. It was assumed that all three-phase lines and the added four tie switches (indicated by the bolder lines and dashed lines, respectively, in FIG. 6) are switchable. System 602 consists of 200 residential houses and 7 utility-scale DERs. Key parameters of utility-scale DERs and the behind-the-meter DERs in residential houses are summarized in Table I. In this test case, it was assumed that each residential house is managed by a unique HEMS, and each household has a heat pump, a water heater, and an ESS, as listed in Table I. In addition, the household PV penetration level was set to 50%. That is, 100 houses were randomly selected and designated to have installed rooftop PV panels. Moreover, among these selected 100 houses, their rooftop PV capacities were also randomly selected from the three following values: 4 kW, 6 kW, and 8 kW.

TABLE 1

STATISTICS OF THE SIMULATED TEST SCENARIOS

Utility-scale DER data

| Type | Bus | Capacity (MVA) | Regulation capacity (kW) | ESS capacity (kWh) |
|---|---|---|---|---|
| Substation | 149 | 5.0 | N/A | N/A |
| Diesel | 21, 64, 108 | 1.0 | 10.0 | N/A |
| PV | 35, 78 | 0.6 | 6.0 | 10.0 |
| Wind | 48, 95 | 0.8 | 8.0 | 10.0 |

Behind-the-meter DER data

| Type | Capacity (kWh) | Rating power (kW) | Comfort index: comfort range |
|---|---|---|---|
| ESS | 5.0 | 2.5 | State of charge: [10%, 90%] |
| Heat pump | N/A | 3.0 | Indoor temperature: [20° C., 24° C.] |
| Water heater | N/A | 4.0 | Water temperature: [45° C., 50° C.] |

The MPC horizon and MPC interval ($\Delta T$) of adaptive restoration planning were 6 hours and 15 minutes, respectively. The real-time interval ($\Delta t$) was 1 minute. In the distribution restoration stage, the major uncertainties come from renewable DER generation and load variation. When solving the MPC-based planning study, it was assumed the current MPC interval has no forecast error, while the forecast errors in the foreseen MPC intervals follows Gaussian distribution N(0, 2.5%). Although the forecast error of the current MPC interval was ignored, real-time fluctuations still existed. It was also assumed that the real-time deviation from the MPC forecast follows Gaussian distribution N(0, 1.5%).

The distribution system line outage sequences throughout the 6-hour planning period are described in Table II, and the time is given in hh:mm format. In some studies in the literature, the repair coordination is investigated and the repair sequence is treated as a variable. However, the repair coordination is outside of the scope of this disclosure, and thus the repair sequences are given as parameters in Table II. If a repair time is not given in Table II, e.g., line 30-250, the corresponding line was assumed to remain out-of-service at the end of the studied 6-hour horizon. It was also assumed that the substation (Bus 149) has no access to power supply because of outages in the upstream power systems. Note that the DSO was assumed to be not able to foresee future failures and thus only relied on current fault information when optimizing the restoration plan. The proposed four optimization models can be categorized as either linear or quadratic programming models, and they were solved using Cplex in the General Algebraic Modeling System from GAMS Development Corp. (GAMS/CPLEX) on a laptop computer with a quad-core i7 processor from Intel Corp. and 16-GB RAM.

TABLE II

LINE OUTAGE SEQUENCES OF THE SIMULATED TEST SCENARIOS

| Line/switch | Outage time | Repair time (if applicable) |
|---|---|---|
| 13-18 | $T_{st}$ + 00:00 | $T_{st}$ + 05:15 |
| 30-250 | $T_{st}$ + 01:45 | N/A |
| 50-51 | $T_{st}$ + 03:30 | N/A |
| 86-87 | $T_{st}$ + 00:00 | $T_{st}$ + 01:15 |
| 105-108 | $T_{st}$ + 00:00 | N/A |
| 52-152 | $T_{st}$ + 00:00 | $T_{st}$ + 04:15 |
| 67-160 | $T_{st}$ + 00:00 | N/A |

To evaluate the impacts of intermittent renewable DERs (especially solar PV), two test cases were simulated with the same fault settings shown in Table II except for the outage occurrence time (i.e., $T_{st}$):

Case 1: $T_{st}$=6 a.m., the PV generation has an increasing trend for the 6-hour MPC horizon.

Case 2: $T_{st}$=12 p.m., the PV generation has a decreasing trend for the 6-hour MPC horizon.

The linearized unbalanced power flow solution was compared with the full AC power flow benchmark results from OpenDSS distributed by the Electric Power Research Institute. The normalized root-mean-squared error of voltage magnitude, nodal active power injection, and nodal reactive power injection were 0.14%, 0.61%, and 1.54%, respectively. Thus, it was concluded that the employed power flow linearization technique can provide a very good approximation.

According to the computational time calculation discussed above, the average computational time for MPC-based restoration planning and real-time dispatch were 1.46 seconds and 0.95 seconds, respectively. Referring to the 15-min MPC interval and 1-min real-time interval, the techniques described herein were able to successfully meet the computational requirement for post-event restoration decision-making and real-time control.

Figure 7A:
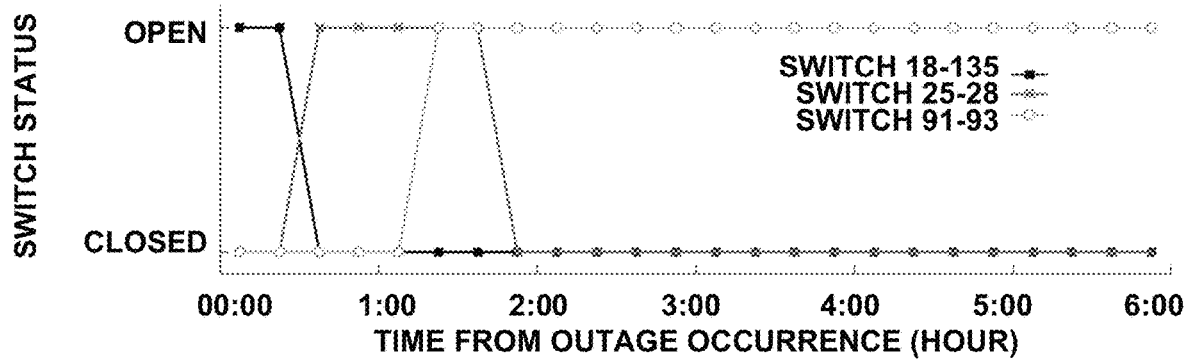
FIGS. 7A and 7B are conceptual diagrams illustrating switch operations during two test cases of power system restoration incorporating diverse distributed energy resources, in accordance with one or more aspects of the present disclosure.
Figure 7B:
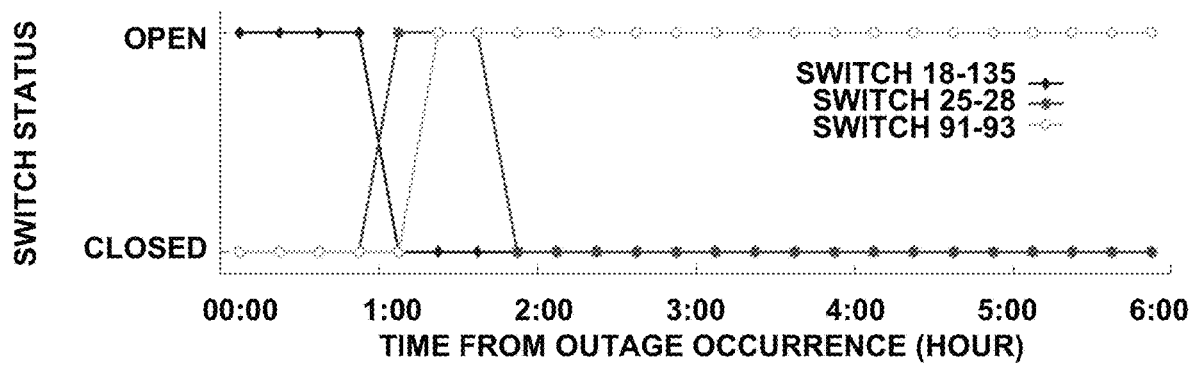

FIGS. 7A and 7B are conceptual diagrams illustrating switch operations during two test cases of power system restoration incorporating diverse distributed energy resources, in accordance with one or more aspects of the present disclosure. The switch positions are dynamically updated in accordance with the techniques described herein to accommodate fluctuations in renewable generation and load consumption. As shown in FIGS. 7A and 7B, the operation sequences of switch 91-93 are the same in both cases. Different switches are opened/closed during the first 2 hours of the outage in these two cases, mainly because of the different renewable DER generation profiles.

The performance of these two test cases are summarized in Table III.

TABLE III

STATISTICS OF THE SIMULATED TEST CASES

|  | Case 1 | Case 2 |
|---|---|---|
| MPC-based restoration planning | | |
| Total restored load consumption (MWh) | 15.05 | 14.93 |
| Total renewable DER generation (MWh) | 8.28 | 7.58 |
| Total uncontrollable load consumption (MWh) | 14.04 | 13.96 |
| Net energy consumption of HEMS (MWh) | 1.01 | 0.97 |
| Peak/valley consumption of HEMS (MW) | 0.42/−0.03 | 0.30/−0.03 |
| Total load energy not supplied (MWh) | 2.49 | 2.65 |
| Maximum/minimum load shedding (MW) | 0.73/0.0 | 0.78/0.20 |
| Maximum/minimum voltage magnitude (p.u.) | 1.012/0.985 | 1.016/0.986 |
| Real-time dispatch | | |
| Net energy consumption of HEMS (MWh) | 0.91 | 0.88 |
| Peak/valley consumption of HEMS (MW) | 0.41/−0.03 | 0.30/−0.11 |
| Total load energy not supplied | 2.89 | 3.23 |
| Total renewable energy curtailment (kWh) | 3.19 | 3.73 |
| Maximum/minimum voltage magnitude (p.u.) | 1.015/0.985 | 1.019/0.988 |

In both cases, load shedding was inevitable because of the limited generating capacity and intermittency of renewable DERs. The unsupplied load energy in Case 2 was slightly higher than that of Case 1 because of the reduction in renewable DER output. Several interesting observations can be found by comparing the MPC-based planning results with the real-time dispatch results. First, the real-time net HEMS energy consumptions were smaller than the MPC-based planning solutions in both cases, indicating that the HEMS might discharge their ESS more frequently and reduce their comfort settings in real-time to follow the MPC-based planning reference. This is also supported by the comparison of peak/valley HEMS consumption in both simulated cases. Second, the consideration of real-time forecast errors and intermittency resulted in higher load shedding in both cases. This also validates the necessity to integrate real-time balancing into restoration planning. Note that in either case, the fluctuating renewable DER generation will lead to a very small amount of curtailment because of the scarcity of flexible resources. In general, the real-time dispatch solutions do not deviate much from the MPC-based planning solutions, as shown in Table III.

Figure 8A:
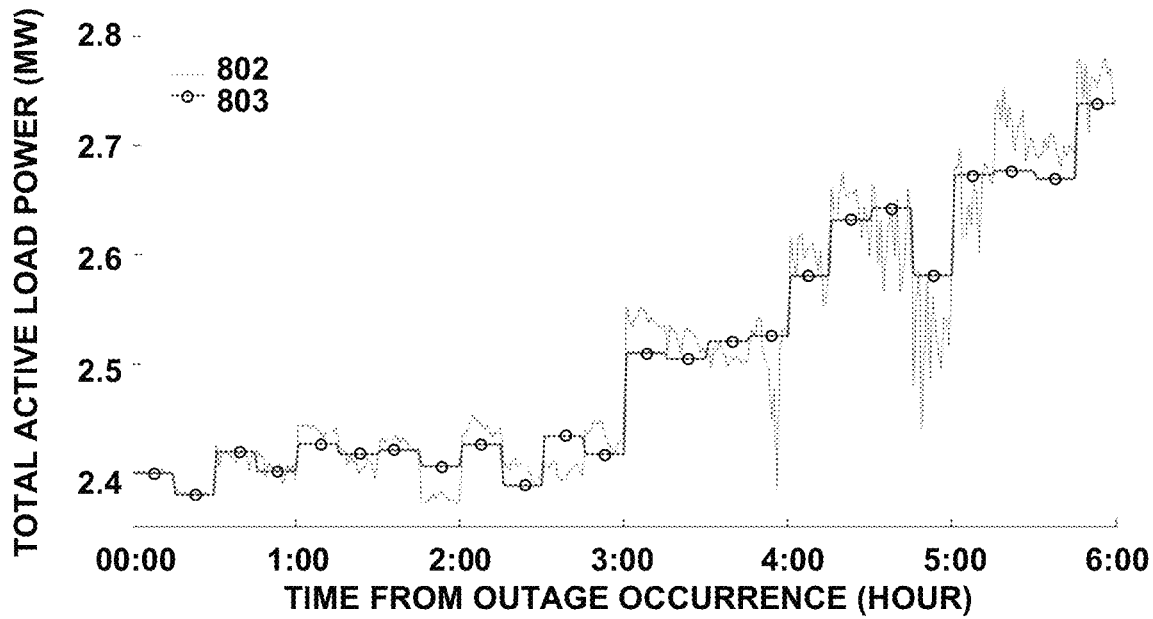
FIGS. 8A-8L are graphical plots illustrating detailed results of a test case of power system restoration incorporating diverse distributed energy resources, in accordance with one or more aspects of the present disclosure.
Figure 8B:
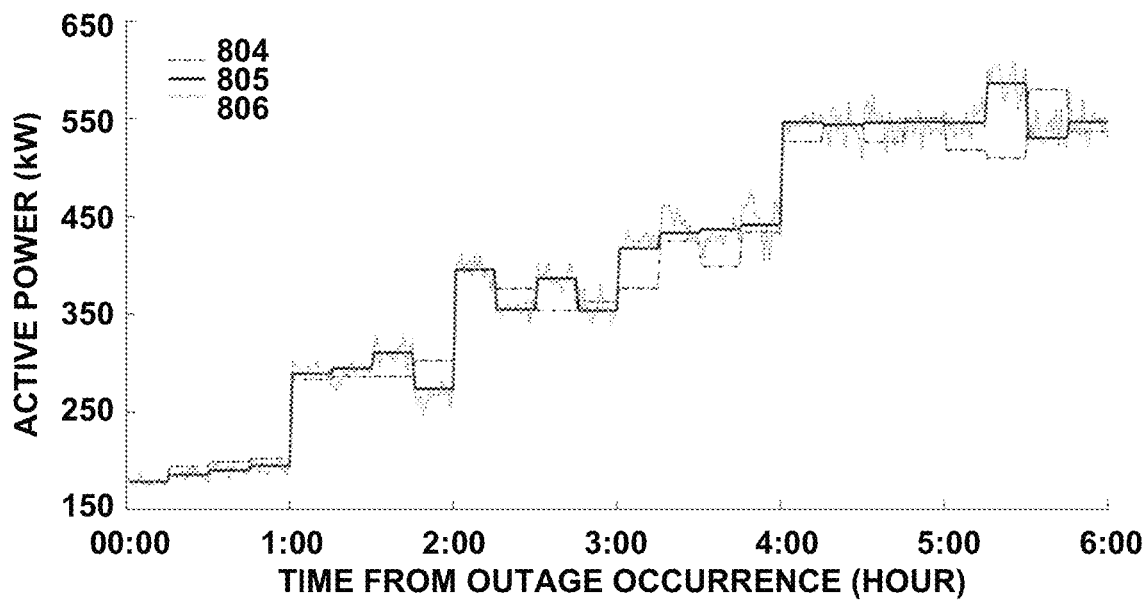
Figure 8C:
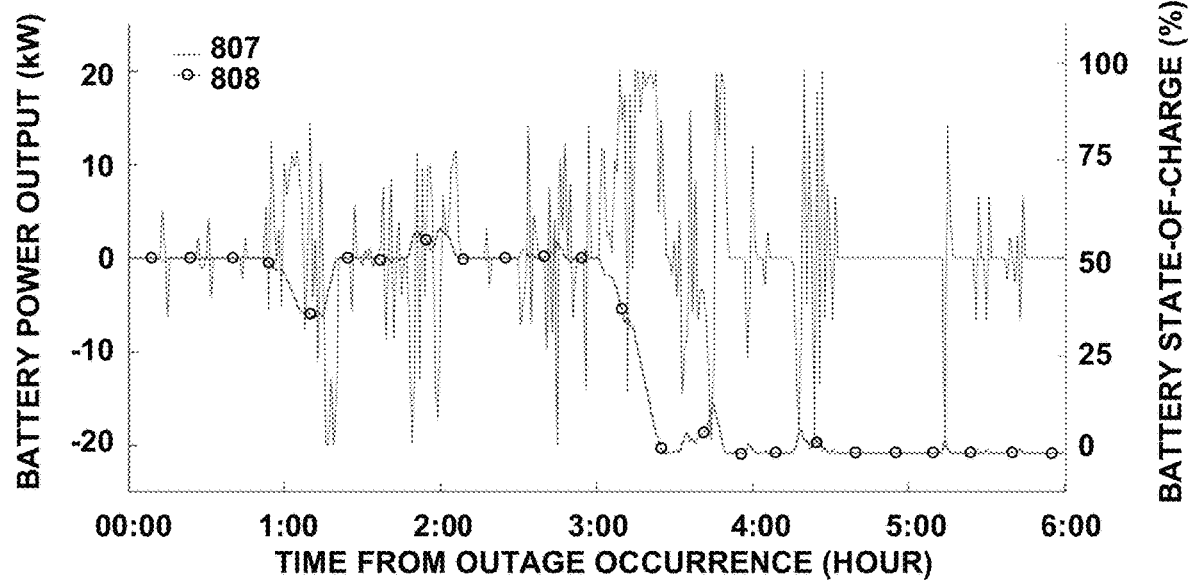
Figure 8D:
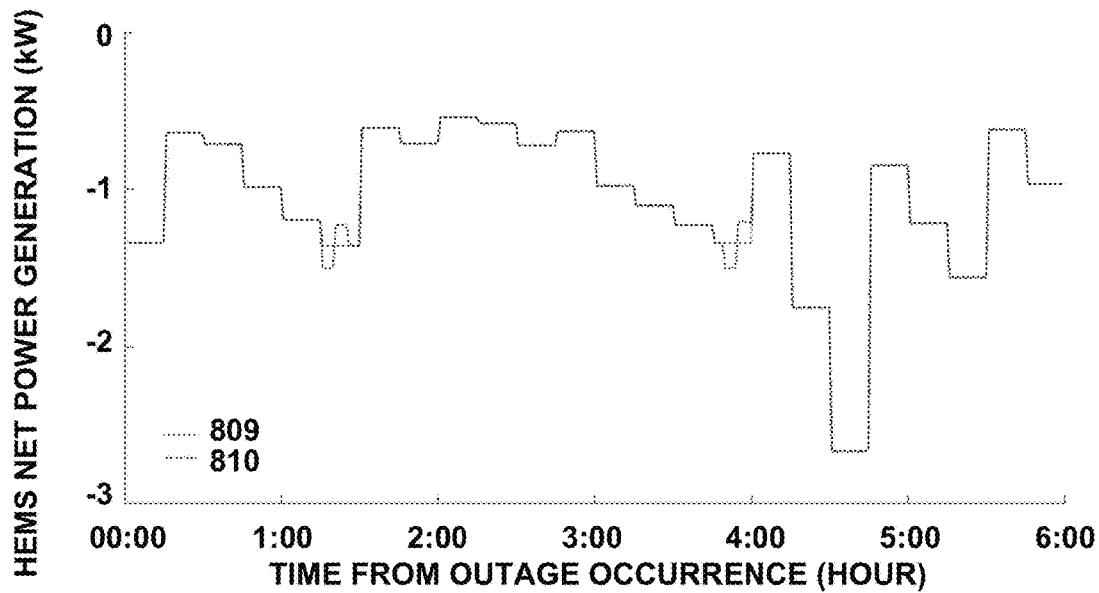
Figure 8E:
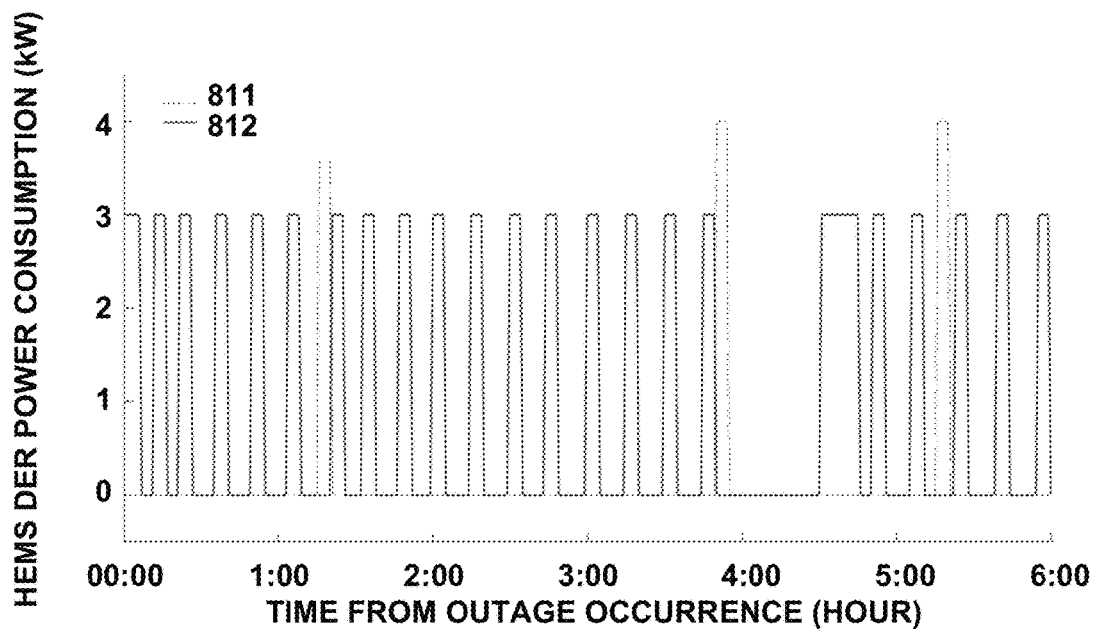
Figure 8F:
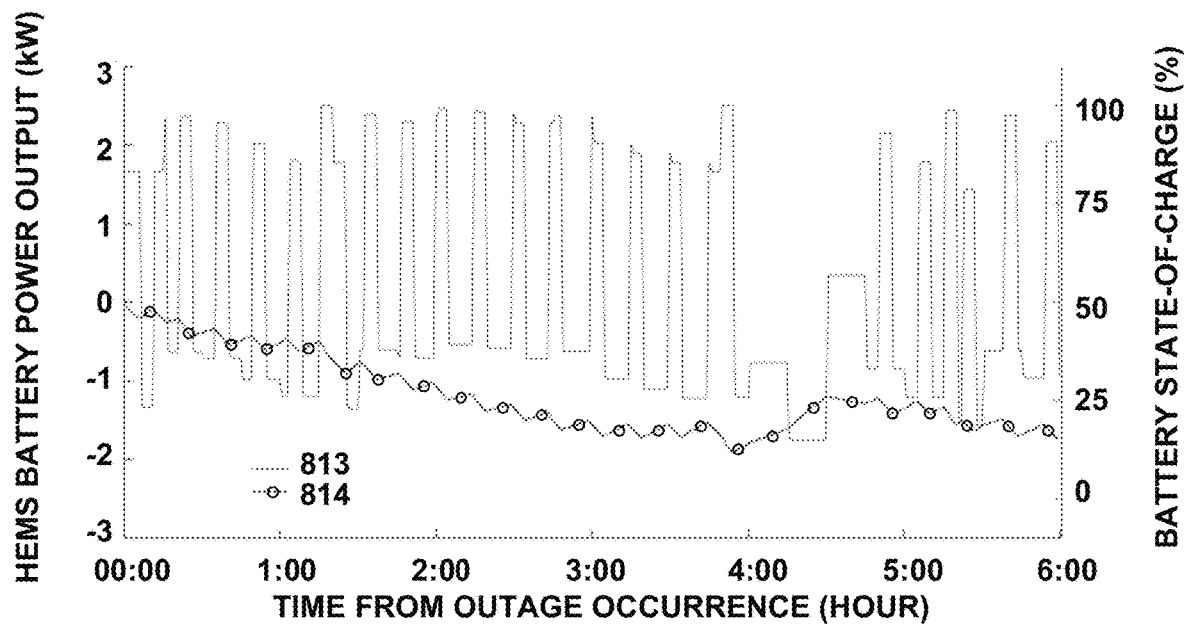
Figure 8G:
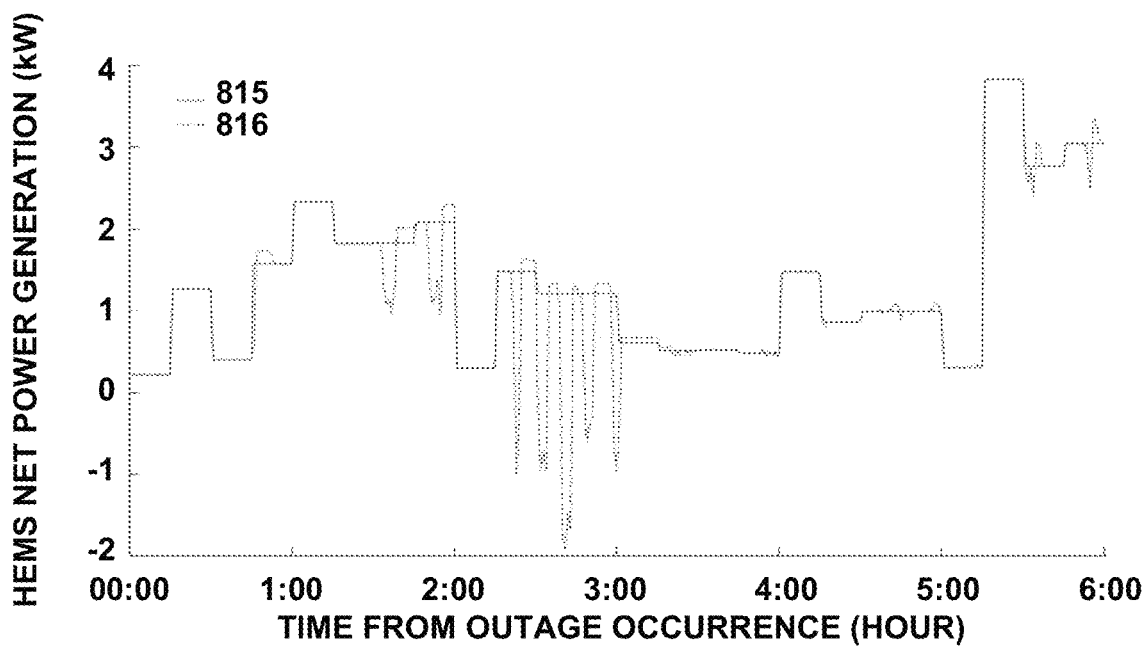
Figure 8H:
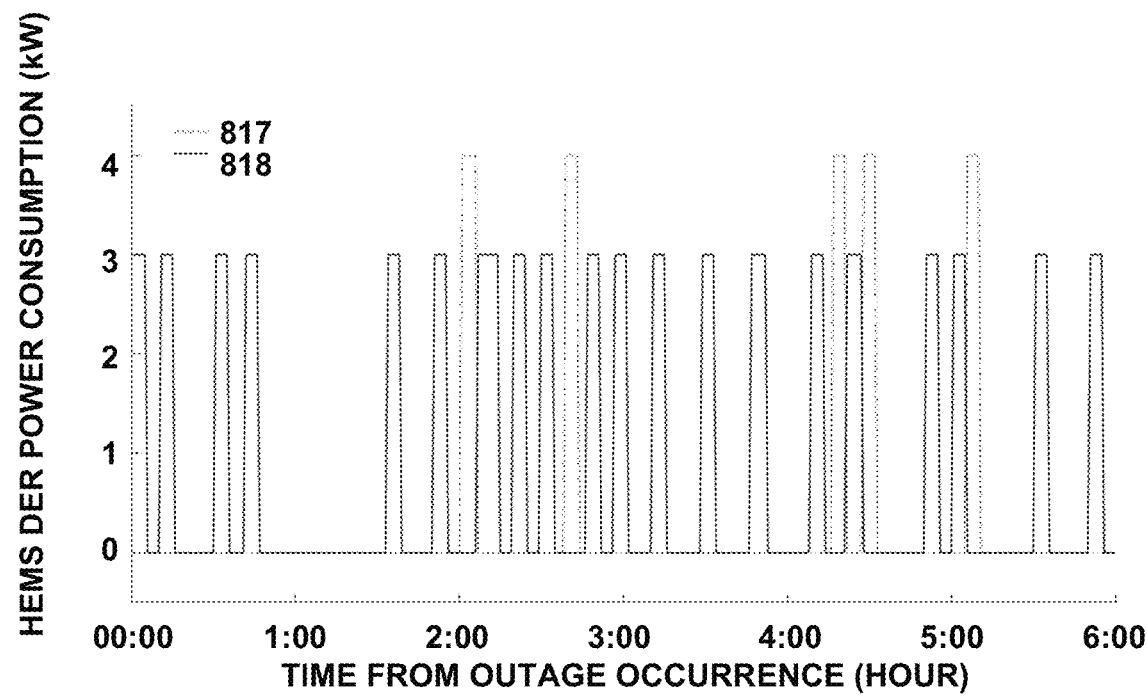
Figure 8I:
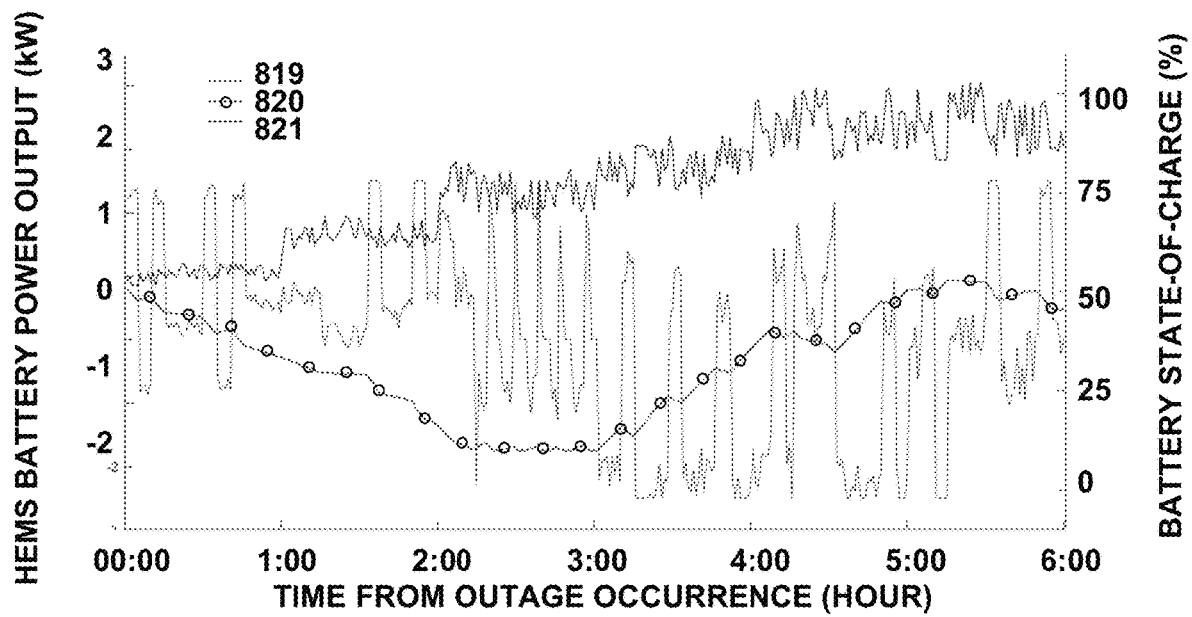
Figure 8J:
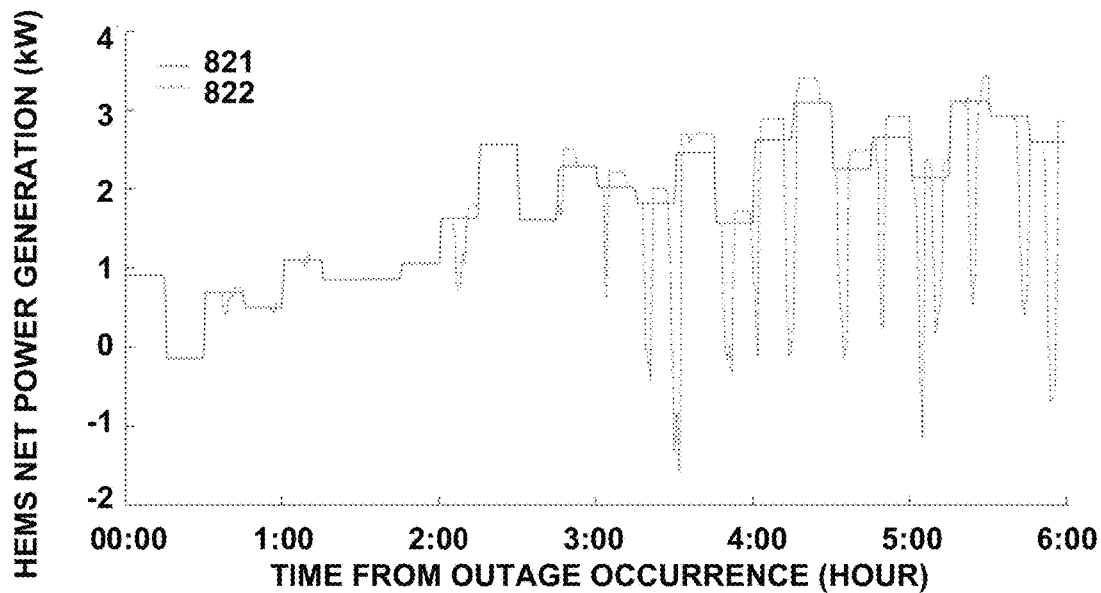
Figure 8K:
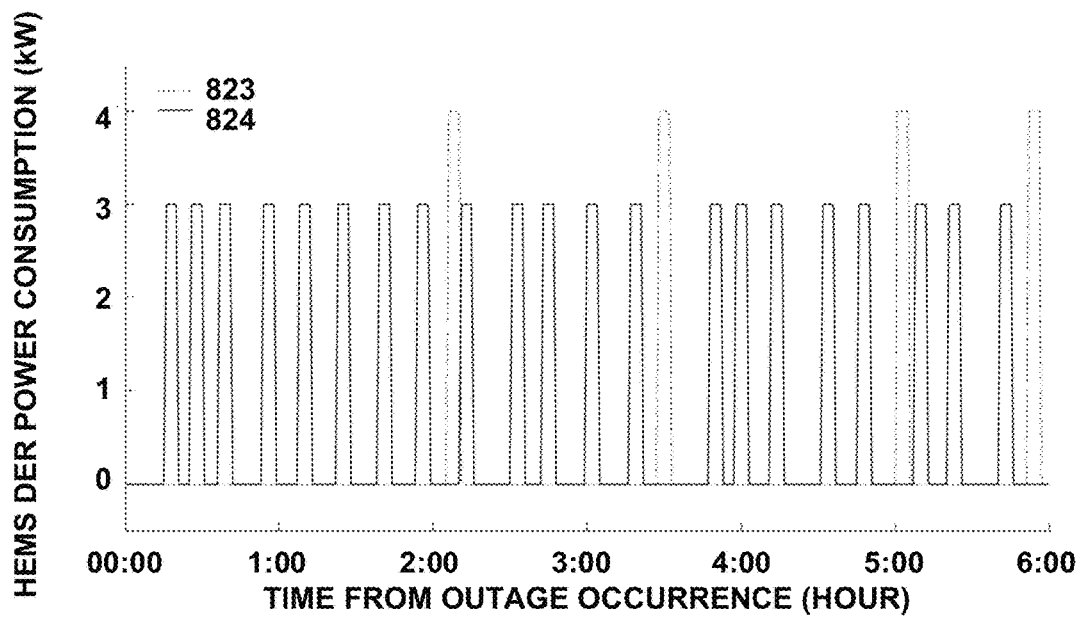
Figure 8L:
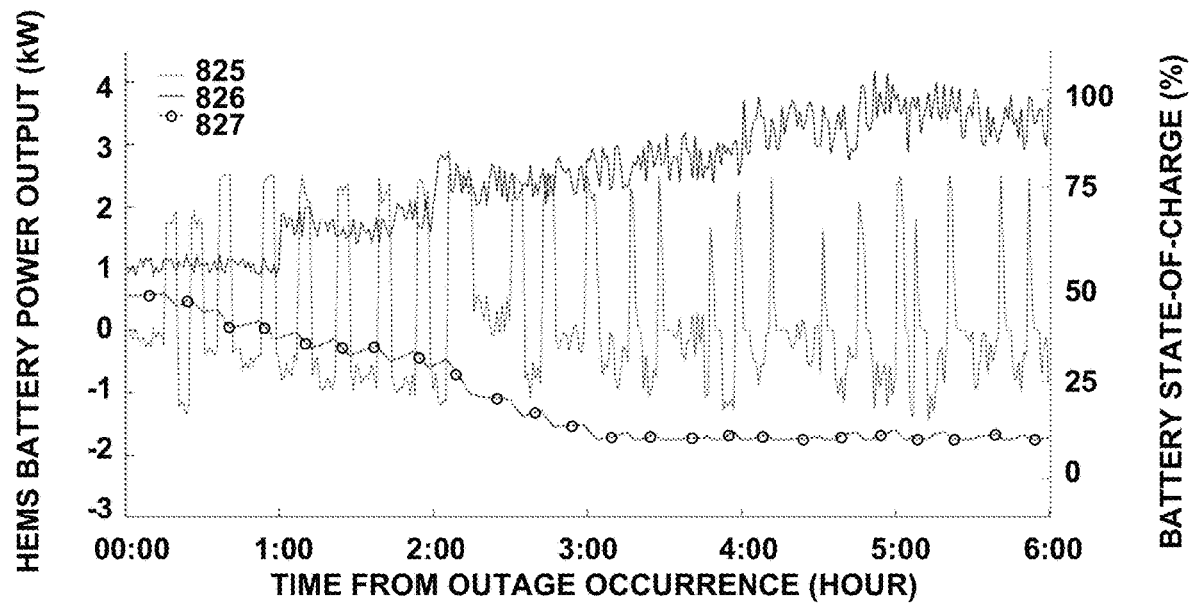

FIGS. 8A-8L are graphical plots illustrating detailed results of a test case (Case 1) of power system restoration incorporating diverse distributed energy resources, in accordance with one or more aspects of the present disclosure. Specifically, FIG. 8A shows the total load restoration profile, with line 802 providing the real-time results and line 803 providing the MPC results. FIG. 8B shows the utility PV generation at Bus 78, with line 804 providing the MPC forecast when the outage occurs, line 805 representing actual PV generation (15-min slots), and line 806 representing real-time PV generation (1-min slots). FIG. 8C shows ESS operation at Bus 78, with line 807 representing the battery power output and line 808 representing the battery state-of-charge. FIG. 8D shows the schedule of HEMS-1, with line 809 representing the MPC results, and line 810 representing the real-time results. FIG. 8E shows the behind-the-meter DER operations of HEMS-1, with line 811 representing the water heater and line 812 representing the heat pump. FIG. 8F shows ESS operation at HEMS-1, with line 813 representing the battery power output and line 814 representing the battery state-of-charge. FIG. 8G shows the schedule of HEMS-2, with line 815 representing the MPC results and line 816 representing the real-time results. FIG. 8H shows the behind-the-meter DER operations of HEMS-2, with line 817 representing the water heater and line 818 representing the heat pump. FIG. 8I shows ESS operation at HEMS-2, with line 819 representing the battery power output, line 820 representing the battery state-of-charge, and line 821 representing the rooftop PV generation. FIG. 8J shows the schedule of HEMS-3, with line 822 representing the MPC results and line 823 representing the real-time results. FIG. 8K shows the behind-the-meter DER operations of HEMS-3, with line 824 representing the water heater and line 825 representing the heat pump. Finally, FIG. 8L shows PV/ESS operation at HEMS-3, with line 826 representing the battery power output, line 827 representing the rooftop PV generation, and line 828 representing the battery state-of-charge.

As seen in FIGS. 8A and 8B, the restored load power and utility PV generation share similar increasing trends. As seen in FIG. 8A, the volatility of the restored load consumption does not become significant until approximately 3.5 hours after the occurrence of the outage. This phenomenon is caused by the exhaust of flexible resources, such as ESS. FIG. 8C shows the real-time operation schedule and state-of-charge profile of the ESS associated with the utility-scale PV. The ESS state of charge is kept near 50% right after the outage occurs, but it drops dramatically after 3 hours of operation; thus, the ESS's capability to compensate for the variable renewable generation is greatly restrained in the second half of the MPC horizon.

The real-time HEMS energy consumption was also analyzed. FIGS. 8D-8L may be used to compare the following three HEMSs:
- HEMS-1: connected to bus 41, phase C, and did not have a rooftop PV system installed;
- HEMS-2: connected to bus 41, phase C, and was equipped with a 4 kW rooftop PV system;
- HEMS-3: connected to bus 85, phase C, and was equipped with a 4 kW rooftop PV system.

As shown in FIG. 8D, the real-time consumption of HEMS-1 almost perfectly follows the MPC reference. In contrast, FIGS. 8G and 8J show that the real-time consumptions of HEMS-2 and HEMS-3 are much more volatile. The reason lies in the variable generation output of the rooftop PV panels of HEMS-2 and HEMS-3. The exhaustion of household ESS capability also contributes to deviations in real-time. As seen in FIG. 8I, the ESS of HEMS-2 is operating with its lowest state of charge after 2 hours of outage, which further leads to a fluctuating real-time load schedule at that period. Similarly, the ESS state-of-charge of HEMS-3 remains close to its lower bound after 3 hours of outage as shown in FIG. 8L, resulting in a volatile real-time consumption in FIG. 8J. In comparison, the state-of-charge of the ESS of HEMS-1 does not reach its limit throughout the 6-hour MPC horizon, which contributes to the smooth real-time consumption shown in FIG. 8D. FIGS. 8E, 8H, and 8K demonstrate the real-time schedules of water heaters and heat pumps and verify the effectiveness of the real-time behind-the-meter DER models with discrete on/off control signal.

HEMS-1 and HEMS-2 are located at the same bus and phase. The differences in FIGS. 8D-8F and FIGS. 8G-8I are mainly caused by the rooftop PV of HEMS-2. On the other hand, the major difference between HEMS-2 and HEMS-3 is the location. As the distribution system may be divided into several isolated subnetworks due to faults, the location of a HEMS plays an important role in determining the availability of generating resources. For example, the generations from rooftop PVs are increasing in the simulated 6-hour horizon as observed from FIGS. 8I and 8L. According to FIG. 8I, HEMS-2 is capable of charging its ESS to approximately 50% state-of-charge by the end of simulation using the abundant PV generation. However, the ESS state-of-charge of HEMS-3 remains low despite the PV generation being high, possibly because the generation capacity of the island where HEMS-3 is located is insufficient, so rooftop PV generations are required to supply other critical loads.

Using Case 2 as a benchmark, the techniques of the present disclosure were compared with several commonly employed restoration strategies to further validate effectiveness. The same parameter settings used in the benchmark case were adopted in the comparative study. The comparative cases are briefly described as follows:

Case 3: Static restoration planning based on forecast data. There is no dynamic update or real-time dispatch.
Case 4: The proposed MPC-based adaptive restoration planning. There is no real-time dispatch coordination.
Case 5: Static restoration planning as in Case 3 with collaborative real-time dispatch.
Case 6: The techniques described herein, but the restoration planning solution is derived while ignoring the phase unbalances (i.e., using balanced power flow in operation 3 of Algorithm 1).

The comparison results are listed in Table IV.

TABLE IV

PERFORMANCES OF COMPARATIVE CASES AGAINST BENCHMARK CASE 2

|  | Total load energy not supplied (%) | Peak curtailed load power (%) | Total utility-scale PV and wind generation (%) |
|---|---|---|---|
| Case 2 | 100.0 | 100.0 | 100.0 |
| Case 3 | 201.10 | 172.41 | 92.55 |
| Case 4 | 147.22 | 135.02 | 96.89 |
| Case 5 | 175.97 | 131.32 | 95.54 |
| Case 6 | 188.85 | 181.39 | 87.45 |

The statistics in Table IV indicate the relative ratio in comparison with the benchmark results (Case 2). For example, 201.10%, as shown in the third row, the second column, denotes that compared to Case 2, Case 3 curtailed 201.10% of the total curtailed load energy. Note that Case 3 and Case 4 do not include real-time dispatch, so it is assumed that the HEMS will randomly allocate the consumption schedules of behind-the-meter DERs in real-time to cope with the restoration planning solution. The following conclusions can be observed from Table IV:

(1) Case 3 has the worst performance among all cases. The forecast errors cannot be mitigated and network topology is static because of the absence of MPC-based rolling optimization. Additionally, the arbitrary real-time behaviors of behind-the-meter DERs contributes to the significantly higher load curtailment.

(2) The performance of Case 4 is much better than Case 3, indicating the effectiveness of the MPC-based adaptive restoration planning strategy disclosed herein; however, the results of Case 4 are still worse than the benchmark Case 2 because the real-time fluctuations have not been handled.

(3) Compared to Case 3, the introduction of real-time dispatch to Case 5 results in performance improvement. On the other hand, Case 5 still has higher load curtailment than Case 4 because real-time fluctuations are not as significant as long-term forecast errors. Note that Case 5 has the lowest peak load curtailment power. This is because proper real-time behind-the-meter DER scheduling can greatly level off load consumption spikes, leading to a smaller load curtailment.

(4) Distribution systems are inherently unbalanced. In Case 6, the phase unbalances are ignored when reconfiguring the distribution grid. As shown in Table IV, Case 6 has more unsupplied load than Case 2. This can be explained by the following two aspects: (i) the balanced power flow employed inaccurate network data, thus the solution contains considerable errors; and (ii) the restoration solution based on balanced power flow overestimates the available generation capacity, thus could become infeasible for real-time operation. For example, the balanced power flow may require a rooftop PV to supply another load at a different phase, which is technically infeasible and will possibly result in additional load shedding and renewable curtailment in real-time.

The results in Table IV demonstrate that either the MPC-based restoration planning or the real-time dispatch cannot fully manage the uncertainty and intermittency associated with renewable DERs and behind-the-meter DERs. The efficiency and necessity of the techniques described herein to coordinate system-level restoration and behind-the-meter DER control are validated. Moreover, the necessity to employ unbalanced power flow for distribution system restoration studies is validated.

A real-world unbalanced utility system was also employed to validate the performance of the techniques of the present disclosure on large distribution systems. The test system is a radial system serving a residential area with 3994 buses, 9 utility-scale PVs (each of them has a capacity of 200 kW), and 163 controllable loads. It was assumed that each controllable load is managed by a HEMS. The parameters of utility PVs, behind-the-meter DERs, and simulation horizon/interval were the same used in the IEEE 123 bus system. To simulate the power outage scenario, in this test case the substation did not provide power supply throughout the entire simulation period, and 10 randomly selected distribution lines are disconnected. The outage was assumed to start at $T_{st}$=9 a.m.

For the 3994-bus system, the average computational time for MPC-based restoration planning and real-time dispatch were 26.76 seconds and 1.55 seconds, respectively. Although it took much longer to solve the 3994-bus system than the IEEE 123 bus system because of the increased size, it still fits in the 15-min MPC interval. Thus, the techniques described herein can be successfully applied to real-world large distribution systems as well.

Compared with the OpenDSS benchmark results, the normalized root-mean-squared error of voltage magnitude, nodal active power injection, and nodal reactive power injection were 0.21%, 1.14%, and 3.78%, respectively. Therefore, the error introduced by power flow linearization is not significant.

To validate the techniques for power system restoration incorporating diverse distributed energy resources disclosed herein, the following two cases were compared on this utility test system:

Case 7: The techniques of the present disclosure.
Case 8: The techniques of the present disclosure without the DSO-HEMS collaborations.

That is, the behind-the-meter DERs are treated as uncontrollable loads.

The comparison of these two cases are listed in Table V where the results of Case 7 serve as the benchmark.

TABLE V

PERFORMANCES COMPARISON ON THE LARGE UTILITY TEST SYSTEM

|  | Total load energy not supplied (%) | Peak curtailed load power (%) | Utility-scale PV curtailment (%) |
|---|---|---|---|
| Case 7 | 100.0 | 100.0 | 100.0 |
| Case 8 | 129.81 | 145.63 | 193.42 |

It is observed that the absence of behind-the-meter DER collaboration will lead to a significant increase in load shedding and renewable energy curtailment. Especially in this utility system, where all generation resources are PVs, the flexibility of behind-the-meter DERs acts as a critical buffer to level off the volatility of PVs and enhances the reliability of power supply during an outage.

Figure 9:
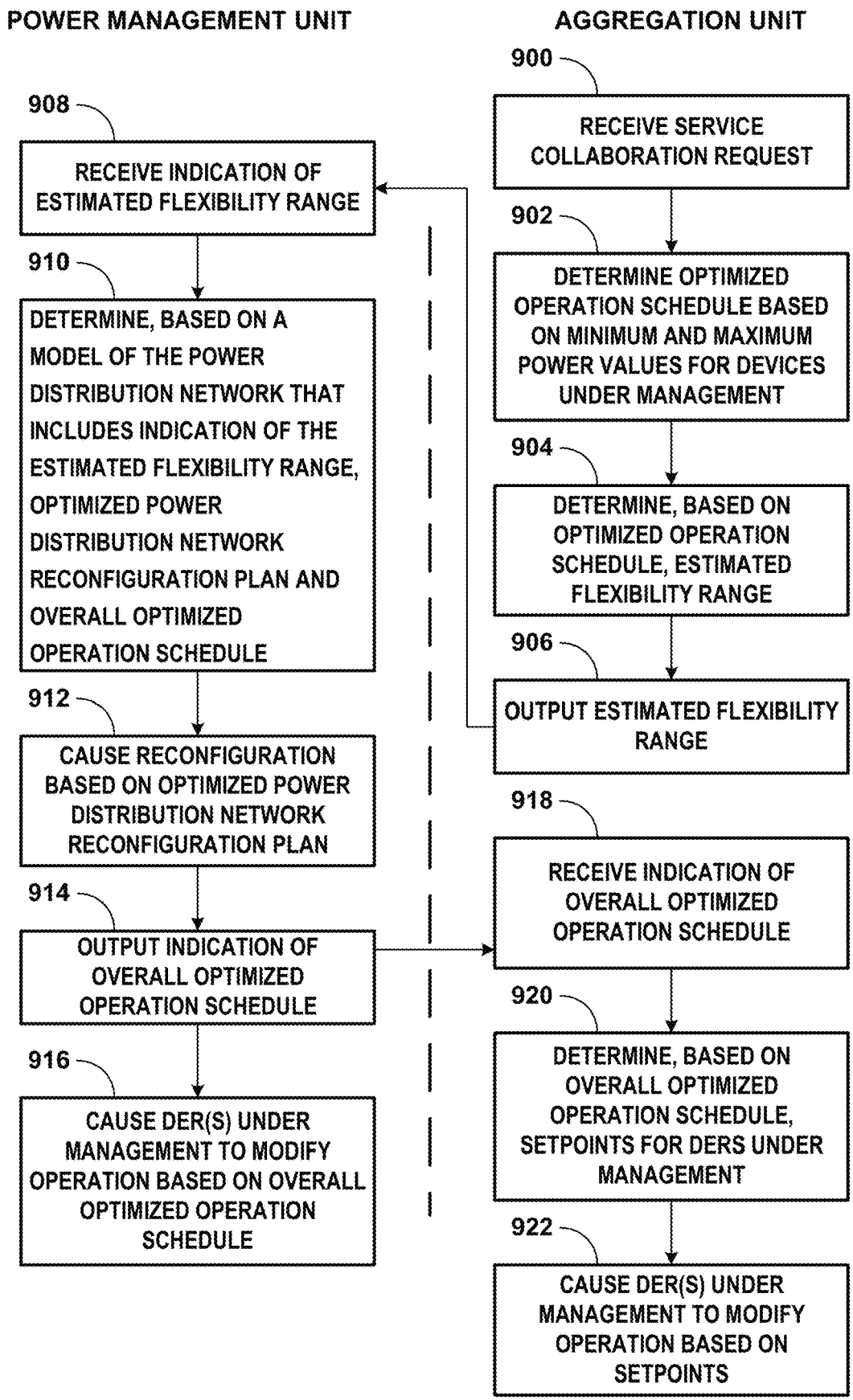
FIG. 9 is a flow diagram illustrating example operations for performing power system restoration incorporating diverse distributed energy resources, in accordance with one or more aspects of the present disclosure.

FIG. 9 is a flow diagram illustrating example operations for performing power system restoration incorporating diverse distributed energy resources, in accordance with one or more aspects of the present disclosure. FIG. 9 represents only one example process for performing power system restoration incorporating diverse distributed energy resources as described herein, and various other or additional operations may be used in other examples. The example operations of FIG. 9 are described below within the context of FIG. 1.

In the example of FIG. 9, an aggregation unit may be configured to receive a service collaboration request indicating a problem in a power distribution network (900). For example, aggregation unit 10B may receive a service collaboration request from power management unit 4.

Responsive to receiving the service collaboration request, the aggregation unit may, in the example of FIG. 9, determine an optimized operation schedule covering a model predictive control (MPC) horizon duration for one or more DERs in the power distribution network under management by the aggregation unit (902). For example, aggregation unit 10B may determine an optimized operation schedule that includes aggregator-managed DERs 8B, 8C, and 8D. The optimized operation schedule may be determined based on respective minimum and maximum real and reactive power values for the one or more DERs.

In the example of FIG. 9, the aggregation unit may determine, based on the optimized operation schedule, an estimated flexibility range for devices under management by the aggregation unit (904). The aggregation unit may output an indication of the estimated flexibility range (906). For example, aggregation unit 10B may determine an estimated flexibility range for devices including aggregator-managed DERs 8B, 8C, and 8D. Aggregation unit 10B may output estimated flexibility range 12B to one or more other components of system 2 via one or more wired or wireless communication networks.

In the example of FIG. 9, a power management unit may be configured to receive the indication of the estimated flexibility range (908). Based on a linearized restoration model of the three-phase unbalanced power distribution network that includes the indication of the estimated flexibility range, the power management unit may determine an optimized power distribution network reconfiguration plan and an overall optimized operation schedule covering the MPC horizon duration for both energy resources under management by the power management unit and the one or more DERs (910). For example, power management unit 4 may receive estimated flexibility range 12B and estimated flexibility range 12A output by aggregation unit 10A. Power management unit 4 may incorporate estimated flexibility ranges 12A and 12B into a model of the power distribution network and determine an optimized power distribution network reconfiguration plan and an overall optimized operation schedule for the network.

In the example of FIG. 9, the power management unit may cause, based on the optimized power distribution network reconfiguration plan, a reconfiguration of the power distribution network (912). As one example, power management unit 4 may output switch instruction 13 for use by system reconfiguration device 6B. As another example, power management unit 4 may output the optimized power distribution network reconfiguration plan for use by one or more other components of the power distribution network, such as a distribution system manager.

The power management unit may output an indication of the overall optimized operation schedule (914). For instance, power management unit 4 may output optimized schedule 14 to one or more other components of system 2 via one or more wired or wireless communication networks.

In the example of FIG. 9, the power management unit may cause one or more of the energy resources under management by the power management unit to modify operation based on the overall optimized operation schedule (916). As one example, power management unit 4 may output setpoints 15 for use by PMU-managed DER 9. As another example, power management unit 4 may output an indication of the overall optimized operation schedule to one or more other components of system 2 for use in determining setpoints to be used by PMU-managed DER 9.

The aggregation unit may, in the example of FIG. 9, be further configured to receive the indication of the overall optimized operation schedule (918). Based on the indication of the overall optimized operation schedule, the aggregation unit may determine setpoints for the one or more DERs (920). For example, aggregation unit 10B may receive optimized schedule 14 and use it to determine setpoints for aggregator-managed DERs 8B, 8C, and 8D.

The aggregation unit may, in the example of FIG. 9, cause at least one of the one or more DERs to modify operation based on the setpoints (922). For example, aggregation unit 10B may send instructions to aggregator-managed DERs 8B, 8C, and/or 8D instructing them to operate at the provided setpoints. As another example, aggregation unit 10B may output the setpoints to one or more other components (e.g., an inverter) that may instruct an aggregator managed DER to use the received setpoints.

The example operations of FIG. 9 may be performed in an iterative fashion. That is, while only a single flow is shown, each of operations 900, 902, 904, 906, 908, 910, 912, 914, 916, 918, 920, and/or 922 may be performed any number of times. In some examples, the operations are performed in an iterative fashion. In some such examples, the frequency with which these operations are performed may be the same. In other such examples, one or more of the operations may be performed with higher or lower frequency than other operations. For instance, operations 902, 904, 906, 908, 910, 912, 914, and 918 may be performed at a first frequency that represents an MPC interval. Operations 916, 920, and 922 may be performed at a second, higher frequency that represents a real-time interval.

The techniques disclosed herein provide a collaborative framework for distribution system restoration that coordinates the adaptive restoration planning and real-time dispatch through utility-scale and aggregator-controlled DERs, including behind-the-meter DERs. The flexibility of such DERs is quantified by aggregators and used by DSOs during the restoration planning stage. The MPC technique is employed herein to dynamically update the system restoration strategy to accommodate the up-to-date renewable generation forecast, the fault propagation, and the flexibility range of aggregator-controlled DERs. To accommodate fluctuations in the real-time domain, real-time models for DSOs and aggregator-controlled DERs are provided to maintain power balance based on the reference obtained in the MPC-based restoration planning. The performance of the techniques disclosed herein are also verified in case studies. Compared to existing restoration planning studies, the techniques of the present disclosure are effective in handling uncertainty factors, accommodating flexibility of aggregator-controlled DERs, and dynamically adjusting restoration schemes during the restoration process.

At least some of the techniques of the present disclosure may be additionally or alternatively described by one or more of the following examples.

Example 1. A system comprising: an aggregation unit comprising at least one processor, the aggregation unit being configured to: receive a service collaboration request indicating a problem in a power distribution network; responsive to receiving the service collaboration request, determine, based on respective minimum and maximum real and reactive power values for one or more DERs in the power distribution network under management by the aggregation unit, an optimized operation schedule covering a model predictive control (MPC) horizon duration for the one or more DERs; determine, based on the optimized operation schedule, an estimated flexibility range for devices under management by the aggregation unit; and output an indication of the estimated flexibility range; a power management unit comprising at least one processor, the power management unit being configured to: receive the indication of the estimated flexibility range; determine, based on a linearized restoration model of the three-phase unbalanced power distribution network that includes the indication of the estimated flexibility range, an optimized power distribution network reconfiguration plan and an overall optimized operation schedule covering the MPC horizon duration for both energy resources under management by the power management unit and the one or more DERs; cause, based on the optimized power distribution network reconfiguration plan, a reconfiguration of the power distribution network; output an indication of the overall optimized operation schedule; and cause one or more of the energy resources under management by the power management unit to modify operation based on the overall optimized operation schedule, wherein the aggregation unit is further configured to: receive the indication of the overall optimized operation schedule; determine, based on the indication of the overall optimized operation schedule, setpoints for the one or more DERs; and cause at least one of the one or more DERs to modify operation based on the setpoints.

Example 2. The system of example 1, wherein: the aggregation unit is further configured to determine the optimized operation schedule, determine the estimated flexibility range, and output the indication of the estimated flexibility range iteratively at a first frequency that represents an MPC interval, the power management unit is further configured to receive the indication of the estimated flexibility range, determine the optimized power distribution network reconfiguration plan and the overall optimized operation schedule, cause the reconfiguration of the power distribution network, and output the indication of the overall optimized operation schedule iteratively at the first frequency, the aggregation unit is further configured to determine the setpoints for the one or more DERs and cause the at least one of the one or more DERs to modify operation iteratively at a second frequency that represents a real-time interval, the power management unit is further configured to cause the one or more of the energy resources under management by the power management unit to modify operation iteratively at the second frequency, and the MPC interval is larger than the real-time interval.

Example 3. The system of any of examples 1-2, wherein: the aggregation unit is further configured to output an indication of the optimized operation schedule, and the power management unit is configured to determine the optimized power distribution network reconfiguration plan and the overall optimized operation schedule based further on the optimized operation schedule.

Example 4. The system of any of examples 1-3, wherein the aggregation unit is configured to cause at least one of the one or more DERs to modify operation based on the setpoints by outputting, for use by the at least one of the one or more DERs, an indication of the setpoints.

Example 5. The system of any of examples 1-4, wherein the power management unit is configured to determine the overall optimized operation schedule covering the MPC horizon duration for both energy resources under management by the power management unit and the one or more DERs by determining:

$$\text{Min} \sum\nolimits_{\tau=T_{st}}^{T_{en}} \sum\nolimits_{n \in \Omega_N} \left[ \gamma_n^G P_{n,\tau}^G + \gamma_n^S \sum\nolimits_{\phi \in \Psi_n} \left( P_{n,\tau}^{S,\phi} + Q_{n,\tau}^{S,\phi} \right) \right] + \\ \sum\nolimits_{\tau=T_{st}}^{T_{en}} \sum\nolimits_{h \in \Omega_H} \left( \gamma_h^V P_{hm\tau}^V + \gamma_h^W P_{h,\tau}^W \right),$$

subject to:

$$P_{n,\tau}^{G,min} \leq P_{n,\tau}^G \leq P_{n,\tau}^{G,max}, \, Q_{n,\tau}^{G,min} \leq Q_{n,\tau}^G \leq Q_{n,\tau}^{G,max},$$

$$P_{n,\tau}^G = \sum\nolimits_{\phi \in \Psi_n} P_{n,\tau}^{G,\phi},$$

$$Q_{n,\tau}^G = \sum\nolimits_{\phi \in \Psi_n} Q_{n,\tau}^{G,\phi}, \, P_{n,\tau}^{G,\phi} - P_{n,\tau}^{D,\phi} + P_{n,\tau}^{S,\phi} = \sum\nolimits_{nm \in \Omega_L} \left( P_{nm,\tau}^\phi - P_{mn,\tau}^\phi \right),$$

$$Q_{n,\tau}^{G,\phi} - Q_{n,\tau}^{D,\phi} + Q_{n,\tau}^{S,\phi} = \sum_{nm\in\Omega_L}(Q_{nm,\tau}^{\phi} - Q_{mn,\tau}^{\phi}),$$

$$P_{n,\tau}^{D,\phi} = P_{n,\tau}^{D,fix,\phi} + \sum_{h\to(n,\phi)} P_{h,\tau},$$

$$Q_{n,\tau}^{D,\phi} = Q_{n,\tau}^{D,fix,\phi} + \sum_{h\to(n,\phi)} Q_{h,\tau},$$

$$0 \le P_{n,\tau}^{S,\phi} \le P_{n,\tau}^{D,\phi},$$

$$0 \le Q_{n,\tau}^{S,\phi} \le Q_{n,\tau}^{D,\phi},$$

$$V_{n,\tau}^{\phi} - V_{m,\tau}^{\phi} = 2(r_{nm}^{\phi\phi}P_{nm,\tau}^{\phi} + x_{nm}^{\phi\phi}Q_{nm,\tau}^{\phi}) -$$
$$2\vartheta_1(r_{nm}^{\phi\phi'}P_{nm,\tau}^{\phi'} + r_{nm}^{\phi\phi''}P_{nm,\tau}^{\phi''} + x_{nm}^{\phi\phi'}Q_{nm,\tau}^{\phi'} + x_{nm}^{\phi\phi''}Q_{nm,\tau}^{\phi''}) -$$
$$2\vartheta_2(x_{nm}^{\phi\phi'}P_{nm,\tau}^{\phi'} - x_{nm}^{\phi\phi''}P_{nm,\tau}^{\phi''} - r_{nm}^{\phi\phi'}Q_{nm,\tau}^{\phi'} + r_{nm}^{\phi\phi''}Q_{nm,\tau}^{\phi''}),$$

$$V_n^{\phi,min} \le V_{n,\tau}^{\phi} \le V_n^{\phi,max}, P_{h,\tau}^W \ge P_{h,\tau} - p_{h,\tau}^*, P_{h,\tau}^W \ge p_{h,\tau}^* - P_{h,\tau},$$

$$p_{h,\tau}^{min} \le P_{h,\tau} \le p_{h,\tau}^{max},$$

$$e_{h,\tau}^{min} - P_{h,\tau}^V \le \sum_{T=T_{st}}^{\tau} P_{h,T} \le e_{h,\tau}^{max} + P_{h,\tau}^V, \text{ and } P_{h,\tau}^V \ge 0,$$

$V_n^{\phi,min} \le V_{n,\tau}^{\phi} \le V_n^{\phi,max}$, $P_{h,\tau}^W \ge P_{h,\tau} - p_{h,\tau}^*$, $P_{h,\tau}^W \ge p_{h,\tau}^* - P_{h,\tau}$, $p_{h,\tau}^{min} \le P_{h,\tau} \le p_{h,\tau}^{max}$, $e_{h,\tau}^{min} - P_{h,\tau}^V \le \sum_{T=T_{st}}^{\tau} P_{h,T} \le e_{h,\tau}^{max} + P_{h,\tau}^V$, and $P_{h,\tau}^V \ge 0$, wherein: $\tau$ represents an MPC interval, $T_{st}$ and $T_{en}$ represent a start time and an end time, respectively, of the MPC horizon, n represents a bus in the power distribution network, $\Omega_N$ represents a set of buses in the power distribution network, $\gamma_n^G$ represents a cost of energy generation by the energy resources under management by the power management unit at bus n, $P_{n,\tau}^G$ and $Q_{n,\tau}^G$, represent active and reactive power generation, respectively, by the energy resources under management by the power management unit at bus n during MPC interval $\tau$, $\gamma_n^S$ represents a penalty of load shed at bus n, $\phi$ represents a phase in $\Psi_n$, $\Psi_n$ represents a set of phases at bus n, $P_{n,\tau}^{S,\phi}$ and $Q_{n,\tau}^{S,\phi}$ represent active and reactive power generation, respectively, by the energy resources under management by the power management unit on phase $\phi$ at bus n that is shed during MPC interval $\tau$, h represents an aggregation unit in the power distribution network, $\Omega_H$ represents a set of aggregation units in the power distribution network, $\gamma_h^V$ represents a penalty of aggregation unit h violating its estimated flexibility range, $P_{n,\tau}^V$ represents a violation of aggregation unit's h estimated flexibility range in MPC interval $\tau$, $\gamma_h^W$ represents a penalty of aggregation unit h violating its optimized operation schedule, $P_{n,\tau}^W$ represents a deviation of aggregation unit h from its optimized operation schedule in MPC interval $\tau$, $P_{n,\tau}^{G,min}$ and $P_{n,\tau}^{G,max}$ represent a minimum and maximum active power generation, respectively, by the energy resources under management by the power management unit at bus n during MPC interval $\tau$, $Q_{n,\tau}^{G,min}$ and $Q_{n,\tau}^{G,max}$ represent a minimum and maximum reactive power generation, respectively, by the energy resources under management by the power management unit at bus n during MPC interval $\tau$, $P_{n,\tau}^{G,\phi}$ and $Q_{n,\tau}^{G,\phi}$ represent active and reactive power generation, respectively, by the energy resources under management by the power management unit on phase $\phi$ at bus n during MPC interval $\tau$, $P_{n,\tau}^{D,\phi}$ and $Q_{n,\tau}^{D,\phi}$ represent active and reactive load consumption, respectively, by phase $\phi$ at bus n during MPC interval $\tau$, nm represents a distribution line from bus n to bus m in the power distribution network, $\Omega_L$ represents a set of distribution lines in the power distribution network, $P_{nm,\tau}^{\phi}$ and $Q_{nm,\tau}^{\phi}$ represent the active and reactive power flow, respectively, through line nm during MPC interval $\tau$, $P_{mn,\tau}^{\phi}$ and $Q_{mn,\tau}^{\phi}$ represent the active and reactive power flow, respectively, through line mn during MPC interval $\tau$, $P_{n,\tau}^{D,fix,\phi}$ and $Q_{n,\tau}^{D,fix,\phi}$ represent active and reactive uncontrollable load consumption, respectively, by phase (at bus n during MPC interval $\tau$, $P_{h,\tau}$ and $Q_{h,\tau}$ represent optimized active and reactive loads, respectively, for aggregation unit h during MPC interval $\tau$, $V_{n,\tau}^{\phi}$ and $V_{m,\tau}^{\phi}$ represent a squared nodal voltage magnitude on phase $\phi$ at bus n and bus m, respectively, $r_{nm}^{\phi\phi}$ and $x_{nm}^{\phi\phi}$ represent the resistance and reactance, respectively, of line nm, $\phi'$ and $\phi''$ represent the phase that leads and lags $\phi$, respectively, by $2\pi/3$, $\vartheta_1$ and $\vartheta_2$ represent $\cos(2\pi/3)$ and $\sin(2\pi/3)$, respectively, $V_n^{\phi,min}$ and $V_n^{\phi,max}$ represent a minimum and maximum value of $V_n^{\phi}$, respectively, $P_{h,\tau}^*$ represents unit h's optimized operation schedule in MPC interval $\tau$, $P_{n,\tau}^{min}$ and $P_{n,\tau}^{max}$ represent a minimum and maximum active power, respectively, for aggregation unit h during MPC interval $\tau$, and $e_{h,\tau}^{min}$ and $e_{h,\tau}^{max}$ a minimum and maximum energy consumption, respectively, for aggregation unit h during MPC interval $\tau$.

Example 6. The system of any of examples 1-5, wherein the aggregation unit is configured to determine the optimized operation schedule covering the MPC horizon for the one or more DERS by determining:

$$\text{Min} \sum_{\tau=T_{st}}^{T_{en}} \left( \sum_{a\in\Omega_{A_h}} p_{h,\tau}^a + \sum_{b\in\Omega_{B_h}} \beta_h^b \|s_{h,\tau}^b - s_h^{b,pre}\|_2^2 \right)$$

subject to: $p_{h,\tau}^{a,min} \le p_{h,\tau}^a \le p_{h,\tau}^{a,max}$, $q_{h,\tau}^{a,min} \le q_{h,\tau}^a \le q_{h,\tau}^{a,max}$, $s_{h,\tau}^{b,min} \le s_{h,\tau}^b \le s_{h,\tau}^{b,max}$, and $$s_{h,\tau}^b = s_{h,\tau-1}^b + \sum_{a\to b} \delta_h^a p_{h,\tau}^a \Delta T + c_{h,\tau}^b \Delta T,$$

wherein: $\tau$ represents an MPC interval, $T_{st}$ and $T_{en}$ represent a start time and an end time, respectively, of the MPC horizon, $\Omega_{A_h}$ represents the one or more DERs, a represents a DER in the one or more DERs, $p_{h,\tau}^a$ represents an active power of DER a for MPC interval $\tau$, $\Omega_{B_h}$ represents a set of comfort parameters, b represents a comfort parameter in the set of comfort parameters, $s_{h,\tau}^b$ represents a value of comfort parameter b for MPC interval $\tau$, $s_{h,\tau}^{b,pre}$ represents a preferred value of comfort parameter b for MPC interval $\tau$, $p_{h,\tau}^{a,min}$ and $p_{h,\tau}^{a,max}$ represent a minimum and maximum active power of DER a, respectively, for MPC interval $\tau$, $s_{h,\tau}^{b,min}$ and $s_{h,\tau}^{b,max}$ represent a desired minimum and maximum value, respectively, of comfort parameter b for MPC interval $\tau$, $s_{h,\tau-1}^b$ represents the value of comfort parameter b for MPC interval $\tau-1$, a→b indicates that power consumption by DER a will influence comfort parameter b, $\delta_h^a$ represents a DER conversion efficiency factor for DER a, $\Delta T$ represents the duration of MPC interval $\tau$, and $c_{h,\tau}^b$ represents an external influence factor on comfort parameter b for MPC interval $\tau$.

Example 7. The system of any of examples 1-6, wherein the aggregation unit is configured to determine the estimated flexibility range by determining:

$$p_{h,\tau}^{min} = \sum_{a \in \Omega_{A_h}} p_{h,\tau}^{a,min},$$

$$p_{h,\tau}^{max} = \sum_{a \in \Omega_{A_h}} p_{h,\tau}^{a,max},$$

and $$\text{Min } e_{h,\tau}^{min} = \sum_{T=T_{st}}^{\tau} \sum_{a \in \Omega_{A_h}} p_{h,T}^{a} \text{ and}$$

$$\text{Max } e_{h,\tau}^{max} = \sum_{T=T_{st}}^{\tau} \sum_{a \in \Omega_{A_h}} p_{h,T}^{a},$$

each subject to: $p_{h,\tau}^{a,min} \leq p_{h,\tau}^{a} \leq p_{h,\tau}^{a,max}$, $q_{h,\tau}^{a,min} \leq q_{h,\tau}^{a} \leq q_{h,\tau}^{a,max}$, $s_{h,\tau}^{b,min} \leq s_{h,\tau}^{b} \leq s_{h,\tau}^{b,max}$, and $$s_{h,\tau}^{b} = s_{h,\tau-1}^{b} + \sum_{a \to b} \delta_h^a p_{h,\tau}^a \Delta T + c_{h,\tau}^b \Delta T,$$

wherein: $\tau$ represents an MPC interval, $T_{st}$ represents a start time of the MPC horizon, $e_{h,\tau}^{min}$ and $e_{h,\tau}^{max}$ represent a minimum and maximum energy consumption of devices under management by the aggregation unit for MPC interval $\tau$, $\Omega_{A_h}$ represents the one or more DERs, a represents a DER in the one or more DERs, $p_{h,\tau}^{a}$ represents an active power of DER a for MPC interval $\tau$, b represents a comfort parameter in a set of comfort parameters, $s_{h,\tau}^{b}$ represents a value of comfort parameter b for MPC interval $\tau$, $s_{h,\tau}^{b,pre}$ represents a preferred value of comfort parameter b for MPC interval $\tau$, $p_{h,\tau}^{a,min}$ and $p_{h,\tau}^{a,max}$ represent a minimum and maximum active power of DER a, respectively, for MPC interval $\tau$, $s_{h,\tau}^{b,min}$ and $s_{h,\tau}^{b,max}$ represent a desired minimum and maximum value, respectively, of comfort parameter b for MPC interval $\tau$, $s_{h,\tau-1}^{b}$ represents the value of comfort parameter b for MPC interval $\tau-1$, $a \to b$ indicates that power consumption by DER a will influence comfort parameter b, $\delta_h^a$ represents a DER conversion efficiency factor for DER a, $\Delta T$ represents the duration of MPC interval $\tau$, and $c_{h,\tau}^{b}$ represents an external influence factor on comfort parameter b for MPC interval $\tau$.

Example 8. An aggregation unit comprising: at least one processor configured to: receive a service collaboration request indicating a problem in a power distribution network; responsive to receiving the service collaboration request, determine, based on respective minimum and maximum real and reactive power values for one or more DERs in the power distribution network under management of the aggregation unit, an optimized operation schedule covering a model predictive control (MPC) horizon duration for the one or more DERS; determine, based on the optimized operation schedule, an estimated flexibility range for devices under management by the aggregation unit; output, for use by a management device in the power distribution network, an indication of the estimated flexibility range; receive an indication of an overall optimized operation schedule covering the MPC horizon duration; determine, based on the indication of the overall optimized operation schedule, setpoints for the one or more DERs; and cause at least one of the one or more DERs to modify operation based on the setpoints.

Example 9. The aggregation unit of example 8, wherein: the at least one processor is further configured to determine the optimized operation schedule, determine the estimated flexibility range, and output the indication of the estimated flexibility range iteratively at a first frequency that represents an MPC interval the at least one processor is further configured to determine the setpoints for the one or more DERs and cause the at least one of the one or more DERs to modify operation iteratively at a second frequency that represents a real-time interval, and the MPC interval is larger than the real-time interval.

Example 10. The aggregation unit of example 9, wherein: determining the setpoints for the one or more DERs is further based on a power over-consumption threshold, an energy over-consumption threshold, and respective minimum and maximum values of a comfort parameter for devices under management by the aggregation unit, the power over-consumption threshold represents a level of power consumption by the devices under management by the aggregation unit that, if exceeded during any real-time interval, will incur a penalty, the energy over-consumption threshold represents a level of energy consumption by the devices under management by the aggregation unit that, if exceeded during any MPC interval, will incur a penalty, and the respective minimum and maximum comfort settings represent a desired—but not required-operating range of the devices under management.

Example 11. The aggregation unit of any of examples 8-10, wherein determining the estimated flexibility range comprises determining: a sum of respective minimum powers of devices under management by the aggregation unit; a sum of respective maximum power of devices under management by the aggregation unit; a sum of respective minimum energy consumption of devices under management by the aggregation unit; and a sum of respective maximum energy consumption of devices under management by the aggregation unit.

Example 12. The aggregation unit of any of examples 8-11, wherein determining the estimated flexibility range is further based on respective minimum and maximum values of a comfort parameter for the one or more DERs.

Example 13. The aggregation unit of any of examples 8-12, wherein determining the optimized operation schedule for the one or more DERS during the MPC horizon duration comprises determining:

$$\text{Min } \sum_{\tau=T_{st}}^{T_{en}} \left( \sum_{a \in \Omega_{A_h}} p_{h,\tau}^a + \sum_{b \in \Omega_{B_h}} \beta_h^b \| s_{h,\tau}^b - s_h^{b,pre} \|_2^2 \right)$$

subject to: $p_{h,\tau}^{a,min} \leq p_{h,\tau}^{a} \leq p_{h,\tau}^{a,max}$, $q_{h,\tau}^{a,min} \leq q_{h,\tau}^{a} \leq q_{h,\tau}^{a,max}$, $s_{h,\tau}^{b,min} \leq s_{h,\tau}^{b} \leq s_{h,\tau}^{b,max}$, and $$s_{h,\tau}^{b} = s_{h,\tau-1}^{b} + \sum_{a \to b} \delta_h^a p_{h,\tau}^a \Delta T + c_{h,\tau}^b \Delta T,$$

wherein: $\tau$ represents an MPC interval, $T_{st}$ and $T_{en}$ represent a start time and an end time, respectively, of the MPC horizon, $\Omega_{A_h}$ represents the one or more DERs, a represents a DER in the one or more DERs, $p_{h,\tau}^{a}$ represents an active power of DER a for MPC interval $\tau$, $\Omega_{B_h}$ represents a set of comfort parameters, b represents a comfort parameter in the set of comfort parameters, $s_{h,\tau}^b$ represents a value of comfort parameter b for MPC interval τ, $s_{h,\tau}^{b,pre}$ represents a preferred value of comfort parameter b for MPC interval τ, $p_{h,\tau}^{a,min}$ and $p_{h,\tau}^{a,max}$ represent a minimum and maximum active power of DER a, respectively, for MPC interval τ, $s_{h,\tau}^{b,min}$ and $s_{h,\tau}^{b,max}$ represent a desired minimum and maximum value, respectively, of comfort parameter b for MPC interval τ, $s_{h,\tau-1}^b$ represents the value of comfort parameter b for MPC interval τ−1, a→b indicates that power consumption by DER a will influence comfort parameter b, $\delta_h^a$ represents a DER conversion efficiency factor for DER a, ΔT represents the duration of MPC interval τ, and $c_{h,\tau}^b$ represents an external influence factor on comfort parameter b for MPC interval τ.

Example 14. The aggregation unit of any of examples 8-13, wherein determining the estimated flexibility range comprises determining:

$$p_{h,\tau}^{min} = \sum_{a \in \Omega_{A_h}} p_{h,\tau}^{a,min},$$

$$p_{h,\tau}^{max} = \sum_{a \in \Omega_{A_h}} p_{h,\tau}^{a,min},$$

and $$\text{Min } e_{h,\tau}^{min} = \sum_{T=T_{st}}^{\tau} \sum_{a \in \Omega_{A_h}} p_{h,T}^a \text{ and Max } e_{h,\tau}^{max} = \sum_{T=T_{st}}^{\tau} \sum_{a \in \Omega_{A_h}} p_{h,T}^a,$$

each subject to: $p_{h,\tau}^{a,min} \leq p_{h,\tau}^a \leq p_{h,\tau}^{a,max}$, $q_{h,\tau}^{a,min} \leq q_{h,\tau}^a \leq q_{h,\tau}^{a,max}$, $s_{h,\tau}^{b,min} \leq s_{h,\tau}^b \leq s_{h,\tau}^{b,max}$, and $$s_{h,\tau}^b = s_{h,\tau-1}^b + \sum_{a \to b} \delta_h^a p_{h,\tau}^a \Delta T + c_{h,\tau}^b \Delta T,$$

wherein: τ represents an MPC interval, $T_{st}$ represents a start time of the MPC horizon, $e_{h,\tau}^{min}$ and $e_{h,\tau}^{max}$ represent a minimum and maximum energy consumption of devices under management by the aggregation unit for MPC interval τ, $\Omega_{A_h}$ represents the one or more DERs, a represents a DER in the one or more DERs, $p_{h,\tau}^a$ represents an active power of DER a for MPC interval τ, b represents a comfort parameter in a set of comfort parameters, $s_{h,\tau}^b$ represents a value of comfort parameter b for MPC interval τ, $s_{h,\tau}^{b,pre}$ represents a preferred value of comfort parameter b for MPC interval τ, $p_{h,\tau}^{a,min}$ and $p_{h,\tau}^{a,max}$ represent a minimum and maximum active power of DER a, respectively, for MPC interval τ, $s_{h,\tau}^{b,min}$ and $s_{h,\tau}^{b,max}$ represent a desired minimum and maximum value, respectively, of comfort parameter b for MPC interval τ, $s_{h,\tau-1}^b$ represents the value of comfort parameter b for MPC interval τ−1, a→b indicates that power consumption by DER a will influence comfort parameter b, $\delta_h^a$ represents a DER conversion efficiency factor for DER a, ΔT represents the duration of MPC interval τ, and $c_{h,\tau}^b$ represents an external influence factor on comfort parameter b for MPC interval τ.

Example 15. A power management unit comprising: at least one processor configured to: receive an indication of an estimated flexibility range of one or more devices in a power distribution network that are under management by an aggregation unit; determine, based on a linearized restoration model of the power distribution network that includes the indication of the estimated flexibility range, an optimized power distribution network reconfiguration plan and an overall optimized operation schedule covering the MPC horizon duration for both energy resources under management by the power management unit and one or more distributed energy resources (DERs) under management by the aggregation unit; cause, based on the optimized power distribution network reconfiguration plan, a reconfiguration of the power distribution network; output, for use by the aggregation unit, an indication of the overall optimized operation schedule; and cause one or more of the energy resources under management by the power management unit to modify operation based on the overall optimized operation schedule.

Example 16. The power management unit of example 15, wherein: the at least one processor is further configured to receive the indication of the estimated flexibility range, determine the optimized power distribution network reconfiguration plan and the overall optimized operation schedule, cause the reconfiguration of the power distribution network, and output the indication of the overall optimized operation schedule iteratively at a first frequency that represents an MPC interval, the at least one processor is further configured to cause the one or more of the energy resources under management by the power management unit to modify operation iteratively at a second frequency that represents a real-time interval, and the MPC interval is larger than the real-time interval.

Example 17. The power management unit of any of examples 15-16, wherein the at least one processor is further configured to: receive an indication of an optimized operation schedule for the one or more devices, and determine the optimized power distribution network reconfiguration plan and the overall optimized operation schedule based further on the optimized operation schedule.

Example 18. The power management unit of any of examples 15-17, wherein: the at least one processor is further configured to receive an indication of an optimized operation schedule for the one or more devices that are under management by the aggregation unit, and determining the overall optimized operation schedule covering the MPC horizon duration for both energy resources under management by the power management unit and the one or more DERs is further based on the indication of the optimized operation schedule.

Example 19. The power management unit of any of examples 15-18, wherein causing one or more of the energy resources under management by the power management unit to modify operation comprises: determining, based on the overall optimized operation schedule, setpoints for the one or more energy resources; and outputting, for use by the one or more energy resources, an indication of the setpoints.

Example 20. The power management unit of any of examples 15-19, wherein determining the overall optimized operation schedule covering the MPC horizon duration for both energy resources under management by the power management unit and the one or more DERs by determining:

$$\text{Min } \sum_{T=T_{st}}^{T_{en}} \sum_{h \in \Omega_N} \left[ \gamma_n^G P_{n,\tau}^G + \gamma_n^S \sum_{\phi \in \Psi_n} \left( P_{n,\tau}^{S,\phi} + Q_{n,\tau}^{S,\phi} \right) \right] +$$

$$\sum_{T=T_{st}}^{T_{en}} \sum_{h \in \Omega_H} \left( \gamma_h^V P_{h,\tau}^V + \gamma_h^W P_{h,\tau}^W \right),$$

subject to: $P_{n,\tau}^{G,min} \leq P_{n,\tau}^G \leq P_{n\tau}^{G,max}$, $Q_{n,\tau}^{G,min} \leq Q_{n,\tau}^G \leq Q_{n\tau}^{G,max}$, $$P_{n,\tau}^G = \sum_{\phi \in \Psi_n} P_{n,\tau}^{G,\phi}, \quad Q_{n,\tau}^G = \sum_{\phi \in \Psi_n} Q_{n,\tau}^{G,\phi},$$

$$P_{n,\tau}^{G,\phi} - P_{n,\tau}^{D,\phi} + P_{n,\tau}^{S,\phi} = \sum_{nm \in \Omega_L} (P_{nm,\tau}^{\phi} - P_{mn,\tau}^{\phi}),$$

$$Q_{n,\tau}^{G,\phi} - Q_{n,\tau}^{D,\phi} + Q_{n,\tau}^{S,\phi} = \sum_{nm \in \Omega_L} (Q_{nm,\tau}^{\phi} - Q_{mn,\tau}^{\phi}),$$

$$P_{n,\tau}^{D,\phi} = P_{n,\tau}^{D,fix,\phi} + \sum_{h \to (n,\phi)} P_{h,\tau}, \quad Q_{n,\tau}^{D,\phi} = Q_{n,\tau}^{D,fix,\phi} + \sum_{h \to (n,\phi)} Q_{h,\tau},$$

$$0 \le P_{n,\tau}^{S,\phi} \le P_{n,\tau}^{D,\phi}, \quad 0 \le Q_{n,\tau}^{S,\phi} \le Q_{n,\tau}^{D,\phi}, \quad V_{n,\tau}^{\phi} - V_{m,\tau}^{\phi} = 2(r_{nm}^{\phi\phi} P_{nm,\tau}^{\phi} + x_{nm}^{\phi\phi} Q_{nm,\tau}^{\phi}) -$$

$$2\vartheta_1 (r_{nm}^{\phi\phi'} P_{nm,\tau}^{\phi'} + r_{nm}^{\phi\phi''} P_{nm,\tau}^{\phi''} + x_{nm}^{\phi\phi'} Q_{nm,\tau}^{\phi'} + x_{nm}^{\phi\phi''} Q_{nm,\tau}^{\phi''}) -$$

$$2\vartheta_2 (x_{nm}^{\phi\phi'} P_{nm,\tau}^{\phi'} - x_{nm}^{\phi\phi''} P_{nm,\tau}^{\phi''} - r_{nm}^{\phi\phi'} Q_{nm,\tau}^{\phi'} + r_{nm}^{\phi\phi''} Q_{nm,\tau}^{\phi''}),$$

$$V_n^{\phi,min} \le V_{n,\tau}^{\phi} \le V_n^{\phi,max}, \quad P_{h,\tau}^W \ge P_{h,\tau} - p_{h,\tau}^*, \quad P_{h,\tau}^W \ge p_{h,\tau}^* - P_{h,\tau},$$

$p_{h,\tau}^{min} \le P_{h,\tau} \le p_{h,\tau}^{max}$, $e_{h,\tau}^{min} - P_{h,\tau}^V \le \sum_{T=T_{st}}^{\tau} P_{h,T} \le e_{h,\tau}^{max} P_{h,\tau}^V$, and $P_{h,\tau}^V \ge 0$, wherein: $\tau$, represents an MPC interval, $T_{st}$ and $T_{en}$ represent a start time and an end time, respectively, of the MPC horizon, n represents a bus in the power distribution network, $\Omega_N$ represents a set of buses in the power distribution network, $\gamma_n^G$ represents a cost of energy generation by the energy resources under management by the power management unit at bus n, $P_{n,\tau}^G$ and $Q_{n,\tau}^G$ represent active and reactive power generation, respectively, by the energy resources under management by the power management unit at bus n during MPC interval $\tau$, $\gamma_n^S$ represents a penalty of load shed at bus n, $\phi$ represents a phase in $\Psi_n$, $\Psi_n$ represents a set of phases at bus n, $P_{n,\tau}^{S,\phi}$ and $Q_{n,\tau}^{S,\phi}$ represent active and reactive power generation, respectively, by the energy resources under management by the power management unit on phase $\phi$ at bus n that is shed during MPC interval $\tau$, h represents an aggregation unit in the power distribution network, $\Omega_H$ represents a set of aggregation units in the power distribution network, $\gamma h$ represents a penalty of aggregation unit h violating its estimated flexibility range, $P_{n,\tau}^V$ represents a violation of aggregation unit's h estimated flexibility range in MPC interval $\tau$, $yh^W$ represents a penalty of aggregation unit h violating its optimized operation schedule, $P_{n,\tau}^W$ represents a deviation of aggregation unit h from its optimized operation schedule in MPC interval $\tau$, $P_{n,\tau}^{G,min}$ and $P_{n,\tau}^{G,max}$ represent a minimum and maximum active power generation, respectively, by the energy resources under management by the power management unit at bus n during MPC interval $\tau$, $Q_{n,\tau}^{G,\phi}$ and $Q_{n,\tau}^{G,max}$ represent a minimum and maximum reactive power generation, respectively, by the energy resources under management by the power management unit at bus n during MPC interval $\tau$, $P_{n,\tau}^{G,\phi}$, and $Q_{n,\tau}^{G,\phi}$ represent active and reactive power generation, respectively, by the energy resources under management by the power management unit on phase ($\phi$ at bus n during MPC interval $\tau$, $P_{n,\tau}^{D,\phi}$, and $Q_{n,\tau}^{D,\phi}$ represent active and reactive load consumption, respectively, by phase $\phi$ at bus n during MPC interval $\tau$, nm represents a distribution line from bus n to bus m in the power distribution network, $\Omega_L$ represents a set of distribution lines in the power distribution network, $P_{nm,\tau}^{\phi}$ and $Q_{nm,\tau}^{\phi}$ represent the active and reactive power flow, respectively, through line nm during MPC interval $\tau$, $P_{mn,\tau}^{\phi}$ and $Q_{mn,\tau}^{\phi}$ represent the active and reactive power flow, respectively, through line mn during MPC interval $\tau$, $P_{n,\tau}^{D,fix,\phi}$ and $Q_{n,\tau}^{D,fix,\phi}$ represent active and reactive uncontrollable load consumption, respectively, by phase (at bus n during MPC interval $\tau$, $P_{h,\tau}$ and $Q_{h,\tau}$ represent optimized active and reactive loads, respectively, for aggregation unit h during MPC interval $\tau$, $V_{n,\tau}^{\phi}$ and $V_{m,\tau}^{\phi}$ represent a squared nodal voltage magnitude on phase $\phi$ at bus n and bus m, respectively, $r_{nm}^{\phi\phi}$ and $x_{nm}^{\phi\phi}$ represent the resistance and reactance, respectively, of line nm, $\phi'$ and $\phi''$ represent the phase that leads and lags $\phi$, respectively, by $2\pi/3$, $\vartheta_1$ and $\vartheta_2$ represent cos $(2\pi/3)$ and sin $(2\pi/3)$, respectively, $V_n^{\phi,min}$ and $V_n^{\phi,max}$ represent a minimum and maximum value of $V_n^{\phi}$, respectively, $P_{h,\tau}^*$ represents unit h's optimized operation schedule in MPC interval $\tau$, $P_{h,\tau}^{min}$ and $P_{h,\tau}^{max}$ represent a minimum and maximum active power, respectively, for aggregation unit h during MPC interval $\tau$, and $e_{h,\tau}^{min}$ and $e_{h,\tau}^{max}$ a minimum and maximum energy consumption, respectively, for aggregation unit h during MPC interval $\tau$.

Example 21. A method comprising: receiving, by an aggregation unit comprising at least one processor, a service collaboration request indicating a problem in a power distribution network; responsive to receiving the service collaboration request, determining, by the aggregation unit, based on respective minimum and maximum real and reactive power values for one or more DERs in the power distribution network under management by the aggregation unit, an optimized operation schedule covering a model predictive control (MPC) horizon duration for the one or more DERs; determining, by the aggregation unit, based on the optimized operation schedule, an estimated flexibility range for devices under management by the aggregation unit; determining, by a power management unit comprising at least one processor, based on a linearized restoration model of the three-phase unbalanced power distribution network that includes an indication of the estimated flexibility range, an optimized power distribution network reconfiguration plan and an overall optimized operation schedule covering the MPC horizon duration for both energy resources under management by the power management unit and the one or more DERs; causing, by the power management unit, based on the optimized power distribution network reconfiguration plan, a reconfiguration of the power distribution network; causing, by the power management unit, one or more of the energy resources under management by the power management unit to modify operation based on the overall optimized operation schedule; determining, by the aggregation unit, based on the indication of the overall optimized operation schedule, setpoints for the one or more DERs; and causing, by the aggregation unit, at least one of the one or more DERs to modify operation based on the setpoints.

Example 22: The method of example 21, further comprising operations to perform any of the techniques of examples 2-7

Example 23: A method comprising: receiving, by an aggregation unit comprising at least one processor, a service collaboration request indicating a problem in a power distribution network; responsive to receiving the service collaboration request, determining, by the aggregation unit, based on respective minimum and maximum real and reactive power values for one or more DERs in the power distribution network under management of the aggregation unit, an optimized operation schedule covering a model predictive control (MPC) horizon duration for the one or more DERS; determining, by the aggregation unit, based on the optimized operation schedule, an estimated flexibility range for devices under management by the aggregation unit; outputting, by the aggregation unit, for use by a management device in the power distribution network, an indication of the estimated flexibility range; receiving, by the aggregation unit, an indication of an overall optimized operation schedule covering the MPC horizon duration; determining, by the aggregation unit, based on the indication of the overall optimized operation schedule, setpoints for the one or more DERs; and causing, by the aggregation unit, at least one of the one or more DERs to modify operation based on the setpoints.

Example 24: The method of example 23, further comprising operations to perform any of the techniques of examples 9-14.

Example 25: A method comprising: receiving, by a power management unit comprising at least one processor, an indication of an estimated flexibility range of one or more devices in a power distribution network that are under management by an aggregation unit; determining, by the power management unit, based on a linearized restoration model of the power distribution network that includes the indication of the estimated flexibility range, an optimized power distribution network reconfiguration plan and an overall optimized operation schedule covering the MPC horizon duration for both energy resources under management by the power management unit and one or more distributed energy resources (DERs) under management by the aggregation unit; causing, by the power management unit, based on the optimized power distribution network reconfiguration plan, a reconfiguration of the power distribution network; outputting, by the power management unit, for use by the aggregation unit, an indication of the overall optimized operation schedule; and causing, by the power management unit, one or more of the energy resources under management by the power management unit to modify operation based on the overall optimized operation schedule.

Example 26: The method of example 25, further comprising operations to perform any of the techniques of examples 16-20.

Example 27: A non-transitory computer readable medium encoded with instructions that, when executed, cause at least one processor to perform any of the techniques of examples 1-20. In one or more examples, the techniques described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

What is claimed is:

1. A system comprising: an aggregation unit comprising at least one processor, the aggregation unit being configured to: receive a service collaboration request indicating a problem in a power distribution network; responsive to receiving the service collaboration request, determine, based on respective minimum and maximum real and reactive power values for one or more distributed energy resources (DERs) in the power distribution network under management by the aggregation unit, an optimized operation schedule covering a model predictive control (MPC) horizon duration for the one or more DERs; determine, based on the optimized operation schedule, an estimated flexibility range for devices under management by the aggregation unit; and output an indication of the estimated flexibility range; a power management unit comprising at least one processor, the power management unit being configured to: receive the indication of the estimated flexibility range; determine, based on a linearized restoration model of a three-phase unbalanced power distribution network that includes the indication of the estimated flexibility range, an optimized power distribution network reconfiguration plan and an overall optimized operation schedule covering the MPC horizon duration for both energy resources under management by the power management unit and the one or more DERs; cause, based on the optimized power distribution network reconfiguration plan, a reconfiguration of the power distribution network; output an indication of the overall optimized operation schedule; and cause one or more of the energy resources under management by the power management unit to modify operation based on the overall optimized operation schedule, wherein the aggregation unit is further configured to: receive the indication of the overall optimized operation schedule; determine, based on the indication of the overall optimized operation schedule, setpoints for the one or more DERs; and cause at least one of the one or more DERs to modify operation based on the setpoints.

2. The system of claim 1, wherein:
the aggregation unit is further configured to determine the optimized operation schedule, determine the estimated flexibility range, and output the indication of the estimated flexibility range iteratively at a first frequency that represents an MPC interval,
the power management unit is further configured to receive the indication of the estimated flexibility range, determine the optimized power distribution network reconfiguration plan and the overall optimized operation schedule, cause the reconfiguration of the power distribution network, and output the indication of the overall optimized operation schedule iteratively at the first frequency,
the aggregation unit is further configured to determine the setpoints for the one or more DERs and cause the at least one of the one or more DERs to modify operation iteratively at a second frequency that represents a real-time interval,
the power management unit is further configured to cause the one or more of the energy resources under management by the power management unit to modify operation iteratively at the second frequency, and
the MPC interval is larger than the real-time interval.

3. The system of claim 1, wherein:
the aggregation unit is further configured to output an indication of the optimized operation schedule, and
the power management unit is configured to determine the optimized power distribution network reconfiguration plan and the overall optimized operation schedule based further on the optimized operation schedule.

4. The system of claim 1, wherein the aggregation unit is configured to cause at least one of the one or more DERs to modify operation based on the setpoints by outputting, for use by the at least one of the one or more DERs, an indication of the setpoints.

5. The system of claim 1, wherein the power management unit is configured to determine the overall optimized operation schedule covering the MPC horizon duration for both energy resources under management by the power management unit and the one or more DERs by determining:

$$\text{Min} \sum_{\tau=T_{st}}^{T_{en}} \sum_{n\in\Omega_N} \left[ \gamma_n^G P_{n,\tau}^G + \gamma_n^S \sum_{\phi\in\Psi_n} \left( P_{n,\tau}^{S,\phi} + Q_{n,\tau}^{S,\phi} \right) \right] + \sum_{\tau=T_{st}}^{T_{en}} \sum_{h\in\Omega_H} \left( \gamma_h^V P_{h,\tau}^V + \gamma_h^W P_{h,\tau}^W \right),$$

subject to:

$$P_{n,\tau}^{G,min} \leq P_{n,\tau}^G \leq P_{n,\tau}^{G,max},$$

$$Q_{n,\tau}^{G,min} \leq Q_{n,\tau}^G \leq Q_{n,\tau}^{G,max},$$

$$P_{n,\tau}^G = \sum_{\phi\in\Psi_n} P_{n,\tau}^{G,\phi}, Q_{n,\tau}^G = \sum_{\phi\in\Psi_n} Q_{n,\tau}^{G,\phi},$$

$$P_{n,\tau}^{G,\phi} - P_{n,\tau}^{D,\phi} + P_{n,\tau}^{S,\phi} = \sum_{nm\in\Omega_L} \left( P_{nm,\tau}^\phi - P_{mn,\tau}^\phi \right),$$

$$Q_{n,\tau}^{G,\phi} - Q_{n,\tau}^{D,\phi} + Q_{n,\tau}^{S,\phi} = \sum_{nm\in\Omega_L} \left( Q_{nm,\tau}^\phi - Q_{mn,\tau}^\phi \right),$$

$$P_{n,\tau}^{D,\phi} = P_{n,\tau}^{D,fix,\phi} + \sum_{h\to(n,\phi)} P_{h,\tau},$$

$$Q_{n,\tau}^{D,\phi} = Q_{n,\tau}^{D,fix,\phi} + \sum_{h\to(n,\phi)} Q_{h,\tau},$$

$$0 \leq P_{n,\tau}^{S,\phi} \leq P_{n,\tau}^{D,\phi}, 0 \leq Q_{n,\tau}^{S,\phi} \leq Q_{n,\tau}^{D,\phi},$$

$$V_{n,\tau}^\phi - V_{m,\tau}^\phi = 2\left( r_{nm}^{\phi\phi} P_{nm,\tau}^\phi + x_{nm}^{\phi\phi} Q_{nm,\tau}^\phi \right)$$

$$-2\vartheta_1 \left( r_{nm}^{\phi\phi'} P_{nm,\tau}^{\phi'} + r_{nm}^{\phi\phi''} P_{nm,\tau}^{\phi''} + x_{nm}^{\phi\phi'} Q_{nm,\tau}^{\phi'} + x_{nm}^{\phi\phi''} Q_{nm,\tau}^{\phi''} \right)$$

$$-2\vartheta_2 \left( x_{nm}^{\phi\phi'} P_{nm,\tau}^{\phi'} - x_{nm}^{\phi\phi''} P_{nm,\tau}^{\phi''} - r_{nm}^{\phi\phi'} Q_{nm,\tau}^{\phi'} + r_{nm}^{\phi\phi''} Q_{nm,\tau}^{\phi''} \right),$$

$$V_n^{\phi,min} \leq V_{n,\tau}^\phi \leq V_n^{\phi,max},$$

$$P_{h,\tau}^W \geq P_{h,\tau} - p_{h,\tau}^*,$$

$$P_{h,\tau}^W \geq p_{h,\tau}^* - P_{h,\tau},$$

$$p_{h,\tau}^{min} \leq P_{h,\tau} \leq p_{h,\tau}^{max},$$

$$e_{h,\tau}^{min} - P_{h,\tau}^V \leq \sum_{T=T_{st}}^\tau P_{h,T} \leq e_{h,\tau}^{max} + P_{h,\tau}^V$$

and $$P_{h,\tau}^V \geq 0,$$

wherein:
$\tau$ represents an MPC interval,
$T_{st}$ and $T_{en}$ represent a start time and an end time, respectively, of the MPC horizon,
n represents a bus in the power distribution network,
$\Omega_N$ represents a set of buses in the power distribution network,
$\gamma_n^G$ represents a cost of energy generation by the energy resources under management by the power management unit at bus n,
$P_{n,\tau}^G$ and $Q_{n,\tau}^G$ represent active and reactive power generation, respectively, by the energy resources under management by the power management unit at bus n during MPC interval $\tau$, $\gamma_n^S$ represents a penalty of load shed at bus n, $\phi$ represents a phase in $\psi_n$, $\psi_n$ represents a set of phases at bus n, $P_{n,\tau}^{S,\phi}$ and $Q_{n,\tau}^{S,\phi}$ represent active and reactive power generation, respectively, by the energy resources under management by the power management unit on phase $\phi$ at bus n that is shed during MPC interval $\tau$, h represents an aggregation unit in the power distribution network, $\Omega_H$ represents a set of aggregation units in the power distribution network, $\beta_h^V$ represents a penalty of aggregation unit h violating its estimated flexibility range, $P_{h,\tau}^V$ represents a violation of aggregation unit's h estimated flexibility range in MPC interval $\tau$, $\gamma_h^W$ represents a penalty of aggregation unit h violating its optimized operation schedule, $P_{h,\tau}^W$ represents a deviation of aggregation unit h from its optimized operation schedule in MPC interval $\tau$, $P_{n,\tau}^{G,min}$ and $P_{n,\tau}^{G,max}$ represent a minimum and maximum active power generation, respectively, by the energy resources under management by the power management unit at bus n during MPC interval $\tau$, $Q_{n,\tau}^{G,min}$ and $Q_{n,\tau}^{G,max}$ represent a minimum and maximum reactive power generation, respectively, by the energy resources under management by the power management unit at bus n during MPC interval $\tau$, $P_{n,\tau}^{G,\phi}$ and $Q_{n,\tau}^{G,\phi}$ represent active and reactive power generation, respectively, by the energy resources under management by the power management unit on phase $\phi$ at bus n during MPC interval $\tau$, $P_{n,\tau}^{D,\phi}$ and $Q_{n,\tau}^{D,\phi}$ represent active and reactive load consumption, respectively, by phase $\phi$ at bus n during MPC interval $\tau$, nm represents a distribution line from bus n to bus m in the power distribution network, $\Omega_L$ represents a set of distribution lines in the power distribution network, $P_{nm,\tau}^{\phi}$ and $Q_{nm,\tau}^{\phi}$ represent the active and reactive power flow, respectively, through line nm during MPC interval $\tau$, $P_{mn,\tau}^{\phi}$ and $Q_{mn,\tau}^{\phi}$ represent the active and reactive power flow, respectively, through line mn during MPC interval $\tau$, $P_{n,\tau}^{D,fix,\phi}$ and $Q_{n,\tau}^{D,fix,\phi}$ represent active and reactive uncontrollable load consumption, respectively, by phase $\phi$ at bus n during MPC interval $\tau$, $P_{h,\tau}$ and $Q_{h,\tau}$ represent optimized active and reactive loads, respectively, for aggregation unit h during MPC interval $\tau$, $V_{n,\tau}^{\phi}$ and $V_{m,\tau}^{\phi}$ represent a squared nodal voltage magnitude on phase $\phi$ at bus n and bus m, respectively, $r_{nm}^{\phi\phi}$ and $x_{nm}^{\phi\phi}$ represent the resistance and reactance, respectively, of line nm, $\phi'$ and $\phi''$ represent the phase that leads and lags $\phi$, respectively, by $2\pi/3$, $\vartheta_1$ and $\vartheta_2$ represent cos $(2\pi/3)$ and sin $(2\pi/3)$, respectively, $V_n^{\phi,min}$ and $V_n^{\phi,max}$ represent a minimum and maximum value of $V_n^\phi$, respectively, $P_{h,\tau}^*$ represents unit h's optimized operation schedule in MPC interval $\tau$, $P_{h,\tau}^{min}$ and $P_{h,\tau}^{max}$ represent a minimum and maximum active power, respectively, for aggregation unit h during MPC interval $\tau$, and $e_{h,\tau}^{min}$ and $e_{h,\tau}^{max}$ a minimum and maximum energy consumption, respectively, for aggregation unit h during MPC interval $\tau$.

6. The system of claim 1, wherein the aggregation unit is configured to determine the optimized operation schedule covering the MPC horizon for the one or more DERS by determining:

$$\text{Min} \sum_{\tau=T_{st}}^{T_{en}} \left( \sum_{a \in \Omega_{A_h}} p_{h,\tau}^a + \sum_{b \in \Omega_{B_h}} \beta_h^b \|s_{h,\tau}^b - s_h^{b,pre}\|_2^2 \right)$$

subject to:

$$p_{h,\tau}^{a,min} \leq p_{h,\tau}^a \leq p_{h,\tau}^{a,max},$$

$$q_{h,\tau}^{a,min} \leq q_{h,\tau}^a \leq q_{h,\tau}^{a,max},$$

$$s_{h,\tau}^{b,min} \leq s_{h,\tau}^b \leq s_{h,\tau}^{b,max},$$

and $$s_{h,\tau}^b = s_{h,\tau-1}^b + \sum_{a \to b} \delta_h^a p_{h,\tau}^a \Delta T + c_{h,\tau}^b \Delta T,$$

wherein:

$\tau$ represents an MPC interval, $T_{st}$ and $T_{en}$ represent a start time and an end time, respectively, of the MPC horizon, $\Omega_{A_h}$ represents the one or more DERs, a represents a DER in the one or more DERs, $p_{h,\tau}^a$ represents an active power of DER a for MPC interval $\tau$, $\Omega_{B_h}$ represents a set of comfort parameters, b represents a comfort parameter in the set of comfort parameters, $s_{h,\tau}^b$ represents a value of comfort parameter b for MPC interval $\tau$, $s_{h,\tau}^{b,pre}$ represents a preferred value of comfort parameter b for MPC interval $\tau$, $p_{h,\tau}^{a,min}$ and $p_{h,\tau}^{a,max}$ represent a minimum and maximum active power of DER a, respectively, for MPC interval $\tau$, $s_{h,\tau}^{b,min}$ and $s_{h,\tau}^{b,max}$ represent a desired minimum and maximum value, respectively, of comfort parameter b for MPC interval $\tau$, $s_{h,\tau-1}^b$ represents the value of comfort parameter b for MPC interval $\tau-1$, a$\to$b indicates that power consumption by DER a will influence comfort parameter b, $\delta_h^a$ represents a DER conversion efficiency factor for DER a, $\Delta T$ represents the duration of MPC interval $\tau$, and $c_{h,\tau}^b$ represents an external influence factor on comfort parameter b for MPC interval $\tau$.

7. The system of claim 1, wherein the aggregation unit is configured to determine the estimated flexibility range by determining:

$$p_{h,\tau}^{min} = \sum_{a \in \Omega_{A_h}} p_{h,\tau}^{a,min},$$

$$p_{h,\tau}^{max} = \sum_{a \in \Omega_{A_h}} p_{h,\tau}^{a,max},$$

and $$\text{Min} e_{h,\tau}^{min} = \sum_{T=T_{St}}^{\tau} \sum_{a \in \Omega_{A_h}} p_{h,T}^{a} \text{ and}$$

$$\text{Max} e_{h,\tau}^{max} = \sum_{T=T_{St}}^{\tau} \sum_{a \in \Omega_{A_h}} p_{h,T}^{a},$$

each subject to:

$$p_{h,\tau}^{a,min} \leq p_{h,\tau}^{a} \leq p_{h,\tau}^{a,max},$$

$$q_{h,\tau}^{a,min} \leq q_{h,\tau}^{a} \leq q_{h,\tau}^{a,max},$$

$$s_{h,\tau}^{a,min} \leq s_{h,\tau}^{a} \leq s_{h,\tau}^{a,max},$$

and $$s_{h,\tau}^{b} = s_{h,\tau-1}^{b} + \sum_{a \to b} \delta_h^a p_{h,\tau}^a \Delta T + c_{h,\tau}^b \Delta T,$$

wherein:
- $\tau$ represents an MPC interval,
- $T_{st}$ represents a start time of the MPC horizon,
- $e_{h,\tau}^{min}$ and $e_{h,\tau}^{max}$ represent a minimum and maximum energy consumption of devices under management by the aggregation unit for MPC interval $\tau$,
- $\Omega_{A_h}$ represents the one or more DERs,
- a represents a DER in the one or more DERs,
- $p_{h,\tau}^{a}$ represents an active power of DER a for MPC interval $\tau$,
- b represents a comfort parameter in a set of comfort parameters,
- $s_{h,\tau}^{b}$ represents a value of comfort parameter b for MPC interval $\tau$,
- $S_{h,\tau}^{b,pre}$ represents a preferred value of comfort parameter b for MPC interval $\tau$,
- $p_{h,\tau}^{a,min}$ and $p_{h,\tau}^{a,max}$ represent a minimum and maximum active power of DER a, respectively, for MPC interval $\tau$,
- $s_{h,\tau}^{b,min}$ and $s_{h,\tau}^{b,max}$ represent a desired minimum and maximum value, respectively, of comfort parameter b for MPC interval $\tau$,
- $s_{h,\tau-1}^{b}$ represents the value of comfort parameter b for MPC interval $\tau-1$,
- a→b indicates that power consumption by DER a will influence comfort parameter b,
- $\delta_h^a$ represents a DER conversion efficiency factor for DER a,
- $\Delta T$ represents the duration of MPC interval $\tau$, and
- $c_{h,\tau}^{b}$ represents an external influence factor on comfort parameter b for MPC interval $\tau$.

* * * * *